United States Patent [19]
Hinton et al.

[11] Patent Number: 5,721,855
[45] Date of Patent: Feb. 24, 1998

[54] METHOD FOR PIPELINE PROCESSING OF INSTRUCTIONS BY CONTROLLING ACCESS TO A REORDER BUFFER USING A REGISTER FILE OUTSIDE THE REORDER BUFFER

[75] Inventors: Glenn J. Hinton, Portland; David B. Papworth, Beaverton; Andrew F. Glew; Michael A. Fetterman, both of Hillsboro; Robert P. Colwell, Portland, all of Oreg.

[73] Assignee: Intel Corporation, Santa Clara, Calif.

[21] Appl. No.: 679,182

[22] Filed: Jul. 12, 1996

Related U.S. Application Data

[63] Continuation of Ser. No. 205,021, Mar. 1, 1994, abandoned.

[51] Int. Cl.$^6$ ............................................. G06F 9/38
[52] U.S. Cl. ............................................. 395/394; 395/393
[58] Field of Search ............................. 395/394, 393

[56] References Cited

U.S. PATENT DOCUMENTS

| | | | |
|---|---|---|---|
| 4,722,049 | 1/1988 | Lahti | 395/800.03 |
| 4,773,041 | 9/1988 | Hassler et al. | 395/421.03 |
| 4,791,557 | 12/1988 | Angel et al. | 395/591 |

(List continued on next page.)

FOREIGN PATENT DOCUMENTS 2251320   1/1992   United Kingdom .

OTHER PUBLICATIONS

Mike Johnson; Superscalar Microprocessor Design; pp. 127–133, 139–142, 146, 199–200; 1991.

Popescu, Val; Schultz, Merle; Spracklen, John; Gibson, Gary; Lightner, Bruce; Isaman, David, "The Metaflow Architecture", IEEE Micro, Jun. 1991, p. Nos. 10–13 and 63–73.

Johnson, Mike, "Superscalar Microprocessor Design", Englewood Cliffs, N.J..:Prentice–Hall, 1991 (only table of contents).

*Primary Examiner*—Parshotam S. Lall
*Assistant Examiner*—Kenneth R. Coulter
*Attorney, Agent, or Firm*—Blakely, Sokoloff, Taylor & Zafman

[57] ABSTRACT

A pipelined method for executing instructions in a computer system. The present invention includes providing multiple instructions as a continuous stream of operations. This stream of operations is provided in program order. In one embodiment, the stream of operations is provided by performing an instruction cache memory lookup to fetch the multiple instructions, performing instruction length decoding on the instructions, rotating the instructions, and decoding the instructions. The present invention also performs register renaming, allocates resources and sends a portion of each of the operations to a buffering mechanism (e.g., a reservation station). The instruction cache memory lookup, instruction length decoding, rotation and decoding of the instructions, as well as the register renaming, are performed in consecutive pipestages.

The present invention provides for executing the instructions in an out-of-order pipeline. The execution produces results. In one embodiment, the instructions are executed by determining the data readiness of each of the operations and scheduling data ready operations. These scheduled data ready operations are dispatched to an execution unit and executed. The results are written back for use by other operations or as data output or indication. The determination of execution readiness, the dispatching and the execution, and writeback, are performed in consecutive pipestages.

The present invention also provides for retiring each of the continuous stream of operations in such a manner as to commit their results to architectural state and to reestablish sequential program order.

23 Claims, 49 Drawing Sheets

U.S. PATENT DOCUMENTS

| | | |
|---|---|---|
| 5,129,067 | 7/1992 | Johnson .................................. 395/389 |
| 5,185,871 | 2/1993 | Frey et al. ............................. 395/381 |
| 5,261,071 | 11/1993 | Lyon ...................................... 395/467 |
| 5,280,615 | 1/1994 | Church et al. ........................ 395/674 |
| 5,323,489 | 6/1994 | Bird ....................................... 395/494 |
| 5,355,457 | 10/1994 | Shebanow et al. .................... 395/394 |
| 5,363,495 | 11/1994 | Fry et al. ............................... 395/555 |
| 5,377,341 | 12/1994 | Kaneko et al. ........................ 395/496 |
| 5,463,745 | 10/1995 | Vidwans et al. ....................... 395/394 |
| 5,471,633 | 11/1995 | Colwell et al. ..................... 395/800.23 |
| 5,548,776 | 8/1996 | Colwell et al. ........................ 395/393 |
| 5,553,256 | 9/1996 | Fetterman et al. .................... 395/393 |
| 5,651,125 | 7/1997 | Witt et al. .............................. 395/394 |

| 1 | 2 | 3 | 4 | 5 | 6 | 7 | 8 | 9 | 10 | 11 |
|---|---|---|---|---|---|---|---|---|---|---|
| Icache read | ILD | rotate | decode 1 | decode 2 | rename/ alloc | ROB rd/ RS rdy sched | dispatch | execute | retire 1 | retire 2 |

| ENTRY VALID | OPCODE | SRC1/SRC2 | V | PSRC1/ PSRC2 | PDST |
|---|---|---|---|---|---|
| | | | | | |
RS0
| 1 | sub | 751 | 1 | 36 | 57 |
| | | 522 | 1 | 35 | |
RSX RS Buffer 1410

Figure 22a

RAT 132

| | ROB POINTER | RRFV |
|---|---|---|
| EAX | 36 | 0→1 |
| EBX | 35 | 0→1 |
| ECX | 57 | 0 |

RAT Array 1220

METHOD FOR PIPELINE PROCESSING OF INSTRUCTIONS BY CONTROLLING ACCESS TO A REORDER BUFFER USING A REGISTER FILE OUTSIDE THE REORDER BUFFER

This is continuation of application Ser. No. 08/205,021, filed Mar. 1, 1994, now abandoned.

FIELD OF THE INVENTION

The present invention relates to microprocessors, and more specifically to a superscalar microprocessor performing pipelined execution of instructions.

BACKGROUND OF THE INVENTION

The function of a microprocessor is to execute programs. Programs comprise a group of instructions. The processor fetches and executes the instructions from memory or a known storage location. The processing of the single instruction can be divided into several distinct steps or stages: instructions must be fetched, instructions must be decoded, the operands must be assembled, the specified operation must be performed, and the results must be written into their destination. The processing of instructions is controlled by a periodic clock signal, the period being the processor cycle time.

Processor performance can be improved by reducing the time it takes to execute a program. One technique for increasing the performance is by overlapping the steps involved in executing several instructions. This technique is called pipelining. Each step in the pipeline completes a portion of the execution of an instruction. Each of the steps in the pipeline is called a pipe stage. Each pipe storage is separated by clocked registers or latches. The steps required to execute an instruction are executed independently in different pipeline stages provided that there is a dedicated part of the processor for each pipe stage. The result of each pipeline stage is communicated to the next pipeline stage via the register between the stages. Although pipelining does not decrease the total amount of time required to execute an instruction, it does reduce the average number of cycles required to execute a program, by permitting the processor to handle more than one instruction at a time.

Superscalar processors issue multiple instructions at a time. In this manner, a processor with multiple execution units can execute multiple instructions concurrently. This type of superscalar processor performs concurrent execution of instructions in the same pipeline stage, as well as concurrent execution of instructions in different pipeline stages. One basic design approach is to have separate integer and floating-point execution units, such that there are separate integer and floating-point pipelines.

On a conventional microprocessor architecture, instructions written by the programmer in a certain sequential order must be completed in precisely that order. Although employing a superscalar execution unit potentially provides the capability to execute more than one instruction in parallel, any given sequence of instructions may not be able to take advantage of this capability. A sequence of instructions for execution by a microprocessor are not independent of one another. Consequently, although a microprocessor may provide the capability to execute more than one instruction concurrently, interrelationships within the sequence of instructions prevents some instructions from being executed concurrently. In addition, techniques for decoding and executing instructions may limit the ability of the processors to discover instructions that can be executed concurrently.

Instruction parallelism in a computer program is defined by the average number of instructions that a superscalar microprocessor executes concurrently. In any given sequence of instructions, instruction parallelism is limited by the number of true dependencies existing in the sequence of instructions. In addition, instruction parallelism is limited by the microprocessor due to latencies of processor operations. The machine parallelism contained within a processor is a measure of the ability of the processor to take advantage of the instruction parallelism. Consequently, machine parallelism is limited by the processor's ability to fetch, execute and determine the instruction parallelism. The amount of instruction parallelism, and potential machine parallelism, is dependent upon the particular computer program, such that some programs provide a high degree of instruction parallelism, while others provide limited amounts. Consequently, it is desirable to detect and utilize the instruction parallelism so as to provide increased throughput of instructions.

SUMMARY OF THE INVENTION

A pipelined method for executing instructions in a computer system is described. The present invention includes providing multiple instructions as a continuous stream of operations. This stream of operations is provided in program order. In one embodiment, the stream of operations is provided by performing an instruction cache memory lookup to fetch the multiple instructions, performing instruction length decoding on the instructions, rotating the instructions, and decoding the instructions. The present invention also performs register renaming, allocates resources and sends a portion of each of the operations to a buffering mechanism (e.g., a reservation station). The instruction cache memory lookup, instruction length decoding, rotation and decoding of the instructions, as well as the register renaming, are performed in consecutive pipestages.

The present invention provides for executing the instructions in an out-of-order pipeline. The execution produces results. In one embodiment, the instructions are executed by determining the data readiness of each of the operations and scheduling data ready operations. These scheduled data ready operations are dispatched to an execution unit and executed. The results are written back for use by other operations or as data output or indication. The determination of execution readiness, the dispatching and the execution, and writeback, are performed in consecutive pipestages.

The present invention also provides for retiring each of the continuous stream of operations in such a manner as to commit their results to architectural state and to reestablish sequential program order.

The present invention arranges the steps described above into a pipeline, such that the execution of multiple instructions, each at various points in its execution, can proceed simultaneously.

BRIEF DESCRIPTION OF THE DRAWINGS

The present invention is illustrated by way of example and not limited by the figures of the accompanying drawings in which like references indicate similar elements.

FIG. 3 illustrates a set of pipeline stages that define a deeply pipelined processor configured in accordance with one embodiment of the present invention.

FIG. 22a, 22b, and 22c illustrates data flow a retirement function configured in accordance with one embodiment of the present invention.

DETAILED DESCRIPTION

Figure 1:
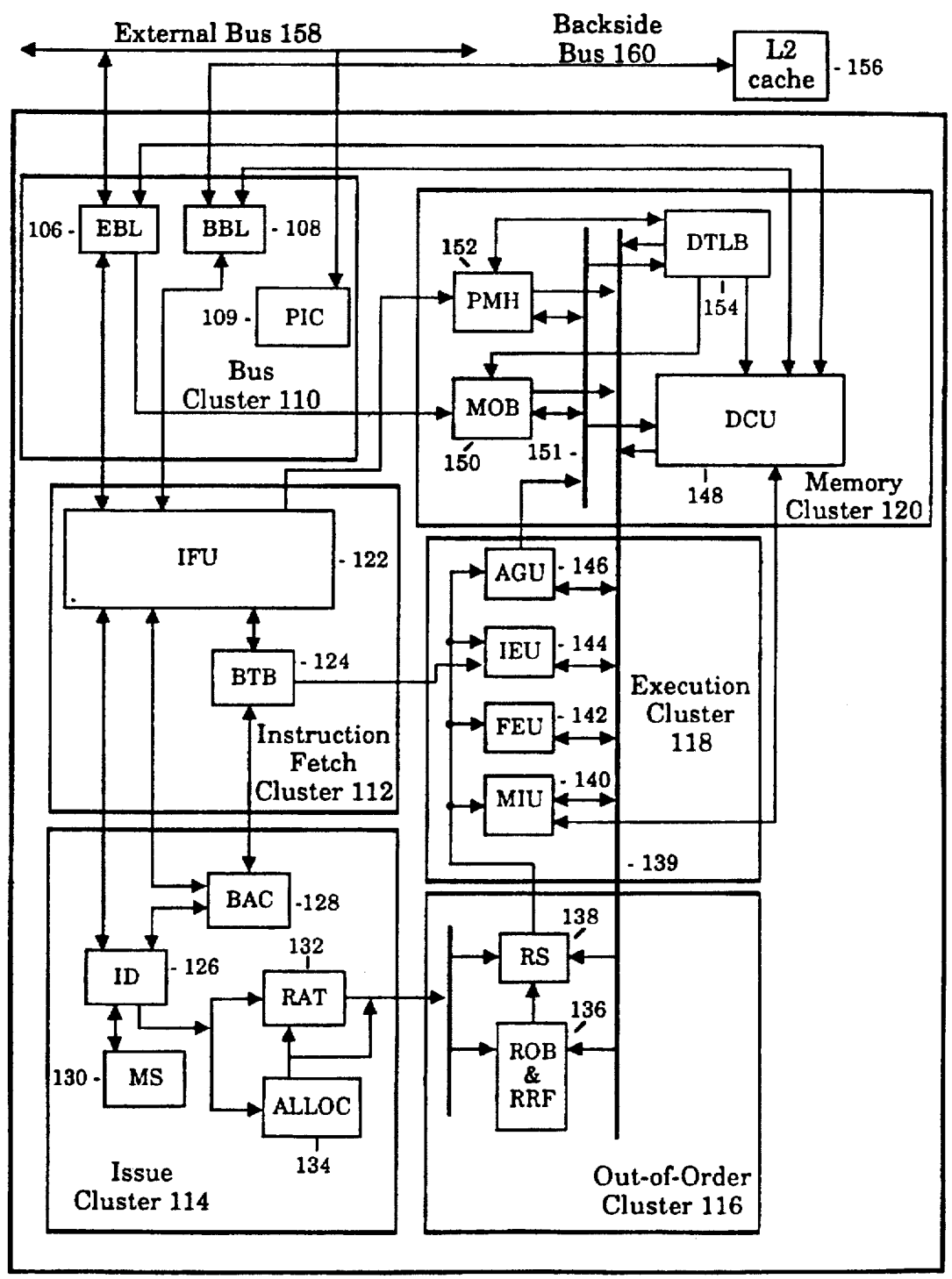
FIG. 1 illustrates a block diagram of a superscalar and superpipelined microprocessor performing speculative and out-of-order dispatch and completion configured in accordance with one embodiment of the present invention.

Methods and apparatus for a superscalar and superpipelined processor performing both speculative and out-oforder dispatch and completion are disclosed. In the following description, for purposes of explanation, specific nomenclature is set forth to provide a thorough understanding of the present invention. However, it will be understood by one skilled in the art that these specific details are not required to practice the present invention. In other instances, well known circuits and devices are shown in block diagram form to avoid obscuring the present invention.

Overview of the Processor

The processor of the present invention comprises a superscalar and superpipelined processor performing both speculative execution and out-of-order dispatch and completion of instructions. For purposes of explanation, the processor of the present invention is divided into an in-order portion and an out-of-order portion. The out-of-order portion of the processor of the present invention performs out-of-order dispatch of instructions for execution in an appropriate execution unit. Consequently, because the instructions are dispatched out-of-order, instructions complete out-of-order. The out-of-order dispatch and completion permit parallelism in executing instructions, thereby increasing performance.

In order to achieve increased performance from the out-of-order dispatch and completion operation in the processor of the present invention, an execution unit permitting parallel processing of instructions is desirable. In one In one embodiment of the present invention, the execution unit is superscalar. The superscalar execution unit contains multiple arithmetic logic units (ALUs). The superscalar execution unit supports the out-of-order dispatch and completion operation of the processor by providing parallelism in that more than one computation may occur simultaneously.

In order to support the out-of-order portion of the processor, the present invention includes speculative execution in the in-order portion of the processor. The implementation of speculative execution permits the in-order portion of the processor to provide a continuous stream of instructions to the out-of-order portion. The use of speculative execution increases available parallelism in the execution unit. In order to implement speculative execution, the processor includes a branch prediction mechanism for branch instructions.

In one embodiment, the processor of the present invention is implemented as a superpipelined processor. In a superpipelined processor, the processing stages of the pipelined processor are divided into several different substages. The superpipelined processor of the present invention implements more pipestages than a conventional pipelined processor. However, for the superpipelined processor of the present invention, the processor is constructed to perform less work per clock stage than a conventional pipeline processor. To further benefit from the superpipelined implementation, the present invention processor operates at high clock frequencies. In addition, the superpipelined processor provides good branch prediction that is necessary in a processor implemented with a deep pipeline to reduce penalties caused by incorrect branch prediction.

The in-order portion of the processor is constructed to issue a steady flow of instructions to support the out-of-order portion of the processor. In order to accomplish this task, the in-order portion of the processor supports speculative execution via branch prediction for branch instructions. The in-order portion of the processor of the present invention supports renaming of resources, known as register renaming. As is explained more fully below, the use of register renaming permits more parallel execution of instructions than a processor without register renaming. In addition, the in-order portion of the processor re-imposes the original program order of instructions after the instructions are executed, potentially out of the original program order. Furthermore, for an implementation supporting the Intel®microprocessor architecture, the in-order portion of the processor maintains a precise fault model.

The memory subsystem of the present invention provides appropriate bandwidth to support the out-of-order portion of the processor. Because the processor of the present invention supports out-of-order dispatch and completion, the memory subsystem enforces ordering to maintain data integrity in the memory system. For example, a first store operation cannot pass a second store operation if the first store operation came before the second store operation in the original program order. In addition, the memory subsystem of the present invention supports speculative execution, such that speculative store operations are not executed.

FIG. 1 illustrates a block diagram of a superscalar and superpipelined microprocessor performing speculative and out-of-order dispatch and completion configured in accordance with one embodiment of the present invention. A processor 100 may be compatible with, but not limited to, microprocessors such as an Intel® Architecture Microprocessor, manufactured by Intel Corporation of Santa Clara, Calif., the corporate assignee of the present invention, PowerPC™, Alpha™, etc. For the embodiment illustrated in FIG. 1, the in-order portion of the processor 100 is implemented with an instruction fetch cluster 112 and issue cluster 114. The out-of-order portion of processor 100 includes the out-of-order cluster 116, execution cluster 118, and a memory order buffer 150 located in the memory cluster 120. In addition, the bus cluster 110 provide an interface for external operations, and the memory cluster 120 provides the memory subsystem for the processor 100.

The instruction fetch function of the present invention fetches a continuous flow of instructions including providing branch prediction to support speculative execution in the processor. In one embodiment of the present invention, the instruction fetch function is implemented with the instruction fetch cluster 122 comprising an instruction fetch unit (IFU) 122. In addition, branch prediction is implemented, in part, with a branch target buffer (BTB) 124 as shown in FIG. 1.

The processor 100 contains an issue cluster 114 as shown in FIG. 1. In general, the issue cluster 114 receives instructions from the instruction fetch cluster 112, and prepares the instructions for the out-of-order cluster 116, execution cluster 118, and memory cluster 120. The issue cluster 114 is the last functional cluster within the in-order portion of the processor 100. The issue cluster 114 includes an instruction decoder (ID) 126, a microinstruction sequencer (MS) 130, a branch address calculator (BAC) 128, a register alias table (RAT) 132, and an allocator (ALLOC) 134. The issue cluster 114 converts a stream of macro instructions into micro instructions or micro operations (micro-ops) in the ID 126. In one embodiment, the ID 126 decodes macro instructions compatible with the Intel® Architecture Microprocessor. However, the ID 126 may be constructed to decode instructions for any CISC or RISC instruction set, including but not limited to PowerPC™, Alpha™, etc., without deviating from the spirit and scope of the invention.

For macro instructions requiring long microcode flows for decoding, the MS 130 is utilized to sequence the macro instructions. In general, the BAC 128 calculates branch target addresses based on predictions from the BTB 124, and the RAT 132 performs register renaming by mapping logical registers to physical registers in the ROB 136. The ALLOC 134 assigns and tracks resources for operation for the out-of-order cluster 116 and memory cluster 120.

The out-of-order cluster 116 contains the reservation station (RS) 138 and reorder buffer (ROB) 136 as shown in FIG. 1. The ROB 136 includes a real register file (RRF) that defines the architectural register set for the microprocessor. In one embodiment, the architectural register set is compatible with the Intel® Architecture Microprocessor. However, the architectural register set may be compatible with any microprocessor, including but not limited to PowerPC™, Alpha™, etc., without deviating from the spirit and scope of the invention.

In general, the out-of-order cluster 116 receives micro-ops from the issue cluster 114. The out-of-order cluster 116 merges the in-order stream of micro-ops with corresponding source data provided by the ROB 136 and captured in the RS 138. The processor of the present invention utilizes a data flow architecture. In order to implement the data flow architecture, the out-of-order cluster 116 performs a ready/schedule, dispatch, and retirement operations. In order to perform the ready/schedule function, the RS 138 identifies all ready to execute micro-ops, and selects certain micro-ops for dispatch to the execution cluster 118. The micro-ops are executed in an execution unit in the execution cluster 118, and result data is written back to the out-of-order cluster 116. The ROB 136 retires the micro-ops, by transferring the result data to the real register file, in the original program order.

In order to perform the issue function implemented in the issue cluster 114, control information is written in allocated ROB 136 entries and an associated ready bit is cleared. For each micro-op, an op code, source data, source/destination addresses, and other control information are written into allocated RS 138 entries. Source data for the execution units originates from either the ROB 136 or a real register contained within the ROB 136 functional unit. Consequently, source data entries in the RS 138 contain a bit to identify whether the source data is stored in the ROB 136 or in the real register file. The validity bit in the ROB 136 indicates whether the corresponding source data entry is valid.

Specifically, in order to schedule micro-ops for the execution units in the execution cluster 118, the RS 138 ascertains which micro-ops are data ready by evaluating a corresponding data valid bit for each source data. The RS 138 then determines availability of execution units for data ready micro-ops, and schedules the micro-ops based on a priority pointer. For the scheduled micro-ops, the RS 138 dispatches the micro-ops and associated source data to the appropriate execution unit.

Upon completion of execution of micro-ops in the execution cluster 118, the execution units transmit pointer addresses to the ROB 136 prior to writing the actual result data. The pointer addresses identify ROB 136 entries that are the destinations for the writeback data results. Subsequently, the execution unit writes result data to the specified ROB 136 entry. The RS 138 snoops a write back bus 139 so as to capture data required for other micro-ops.

In order to perform the retirement function, a number of consecutive entries are read out of the ROB 136 based on the physical destination identifications. The entries read from the ROB 136 are candidates for retirement. A micro-op is a candidate for retirement if a corresponding ready bit is set, the micro-op does not cause an exception, and all preceding micro-op candidates, in the original program order, are eligible for retirement. When a micro-op is eligible for retirement, the RAT 132 is notified to update the look-up table, and data are transferred from the ROB 136 to a real register file (RRF). In addition, a retirement pointer is incremented in the ROB 136 to indicate that the ROB entry has retired.

In one embodiment, the execution cluster 118 contains four semi-autonomous units: an address generation unit (AGU) 146, an integer execution unit (IEU) 144, a floating point execution unit (FEU) 142, and a memory interface unit (MIU) 140. Although the execution cluster 118 is described in conjunction with four execution units, the execution cluster 118 may comprise any number and type of execution unit without deviating from the spirit and scope of the invention.

The AGU 146 supports the segmentation addressing for the Intel® microprocessor architecture by calculating an effective address. In order to support segmentation for the Intel® architecture microprocessor, the AGU 146 contains the segment register file. The processor of the present invention is superscalar in that the IEU 144 contains two arithmetic logic units (ALUs) to add, subtract, shift and perform logical operations on source operands. In addition, the IEU 144 contains a jump execution unit for branch prediction calculations. The FEU 142 provides floating point support for the processor. The MIU 140 provides an interface for all memory transactions including executing floating to integer conversions, integer to floating conversions, such as converting one floating point data type to another.

The memory cluster 120 supports the out-of-order dispatch operation of the present invention. In one embodiment of the present invention, the memory cluster 120 includes page miss handler (PMH) 152, memory order buffer (MOB) 150, data translation lookaside buffer (DTLB) 154, and data cache unit (DCU) 148 as shown in FIG. 1. In addition, the memory cluster 120 operates in conjunction with the AGU 146 and the MIU 140. The memory cluster 120 contains a memory dispatch bus 151 and a writeback bus 139.

As discussed above in conjunction with the execution cluster 118, the AGU 146 generates the appropriate linear address for memory operations. The DTLB 154 translates the linear address into a physical address. If a page miss occurs, then the DTLB 154 forwards the page miss to the PMH 152. In response, the PMH 152 performs "page walking" and other well-known page miss handling functions. In general, the MOB 150 buffers all store and load operations, and controls dispatching of the load and store operations. In addition, the MOB 150 tracks the progress of memory operations through execution, and retires the memory operations, when appropriate, by committing results to a memory state. Upon retirement of a store operation, the MOB 150 dispatches the store operation in a "background" mode of operation at the convenience of the memory system.

The memory cluster 120 supports speculative execution. Because some memory operations cannot execute speculatively, the MOB 150 monitors and subsequently dispatches non-speculative operations at the correct time. For example, the MOB 150 snoops the source addresses of instructions fetched, and signals the bus cluster 110 to stall an instruction fetch whenever the source address instruction being fetched substantially matches any of the addresses of the store destinations of the buffered stored instructions.

As discussed above, the processor of the present invention utilizes a data flow architecture, such that operations are postponed until the corresponding data operands are available. Consequently, when the data operands are available, operations are executed, potentially out-of-order. The data operand dependency is tracked on a register basis, such that if previous values of a register are computed, then the data operand dependencies are satisfied. However, memory operations have implicit dependencies. For example, load operations have a dependency on any previous store operation having a common address with the load operation. The MOB 150 stores speculative memory operations, both load and store operations, so as to avoid dispatching stale data to system memory, and consequently producing incorrect results.

In order to maintain self consistency between load and store operations, the processor of the present invention employs a concept known as store coloring. The store coloring scheme is utilized to maintain an ordering consistency between loads and stores of the same processor. Each load operation is tagged with a store buffer identification (ID) corresponding to the previous store. The store buffer ID represents the relative location of the load compared to all stores in the execution sequence. When the load executes in the memory cluster 120, the MOB 150 utilizes the store buffer ID as the beginning point for analyzing the load against all older stores in the buffer. When a memory operation is dispatched but cannot complete due to an address or resource conflict, the MOB 150 blocks the operation and stores dependency information. When the blocking source is removed, the MOB 150 again dispatches memory operations.

In computer systems utilizing multi-processors, order consistency problems also occur. If load operations execute out-of-order, the load operation can effectively make another processor store operation appear out-of-order. For example, if a second load operation executes prior to a first load operation, and the first load operation appears before the second load operation in the original program order, then the load operations appear out-of-order to the original program order. In this case, the second load operation retrieves old data, while the first load operation, once executed, may possibly read new data written by another processor. If allowed to commit to memory state, the load operations would violate processor ordering. In order to prevent the violation, the MOB 150 snoops all data writes on the bus. Consequently, if another processor writes a location that was speculatively read, the load and subsequent operations are cleared and reexecuted to retrieve the correct data.

The bus cluster 110 provides a bus interface function for the processor 100. However, the bus interface function may be accomplished through any bus interface without deviating from the spirit and scope of the invention. In one embodiment, the bus interface function is implemented with a transactional oriented bus. As shown in FIG. 1, the processor 100 interfaces with a level two (L2) cache 156 via a cache bus or backside bus 160, and the processor 100 interfaces with other external devices, such as main memory, via an external bus 158. In one embodiment, the bus cluster 110 contains external bus logic (EBL) 106 for interfacing the processor core to the external bus 158, and backside bus logic (BBL) 108 for interfacing the processor core to the backside bus 160 and the L2 cache 156. In addition, the bus cluster 110 contains a programmable interrupt controller (PIC) for servicing interrupts.

Figure 2:
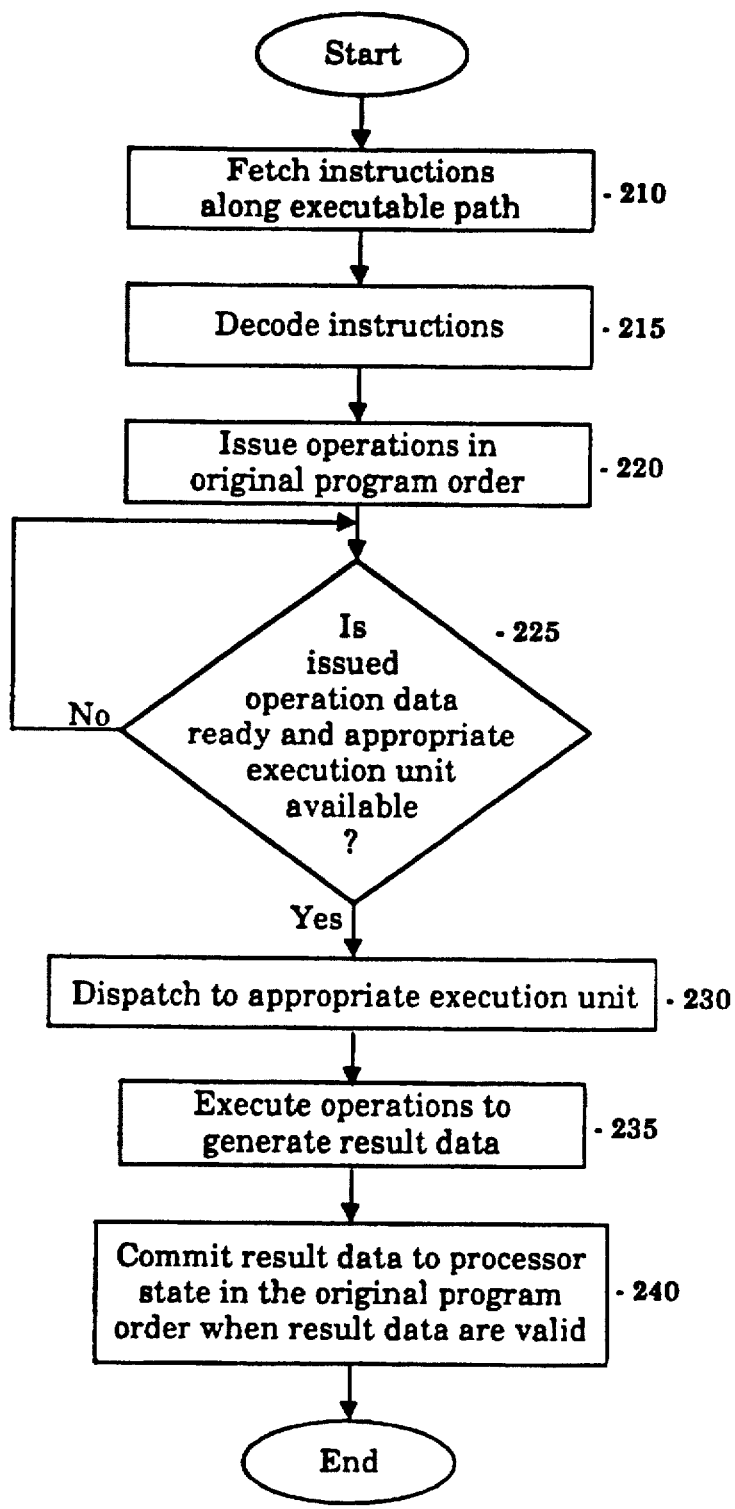
FIG. 2 is a flow diagram illustrating a method for the processor of the present invention.

FIG. 2 is a flow diagram illustrating a method for the processor of the present invention. In block 210, the processor fetches instructions along the executable path of the program. The instructions are decoded as shown in block 215. In block 220, operations, equivalent to the decoded instructions, are issued in the original program order. The present invention method implements self scheduling such that when the issued operations are data ready and an appropriate execution unit is available, operations are dispatched to the execution unit as shown in blocks 225 and 230. In block 235, the result data are generated in the execution unit, and in block 240, the result data is committed to processor state when the result data are valid.

As discussed above, in one embodiment of the present invention, the processor of the present invention is constructed as a superpipelined processor. In a "deeply" pipelined processor, the major stages of a pipelined processor such as instruction fetch, instruction decode, and instruction execute, are divided into several different substages such that each processing stage is pipelined, resulting in a long instruction pipeline.

FIG. 3 illustrates a set of pipeline stages that define a deeply pipelined processor configured in accordance with one embodiment of the present invention. In the instruction pipeline of FIG. 3, the instruction processing is divided into 11 pipeline stages. A brief description of each of the pipestages follows. However, a complete description of the pipeline substages, and the associated functional units is described more fully below.

In general, the first three pipestages are dedicated to the processor fetch operation. During pipestage 1, the IFU 122 executes an instruction cache look-up to fetch a macro instruction for processing. During pipestage 2, the IFU 122 performs instruction length decoding by marking the macro instructions appropriately. During pipestage 3, the IFU 122 rotates the macro instructions based on the fetch instruction pointer and the number of instructions consumed by the ID 126. The decode function, performed in the ID 126, are executed during pipestages 4 and 5.

During pipestage 6, the register rename function is performed in the RAT 132. In addition, the ALLOC 134 assigns resources, and the RS 138 receives the first half of micro-ops. During pipestage 7, sources are read from the ROB 136, and the second half of the micro-ops are received at the RS 138. Also during pipestage 7, the RS 138 schedules data ready micro-ops for dispatch to available execution units. During pipestage 8, the RS 138 dispatches micro-ops to the appropriate execution units in the execution cluster 118. During pipestage 9, the execution units execute the micro-ops dispatched, and the write back results are written to the ROB 136. During pipestages 10 and 11, the ROB 136 executes a two stage retirement function, thereby completing the high level pipeline stages.

Instruction Fetch Unit (IFU)

Figure 4:
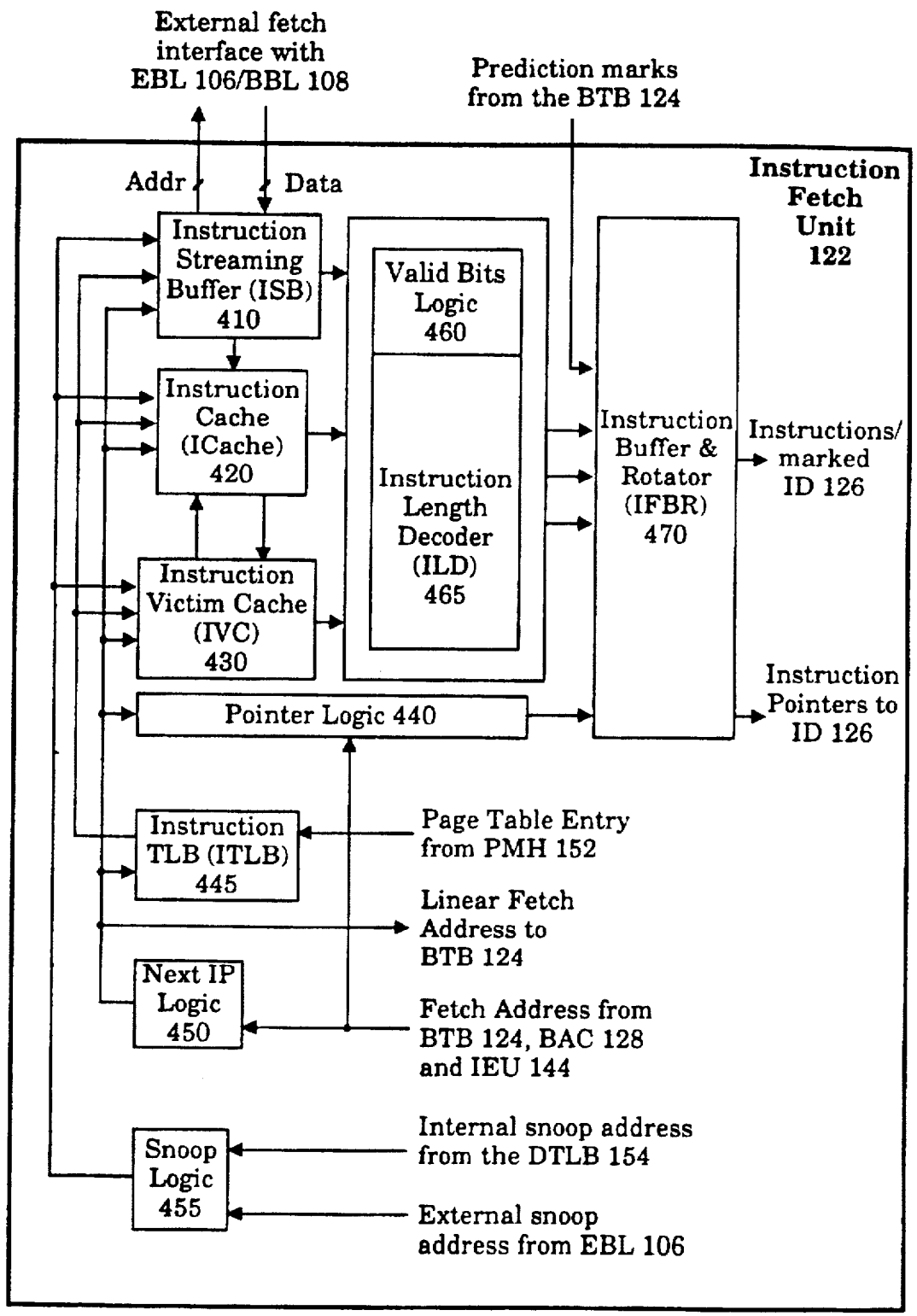
FIG. 4 illustrates a block diagram of an instruction fetch unit configured in accordance with one embodiment of the present invention.

FIG. 4 illustrates a block diagram of instruction fetch unit 122 configured in accordance with one embodiment of the present invention. As shown in FIG. 4, the IFU 122 interacts with the EBL 106, BBL 108, ID 126, BAC 128, BTB 124, and IEU 144. The IFU 122 sends external instruction fetch requests to the EBL 106, and in return, receives macro instruction from the BBL 108. The IFU 122 transmits the macro instructions to the ID 126. In one embodiment, the IFU 122 supplies macro instructions compatible with the Intel® architecture microprocessor. The IFU 122 receives branch predictions from the BTB 124 and BAC 128, and receives branch mispredictions from the IEU 144 and BAC 128. The prediction and misprediction information is utilized by the IFU 122 to determine an address for the next instruction.

In order to effectively supply the issue cluster 114 with a continuous stream of instructions, the IFU 122 requires sophisticated hardware. In one embodiment, the IFU 122 contains a three level memory hierarchy including an instruction streaming buffer (ISB) 410, an instruction cache (I Cache) 420, and an instruction buffer (470) that minimizes delays in delivering instructions to the ID 126. In addition, the IFU 122 contains an instruction victim cache (IVC) 430 to further reduce the effect of conflict misses, and to store a copy of all instructions in the IFU 122 prior to completion in the processor. The IFU 122 also includes an instruction length decoder 465 to facilitate steering of variable length macro instructions to particular areas of the ID 126. Finally, the IFU 22 contains an instruction translation look-aside buffer (ITLB) for facilitating address translation when paging is enabled.

The instruction cache (I Cache) 420, the instruction streaming buffer (ISB) 410, and the instruction victim cache (IVC) 430 are accessed in parallel. A linear fetch address is generated by the next instruction pointer (IP) logic 450 based on inputs from the BTB 124, BAC 128 and IEU 144. The linear fetch address is utilized to access the ISB 410, I Cache 420 and IVC 430. The ISB 410, I Cache 420 and IVC 430 contain physical tags, thereby requiring address translation from the linear address to a physical address. The instruction translation look-aside buffer (ITLB) 445 receives a page table entry from a page miss handler (PMH) 152 to translate the linear address into a physical address. If a page miss occurs, then the ITLB 445 forwards the page miss to the PMH 152. In response, the PMH 152 performs "page walking" and other well-known page miss handling functions.

The address fetched during pipestage 13 of the IFU 122 is a linear address and not a virtual or physical address. Consequently, the IFU 122 prefetches instructions while delaying segment limit violations. The segment limit checking is executed further down in the processor (e.g. AGU 146). However, the IFU 122 performs a paging function. When paging is turned off, the linear fetch address, selected in pipestage 13, is identical to the physical address, and is thereby directly used to search all caches/buffers in the subsequent pipestage. However, when paging is turned off, the linear address is translated by the ITLB 445 into a physical address. In addition to providing address translation, the ITLB 445 classifies each address as being cacheable or not. When a miss occurs in the ITLB 445, the ITLB 445 obtains information from the PMH 152. When paging is turned off, the PMH 152 returns the linear page address as the physical page address to the ITLB 445.

The linear fetch address, used for accessing the ISB 410, I Cache 420, and IVC 430, is selected by the next IP logic 450. If a hit occurs in one of the three caches/buffers, then instruction bytes are read out of the respective cache/buffer, and transmitted to the instruction length decoder 465 for marking. The valid bits logic 460 marks the instruction as being valid or invalid. The IFBR 470 generates instruction pointers that generate two address pointers utilized in the computation invalidation of branch targets. The instruction pointers are stored in the IFBR 470. If a miss occurs in each of the three caches/buffers, then the ISB 410 initiates miss processing by transmitting an external fetch request to the EBL 106. In response, the BBL 108 transmits miss data to the ISB 410.

Cache lines are written from the ISB 410 to the I Cache 420. When a cache miss to the I Cache 420 occurs, a victim line is identified for replacement and saved in the IVC 430. When a cache hit occurs in the IVC 430, a victim line is returned to the I Cache 420. When an ITLB 445 miss occurs, such that the ITLB 445 is unable to produce a physical address, the ITLB 445 initiates miss processing by sending an ITLB fill request to the PMH 152. In addition, the ITLB 445 requests the ID 126 to insert a special ITLB miss micro-op into the instruction stream. Consequently, the PMH 152 delivers the missing page table entry to the ITLB 445. The special ITLB miss micro-op facilitates in fault signaling. The snoop logic 455 receives snoop requests and associated addresses from the data translation look-aside buffer (DTLB) 154 and the EBL 106, and, in response, dispatches requests to the I Cache 420, IVC 430, and ISB 410.

Figure 5:
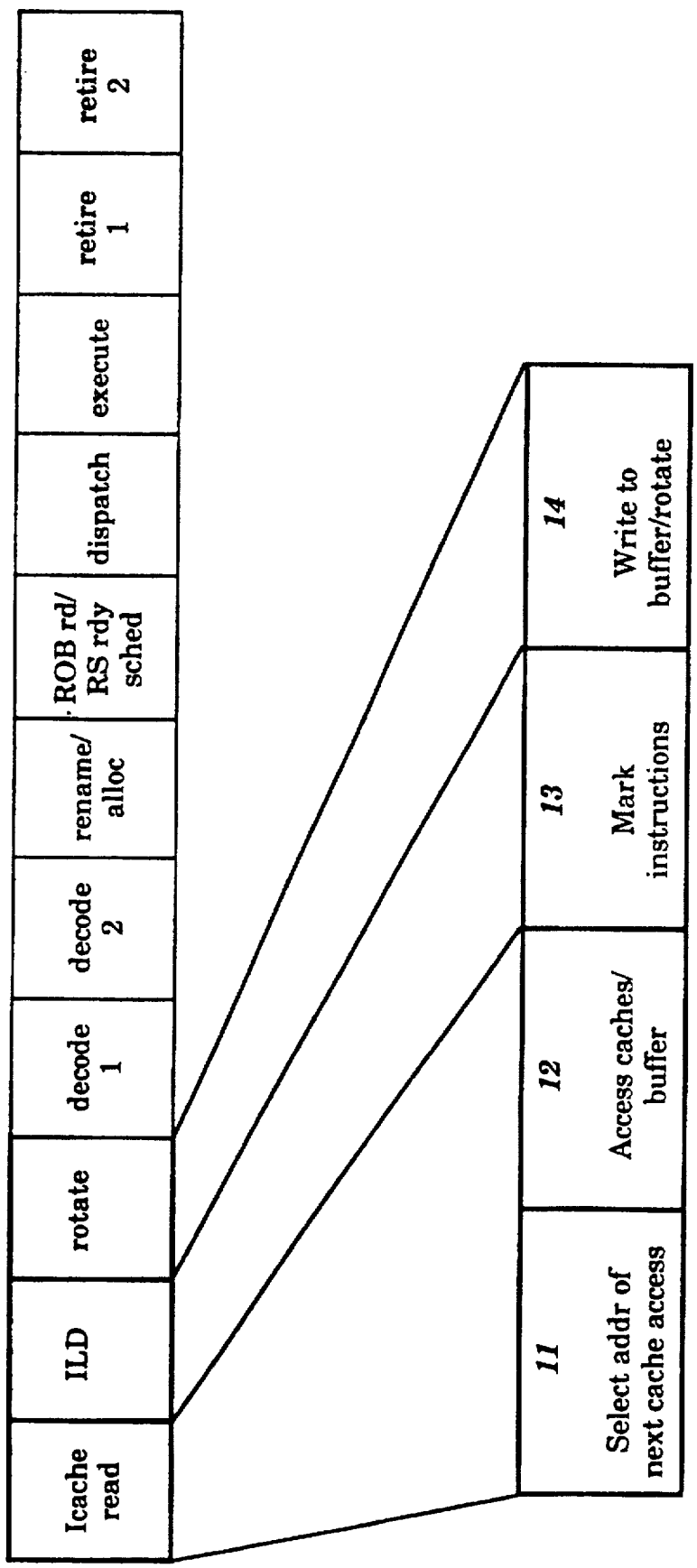
FIG. 5 illustrates the operation of the instruction fetch unit in one embodiment for a pipelined processor of the present invention.

FIG. 5 illustrates the operation of the IFU 122 in one embodiment for a pipelined processor of the present invention. In pipestage 11, the IFU 122 selects the address of the next cache access to the I Cache 420. The address is selected based on fetched requests arriving at the IFU 122 from the BTB 124, BAC 128, and IEU 144. The IFU 122 selects the fetch request containing the highest priority, and schedules the request for service during the next pipestage. In pipestage 12, the IFU 122 accesses the ISB 410, I Cache 420, IVC 430 (caches/buffers) utilizing the fetch address selected during the previous pipestage. If a hit occurs in any of the caches/buffers, then instructions are read out and forwarded to a subsequent pipestage. Alternatively, if there is a miss in all of the caches/buffers, then an external fetch is initiated by sending a request to EBL 106. Also, the ITLB 445 is accessed to obtain the physical address and memory type of the fetch.

Figure 8:
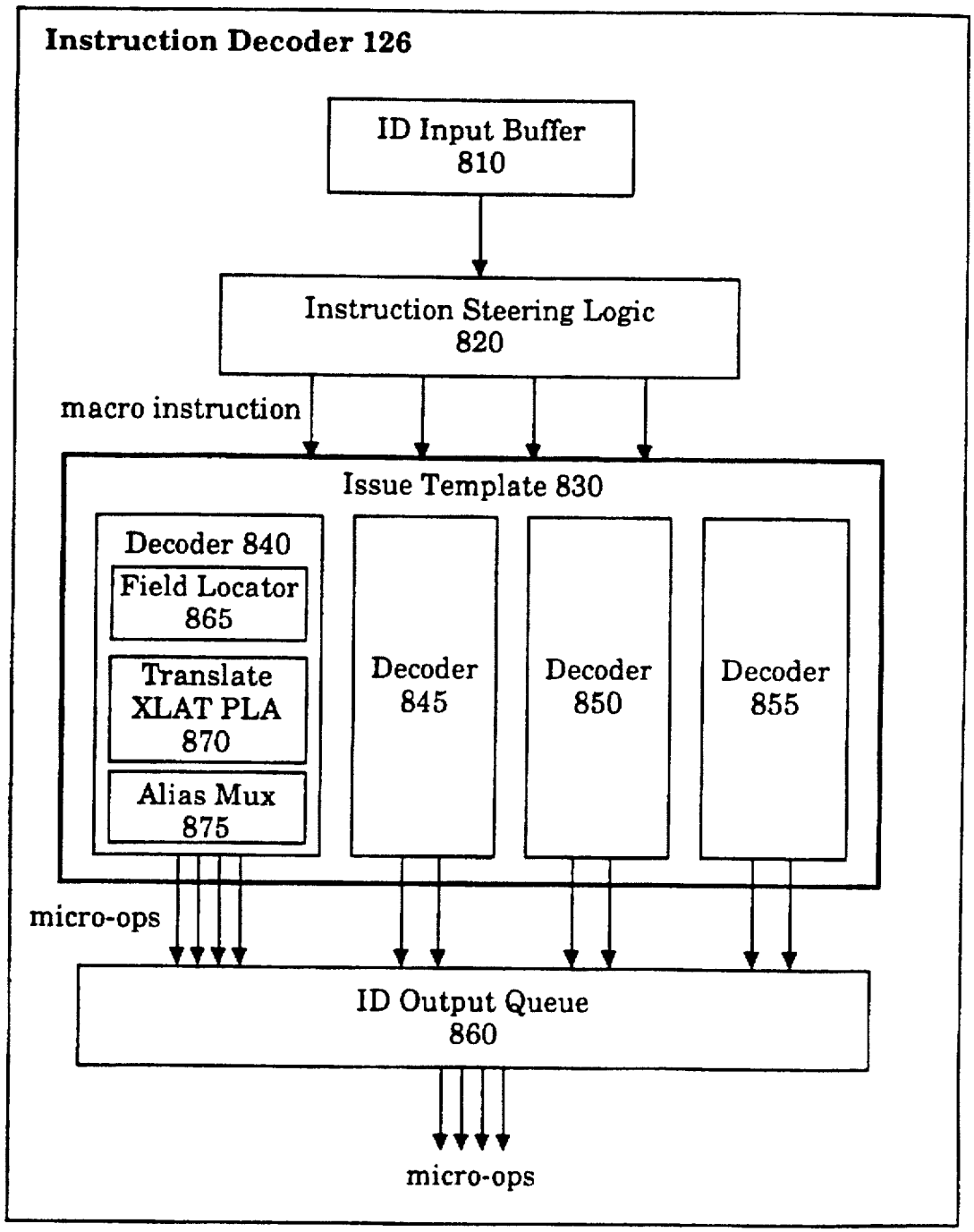
FIG. 8 illustrates a block diagram of an instruction decoder configured in accordance with one embodiment of the present invention.

Also during pipestage 12, the fetch address is utilized to access the BTB 124 and ITLB 445. In pipestage 13, the IFU 122 marks the instructions received from the previous stage in the instruction length decoder (ILD) 465. Marking instructions includes determining instruction boundaries in identifying invalid instruction bytes. Additional marks, indicating predicted branches, are input to the instruction buffer and rotator (IFBR) 470 from the BTB 124. In pipestage 14, instructions and corresponding marks are written into the IFBR 470 and delivered to the ID 126. Instruction delivery to the ID 126 is based on space availability in an ID input buffer 810 (FIG. 8).

Branch Target Buffer (BTB)

The branch target buffer (BTB) 124 is contained within the instruction fetch cluster 112 as shown in FIG. 1. In general, the function of the BTB 124 is to predict macro branch instructions early in the processor instruction pipeline so as to prevent the processor from executing instructions down a wrong path. In one embodiment, the BTB 124 predicts branches in branch instructions compatible with the Intel® Architecture Microprocessor. However, the BTB 124 may be constructed to predict branch instructions for any CISC or RISC instruction set, including but not limited to PowerPC™, Alpha™, etc., without deviating from the spirit and scope of the invention.

In order to effectively fetch a steady stream of instructions in the IFU 122, the BTB 124 predicts a decision of a branch instruction. However, the prediction may be wrong, and, consequently, the processor detects the misprediction and corrects for the misprediction by fetching instructions in the correct path. Specifically, all branch predictions made by the BTB 124 are verified downstream by either the branch address calculator 128, or a jump execution unit located in the integer execution unit 144.

The BTB 124 receives, as an input, the starting linear address of the current instruction being fetched. Based on the starting linear address, the BTB 124 produces a prediction and target address of the branch instruction being fetched. The prediction and target address information is transmitted to the IFU 122 and the path of instruction fetch is redirected if the BTB 124 predicts a branch is taken. Branches are also speculatively updated in the same cycle that the BTB prediction is made.

Figure 6:
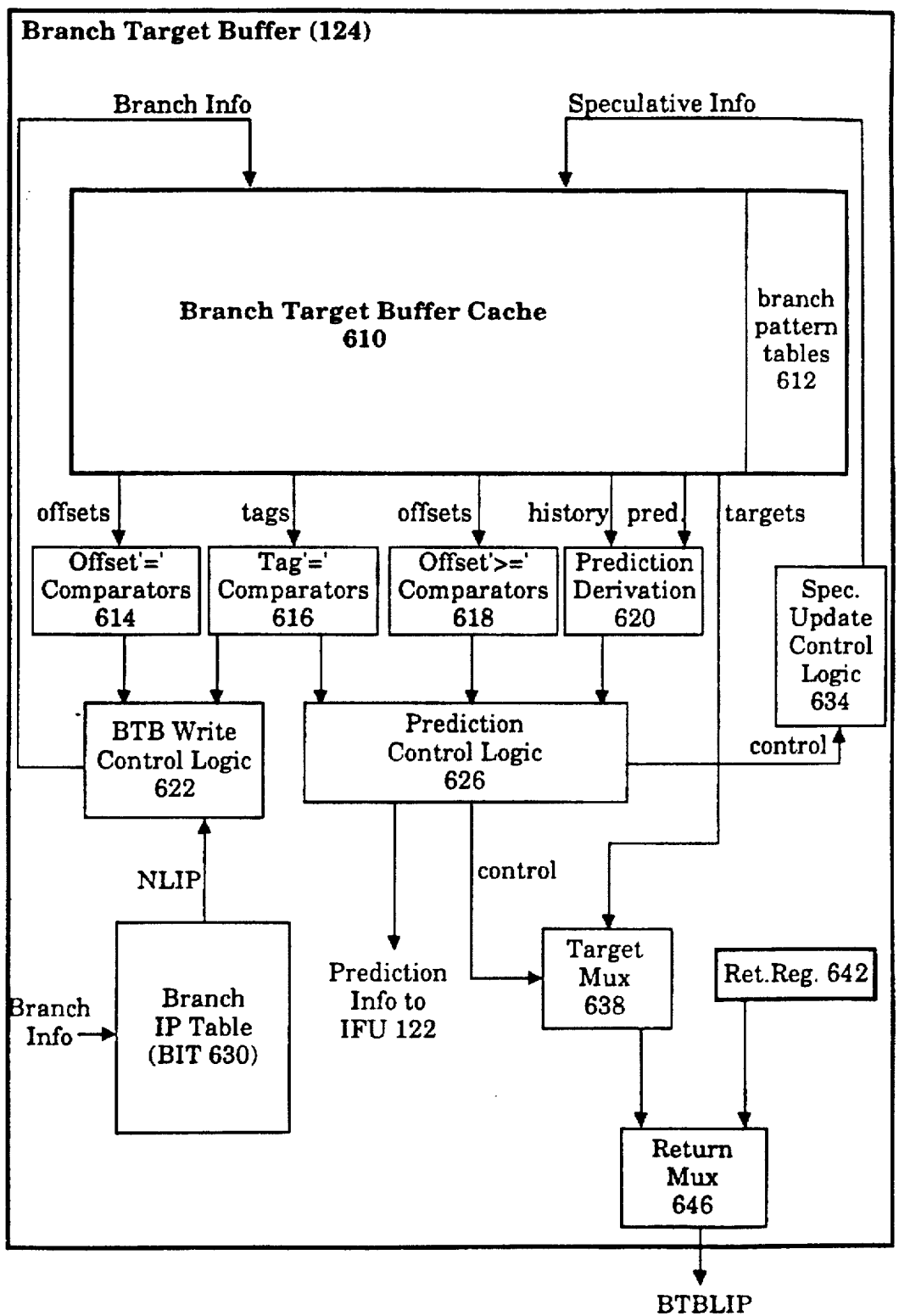
FIG. 6 illustrates a block diagram of a branch target buffer configured in accordance with one embodiment of the present invention.

FIG. 6 illustrates a block diagram of the BTB 124 configured in accordance with one embodiment of the present invention. The BTB 124 contains a branch target buffer (BTB) cache 610, and a branch instruction pointer table (BIT) 630. The BTB cache 610 is utilized to allocate or update branch instruction information upon resolution of the branch instruction outcome. The BTB cache 610 contains branch information about branch instructions that the processor has previously executed. In one embodiment, each set of branch information in the BTB cache 610 contains four branch entries, wherein each branch entry contains information about a single branch instruction that the processor has previously executed. Each set of branch entries within the BTB cache 610 also includes a branch pattern table 612, and a pair of pseudo-least recently replaced (PLRR) bits. The BTB 124 utilizes the branch pattern table 612 for predicting the outcome of conditional branch instructions in the set of branch entries. The BTB 124 utilizes the pseudo-least recently replaced (PLRR) bits to select a branch entry in the set when information about a new branch will be written into the set of branch entries.

In addition, each branch entry contains a hashed tag address, a block offset, a branch type, a true branch history, a speculative branch history, a speculation bit, a valid bit, and a branch target address. The hashed tag address and the block offset are used to identify a memory address of the branch instruction associated with the branch entry. The branch type field specifies the type of branch instruction the branch entry identifies. The BTB 124 utilizes the branch type field when making a branch prediction. The true branch history field maintains the "taken" or "not-taken" history of the branch instruction as determined by the jump execution unit. The speculation bit and the speculative branch history field are utilized to make predictions for branch instructions without waiting for branch instructions to execute by maintaining the "speculative" taken or not-taken history of the branch instruction. The valid bit indicates whether the branch entry contains valid branch information.

In one embodiment of the present invention, the branch prediction is implemented in a four stage branch resolution mechanism. The first stage of the four stage branch resolution mechanism comprises a branch prediction stage. The branch prediction stage predicts the existence of branch instructions within the instruction stream. The branch prediction stage also predicts the outcome of the predicted branch instructions utilizing only the current instruction pointer. By predicting the existence of branch instructions within the instruction stream, the processor pre-fetches a stream of instructions without waiting for each instruction to execute.

The second stage of the branch resolution mechanism is a branch instruction decode stage. The branch instruction decode stage decodes each branch instruction to verify the branch predictions made during the branch prediction stage. The branch instruction decode stage predicts branch outcomes for branch instructions that were not predicted during the branch prediction stage. The branch instruction decode stage stores information about each branch instruction in the BTB cache 610. The BTB cache 610 is accessed after the branch instruction is executed.

The third stage of the branch resolution mechanism is a branch execution stage. The branch execution stage executes each branch instruction so as to generate a final branch outcome and a final branch target address. If either of the two previous branch processing stages mispredicted a branch, the branch execution stage flushes the front-end of the processor, causing the IFU 122 to start fetching instructions from the corrected address.

The fourth and final stage of the four branch resolution mechanism is a branch retirement stage. The branch retirement stage is responsible for retiring each branch instruction and ensuring that no instructions fetched after a mispredicted branch are executed and committed into permanent state.

The BTB cache 610 contains information about branch instructions previously executed in the processor. The BTB 124 utilizes the information in the BTB cache 610 to recognize branch instructions and predict the branch instruction outcome. The BTB 124 also maintains the BIT 630. The BIT 630 contains information about branch instructions that are currently within the processor. The information in the BIT 630 is used to correct mispredicted branch instructions and maintain the BTB cache 610 after the branch instructions have been executed.

In operation, the IFU 122 requests information about upcoming branch instructions from the BTB 124 by passing an instruction pointer to the BTB 124. The instruction pointer passed to the BTB 124 points to a memory block currently being fetched by the IFU 122. The BTB 124 searches the BTB cache 610 for information about branch instructions in the memory block currently being fetched by the IFU 122. The BTB 124 makes a branch prediction for any branch instructions located in the memory block currently being fetched by the IFU 122 and located in the BTB cache 610. The BTB 124 passes the branch prediction information to the IFU 124, thereby informing the IFU 122 about any branch instructions in the memory block currently being fetched.

In order to maintain the BTB cache 610 and the BIT 630, the BTB 124 receives information from several other functional units in the processor. The instruction decoder 126 transmits branch information to the BTB 124. The branch information sent by the instruction decoder 126 includes the address of the instruction immediately following the branch instruction. The BTB 124 stores the address of the instruction immediately following the branch instruction into the BIT 630 for later use.

The branch address calculator 128 validates branch predictions made by the BTB 124. If the branch address calculator 128 determines that the BTB 124 made a branch prediction for a nonexistent branch, then the branch address calculator 128 instructs the BTB 124 to deallocate an entry in the BTB cache 610 containing the nonexistent branch instruction.

The allocator 134 allocates a reorder buffer 136 entry for each micro-op issued. When the allocator 134 allocates a physical destination (Pdst) entry in the reorder buffer 136 for a branch micro-op, the allocator 134 provides the Pdst entry number to the BTB 124. The BTB 124 utilizes the Pdst entry number to allocate a corresponding entry in the BIT 630. The corresponding entry in the BIT 630 stores information about the branch micro-op while the branch micro-op is within the processor.

The reservation station 138 stores micro-ops waiting to execute, and dispatches ready micro-ops to execution units in the execution cluster 118. When the reservation station 138 dispatches a branch micro-op to a jump execution unit located in the integer execution unit 144, the reservation station 138 informs the BTB 124 of the Pdst entry for the corresponding branch micro-op. In response, the BTB 124 accesses the corresponding entry for the branch instruction in the BIT 630. The information retrieved from the BIT 630 is utilized after the branch micro-op executes.

The jump execution unit, located within the IEU 144, executes branch micro-ops for the processor. When the jump execution unit executes a branch micro-op, the jump execution unit provides the branch resolution information to the BTB 124. The BTB 124 utilizes the branch resolution information to update an existing entry in the BTB cache 610 or allocate a new entry in the BTB cache 610.

In order to predict a branch outcome for each entry, the BTB 124 reads out a branch type field stored in the BTB cache 610. The BTB 124 handles branch prediction differently depending upon the particular type of branch instruction being predicted. The branch type field designates whether the predicted branch instruction is a conditional, an unconditional, a Call Subroutine, or a Return From Subroutine branch instruction. Although Call Subroutine and Return From Subroutine instructions are specific types of unconditional branch instructions, those two instructions are marked as different types. The BTB 124 marks Call Subroutine and Return From Subroutine instructions as different types since the BTB 124 performs special operations when those two types of branch instruction are predicted.

Table 1 summarizes branch prediction outcomes and target addresses in the BTB 124 for the four types of branch instructions stored within the BTB cache 610.

TABLE 1

| Branch Type | Branch Target Buffer Circuit Action | |
|---|---|---|
| | Branch Outcome Prediction | Branch Target Address Prediction |
| Unconditional Branch Instruction (Other than Call Subroutine or Return From Subroutine) | Predict taken | Predict branch target address from target field in Branch Target Buffer Cache |
| Conditional Branch Instruction | Predict branch outcome using branch history and branch pattern table | Predict branch target address from target field in Branch Target Buffer Cache |
| Call Subroutine Instruction | Predict taken | Predict branch target address from target field in Branch Target Buffer Cache |
| Return From Subroutine Instruction | Predict taken | Predict from Return Register if Return Register valid bit set else predict from RSB using BTB TOS pointer |

As set forth in Table 1, all branch instructions, other than conditional branch instructions, are predicted taken. To predict the outcome of a conditional branch instruction in one embodiment, the BTB 124 utilizes the Yeh & Patt two-level adaptive branch prediction mechanism. (See, Tse Yu Yeh and Yale N. Patt, *Two Level Adaptive Branch Prediction*, The 24th ACM/IEEE International Symposium and Workshop on Microarchitecture, November 1991, pp. 51–61) The two-level Yeh & Patt branch prediction mechanism dynamically maintains two levels of branch history.

The first level of branch history maintained in the two-level adaptive branch prediction mechanism is the taken or not-taken branch history stored within each branch entry. For example, a "not-taken, taken, taken, not-taken" branch history is represented by "0110". In one embodiment, two versions of the branch history are stored in the BTB cache 610: a true branch history and a speculative branch history. The true branch history stores the last four outcomes of the branch instruction as determined by the jump execution unit. The speculative branch history stores the last four outcomes of the branch instruction as predicted by the BTB 124. The speculative history is used to get around the problem of predicting branch instructions within small (or "tight") loops since the true history might not be updated fast enough.

The second level of branch history maintained in the two-level adaptive branch prediction mechanism is the branch pattern history stored in the pattern table 612. The branch pattern history indicates the likely outcome of a branch instruction based upon the previous branch outcomes of the branch instruction with identical branch histories. In one embodiment, the branch pattern history is stored as a two-bit state value for each possible branch history pattern. The two-bit state value classifies branch patterns as strongly taken, weakly taken, weakly not-taken, and strongly not-taken. The branch pattern history is created from previous occurrences of the same branch pattern. Each time a conditional branch instruction is resolved, the branch pattern table is updated.

After the BTB 124 determines the branch outcome for all conditional branch instructions in the ordered set, the BTB 124 searches for the first taken branch instruction. If no branch instructions are predicted taken, then the IFU 122 fetches the next sequential memory block. However, if there is a taken branch instruction in the selected set, then the BTB 124 predicts a branch target address for the first taken branch instruction.

Table 1 describes prediction of a branch target address in the BTB 124 for each type of branch instruction as indicated in the branch type field when the branch instruction is predicted taken. As stated in Table 1, the BTB 124 handles unconditional, conditional, and Jump To Subroutine branch instructions by predicting a branch to the address provided in the branch target address field of the BTB cache 610 entry. However, Return From Subroutine instructions are handled differently. When the BTB 124 predicts a taken Return From Subroutine instruction, the BTB 124 predicts a return address from the return register 642 or from a return stack buffer within the branch address calculator 128.

Figure 7A:
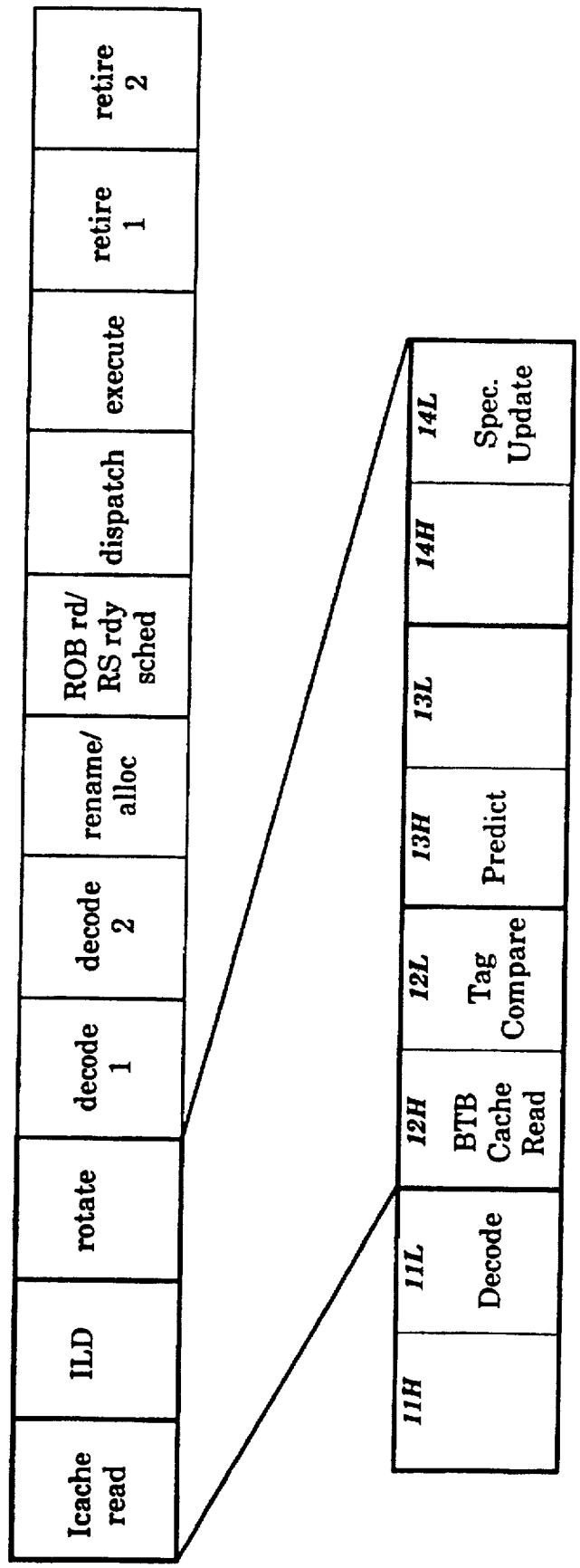
FIG. 7a illustrates a prediction pipeline in the branch target buffer for one embodiment of the present invention.

The BTB 124 operates during four different pipelines: the prediction pipeline, the allocation pipeline, the BIT 30 write pipeline, and the BTB cache 610 write pipeline. The BTB 124 occupies two cycles to generate a branch prediction. FIG. 7a illustrates the prediction pipeline in the BTB 124 for one embodiment of the present invention. The branch prediction pipeline occurs in pipestages 12 and 13. In pipestage 11, the BTB 124 receives the instruction fetch instruction pointer. A subset of the instruction fetch instruction pointer is decoded to access the BTB cache 610. The branch entries are read out of the BTB cache 610 and compared to the tag and offset of the fetch IP in comparators 616, 614 and 618. Based on these comparisons, the BTB 124 predicts all branches being fetched for which the BTB has knowledge up to the first predicted taken branch. The BTB 124 does not predict past the first predicted taken branch because the instruction stream is subsequently redirected to the target of the predicted taken branch.

The BTB 124 takes two cycles to predict a branch. When the BTB 124 predicts a branch taken in pipestage 13, all computation in pipestage 12 is cleared because the program stream is redirected to the target address. Consequently, a branch predicted taken by the BTB 124 results in a one cycle penalty. No penalty results if the BTB 124 predicts the branch not taken. During pipestage 13, the BTB 124 broadcasts the prediction for the branches to the IFU 122. The information is passed to the BAC 128 and utilized to verify the BTB 124 prediction.

In pipestage 14, the BTB 124 speculatively updates the predicted branches in the BTB cache 610. All branches predicted, either taken or not taken by the BTB 124, are speculatively updated by setting a bit. The speculative history is written in a speculative history field in the BTB cache 610 and does not overwrite the true branch history information.

Figure 7B:
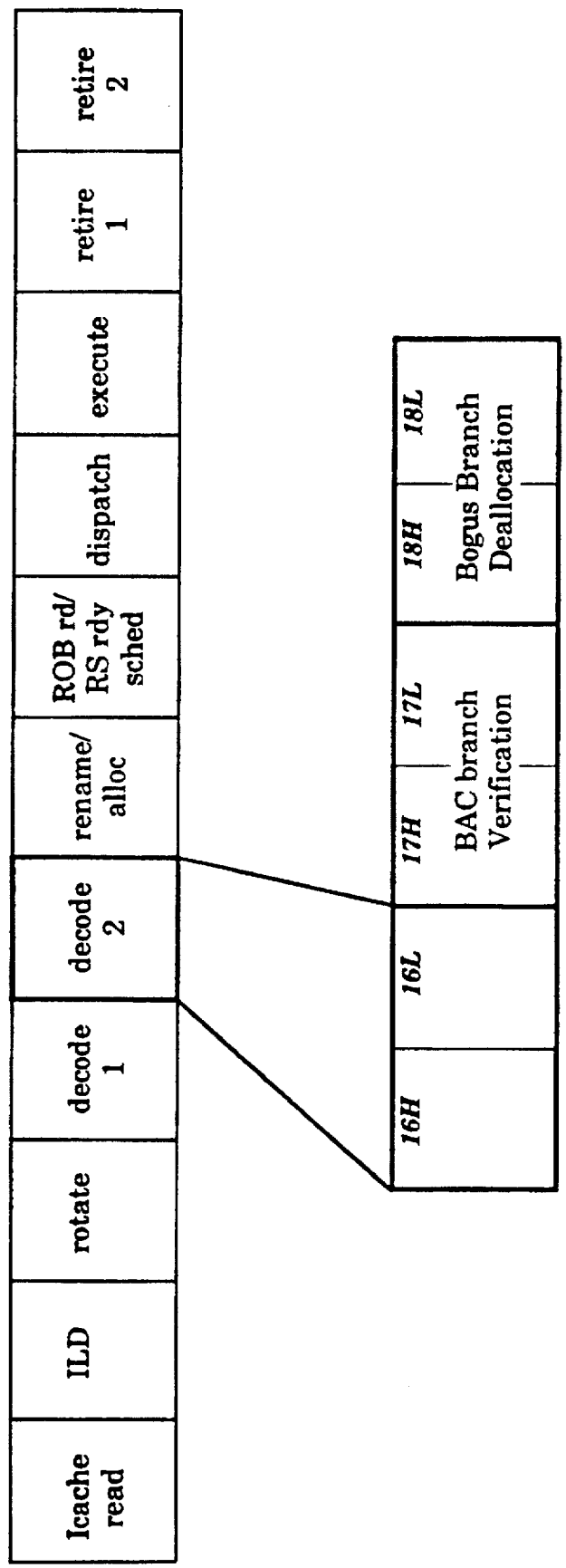
FIG. 7b illustrates a branch target buffer allocation pipeline configured in accordance with one embodiment of the present invention.

FIG. 7b illustrates the BTB allocation pipeline configured in accordance with one embodiment of the present invention. Entries in the BTB cache 610 are deallocated one cycle after the BAC 128 detects an incorrect prediction as shown in FIG. 7b. In response to incorrect predictions, the BAC 128 signals the BTB 124 to eliminate the entry.

Figure 7C:
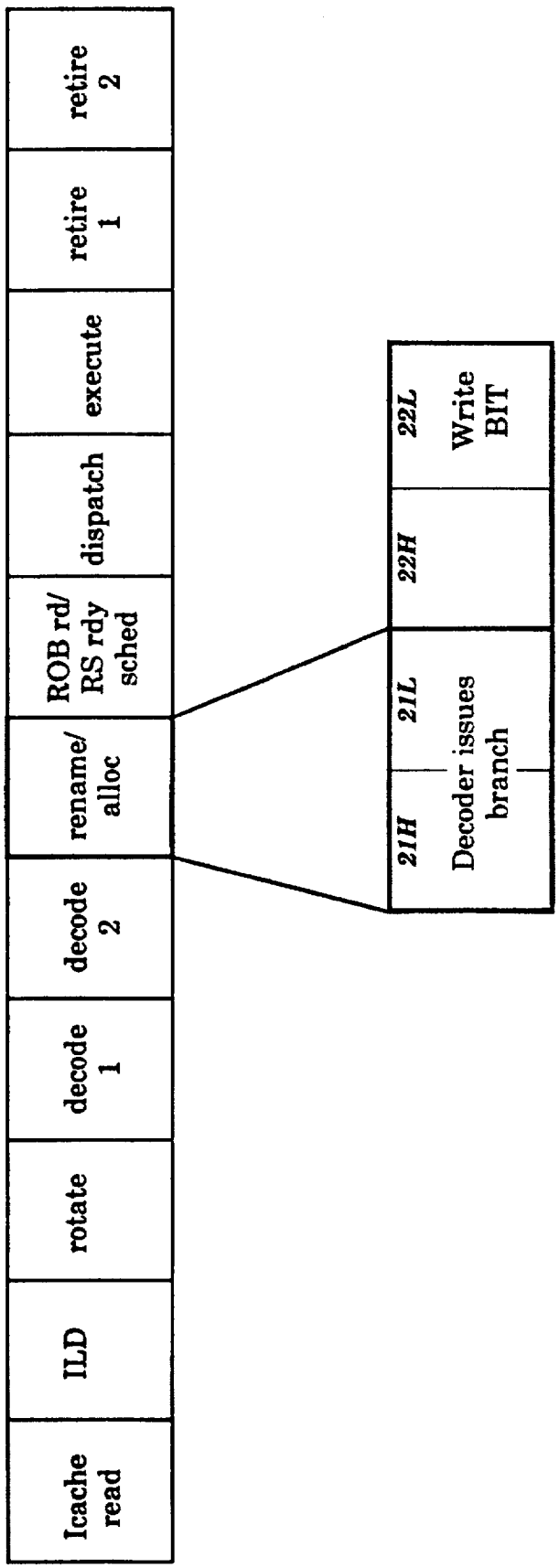
FIG. 7c illustrates a branch instruction pointer table write pipeline configured in accordance with one embodiment of the present invention.

FIG. 7c illustrates the BIT 30 write pipeline configured in accordance with one embodiment of the present invention. In pipestage 21, the allocator (ALLOC) 134 assigns a physical destination (Pdst) to the branch instruction issued from the ID 126. The branch Pdst is utilized to access a BIT 630 entry. The BIT 630 entry is subsequently written to the BTB cache 610 via the write control logic 622. The branch information written in the BIT 630 includes a RSPTOS value and the fall through instruction pointer of the branch instruction. When a branch is subsequently resolved, the fall through instruction pointer is decremented.

Figure 7D:
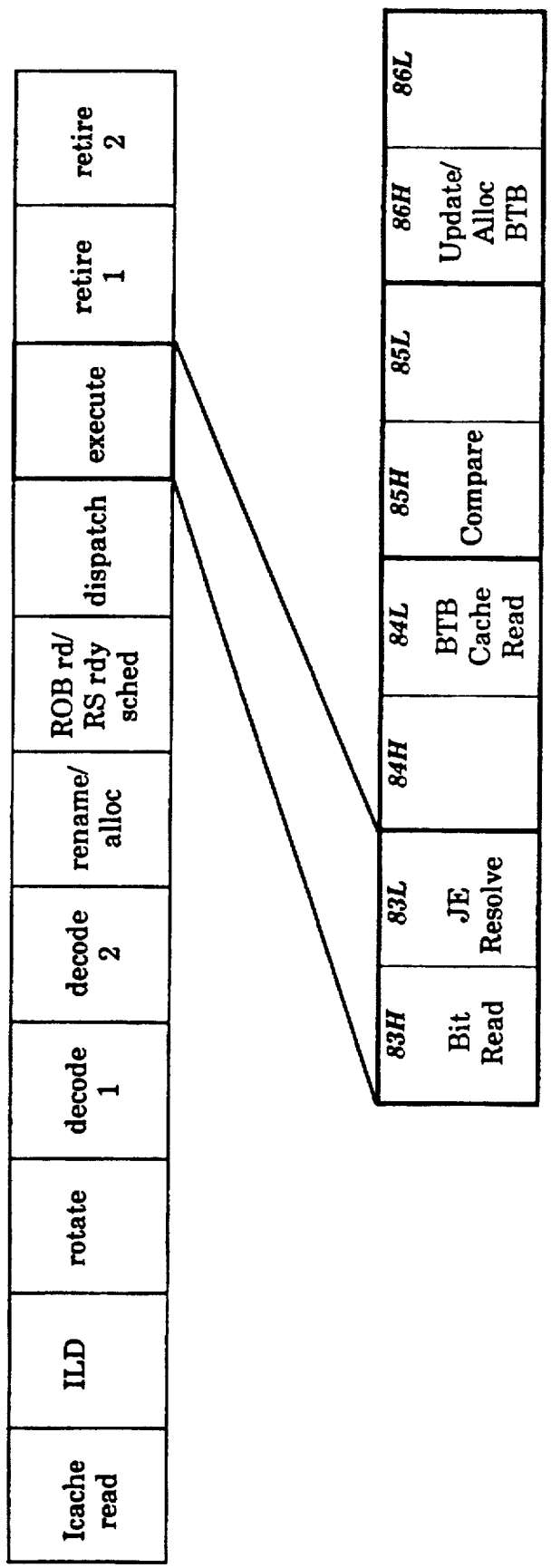
FIG. 7d illustrates a branch target buffer cache write pipeline configured in accordance with one embodiment of the present invention.

FIG. 7d illustrates the BTB cache 610 write pipeline configured in accordance with one embodiment of the present invention. As shown in FIG. 7d, the BTB write pipeline extends from pipestage 83H to pipestage 86H. In pipestage 83H, the branch IP table 630 is accessed. The fall through IP is read out, decremented, and decoded to point to the set that the branch entry will be updated/allocated. In pipestage 84H, the BTB entry is read out. The branch entries are compared with the resolving branch to determine whether a branch hit occurred, and, hence, whether an update or allocate is required. In pipestage 85L, new branch history is calculated, and the branch prediction algorithm is utilized to update the pattern table 612 where an update is required. If the branch requires allocation, the replacement policy is utilized to decide the means for allocating the branch. Finally, in pipestage 86, the branch is written in the BTB cache 610 by the BTB write control logic 622. The pattern table 612 is also updated if necessary.

Instruction Decoder ID

As shown in FIG. 1, the IFU 122 is coupled to the ID 126. In one embodiment, the ID 126 provides multiple decoders to decode multiple macro instructions simultaneously. Each clock cycle, the ID 126 receives macro instructions from the IFU 122. In turn, the ID 126 translates the macro instructions into micro-ops each clock cycle. The ID 126 is also coupled to the BAC 128. The ID 126 sends decoded branch information to the BAC 128. In addition, the ID 126 is coupled to the MS 130. The ID 126 requests microcode operation from the MS 130 for macro instructions requiring long microcode sequences to decode.

FIG. 8 illustrates a block diagram of the ID 126 configured in accordance with one embodiment of the present invention. The ID 126 contains an ID input buffer 810. The ID input buffer 810 allows decoupling of the pipeline architecture of the present invention from the instruction fetch function to the instruction decode functions. As discussed above in conjunction with the description of the IFU 122, a number of marked macro instructions are stored in the ID input buffer 810 to generate a queue of macro instructions for decoding. The ID 126 also contains instruction steering logic 820. The instruction steering logic 820 directs each marked macro instruction to a decoder located within the issue template 830. For the embodiment illustrated in FIG. 8, the ID 126 contains four decoder blocks: 840, 845, 850 and 855. The issue template 830 configuration permits parallel decoding of macro instructions. The decoders 840, 845, 850 and 855 are coupled to an ID output queue 860.

As discussed above, the instruction length decoder 465, located in IFU 122, identifies the last byte of an instruction, and the first opcode byte of the instruction. The instruction length decoder 465 generates mark bits for each instruction byte to allow variable length instructions to be treated as fixed length instructions. The ID input buffer 810 stores the marked macro instructions for decoding. The instruction steering logic 820 utilizes the macro instruction marked bits to transmit macro instructions to decoders 840, 845, 850 and 855 in the issue template 830.

The issue template 830 specifies the number of decoders and the capabilities of each decoder. In one embodiment, certain decoders decode all types of instructions while other decoders decode only particular instructions. In one embodiment, the issue template 830 is configured such that decoder 840 issues up to four micro-ops, and decoders 845, 850 and 855 issue up to two micro-ops per pipestage. Consequently, up to ten micro-ops per clock may be generated in the issue template 830. Although ID 126 is described in conjunction with four decoder blocks, any number of decoder blocks optimized for a particular instruction set may be implemented without deviating from the spirit and scope of the invention.

The operation of each decoder 840, 845, 850 and 855 is dependent upon the particular macro instruction set utilized by the processor. Although the present invention is described in conjunction with the issue template 830 decoding macro instructions compatible with the Intel® microprocessor architecture including decoding of CISC instructions, issue template 830 may be configured to decode any macro instruction set, including a RISC instruction set. In general, each decoder block extracts operand and opcode fields from the macro instruction in a field locator 865, and stores data in alias registers. Each decoder also contains at least one XLAT PLA 870; one PLA for each micro-op that the decoder is capable of producing. The XLAT PLA 870 operates in parallel with the field locator 865, and contains micro code for generating control micro-ops. An alias MUX 875 merges the control micro-ops with data extracted by the field locator 865 to generate the micro-ops. In one embodiment, decoder 830 decodes instructions requiring longer microcode sequencing. Furthermore, macro instructions having greater than four micro-ops summons the MS 130 to sequence the ID 126 during long microcode routines. Once the MS 130 completes the sequencing of the long microcode routines, control is returned to the ID 126. The micro-ops are issued in the original program order.

The output queue 860 decouples the decode pipeline from the out-of-order execution cluster pipeline by buffering the decoded micro-ops. The output queue 860 attempts to provide a steady flow of micro-ops each clock cycle. The output queue 860 permits decoding of instructions even when the out-of-order cluster 116 is stalled. The output queue 860 compensates for the variable number of macro instructions received per clock, the variable number of micro-ops produced per macro instruction, as well as branch effects and stalls.

Figure 9:
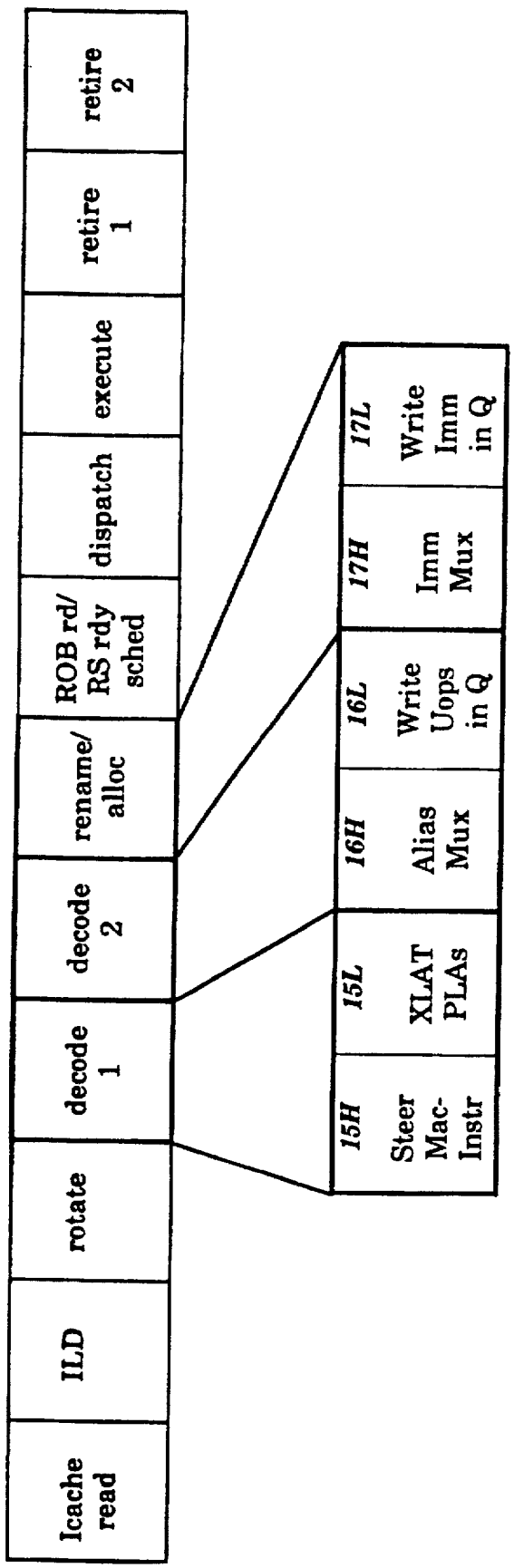
FIG. 9 illustrates pipeline stages for the instruction decoder functions configured in accordance with one embodiment of the present invention.

FIG. 9 illustrates pipeline stages for the instruction decoder functions configured in accordance with one embodiment of the present invention. Macroinstruction decoding occurs during two pipeline stages, 15 and 16. Macro instruction bytes from the IFU 122 are latched into the ID 126 at the start of pipestage 15. The macro instruction bytes are steered to the translate XLAT PLA 870 and field locators 865 during the first half of the clock cycle in pipestage 15. In the second half of the clock cycle in pipestage 15, the XLAT PLAs 870 translate the instructions into the control micro-ops, and the field locators, working in parallel, extract various information from the macro instructions. The data are stored in alias registers. During pipestage 16, control bits within the control micro-op specify any data required from the alias registers, and the required data is merged with the control micro-ops by the alias MUX 875. The newly created micro-ops are input to the ID output queue 860. A natural pipeline break occurs between the output queue 860 and the subsequent portion of the processor 100. The micro-ops are read from the output queue 860, and issued from the instruction decoder 126 when no downstream stalling occurs.

Micro-Instruction Sequencer (MS)

As described above, the MS 130 takes control of instruction decoding requiring long microcode execution flow. In one embodiment, the MS 130 contains a read only memory (ROM) for storage of micro-ops. The MS 130 also provides simple static prediction on micro branches. In each clock cycle, the MS 130 produces a microinstruction pointer (IP) based on requests from ID 126. The new micro IP permits decoding of the macro instructions. When the instruction decoder 126 decodes a macro instruction, zero to four control micro-ops are placed onto a bus that is shared between the MS 130 and decoder 840 in the ID 126. During the clock that the control micro-ops are driven, the ID 126 accesses an entry point in the XLAT PLA 870 to determine whether or not to indicate to the MS 130 that completion of the macroinstruction in the MS 130 is required. If such completion is required, the MS 130 takes control of the bus, and retains control until all of the control micro-ops or the macroinstruction are sent to the ID 126.

In one embodiment, the micro-code ROM in the MS 130 is utilized for control micro-op flows that are longer than four control micro-ops. In addition, the micro-code flows for event and interrupt handlers are stored in the micro-code ROM. However, some micro-code flows less than four control micro-ops long are stored in the micro-code ROM. When the MS 130 is accessed by a decoder, the control micro-ops, addressed by the microinstruction pointer, are read out of the micro-control ROM. The MS 130 is responsible for generating the microinstruction pointer, and actual generation of the microinstruction pointer is based on the particular situation. Once control micro-ops have been read out of the micro-code ROM, the MS 130 decodes the control micro-ops, and utilizes the information to generate control signals for the next cycle. The MS 130 is also accessed for an interrupt or ROB event, and a micro branch misprediction.

Figure 10:
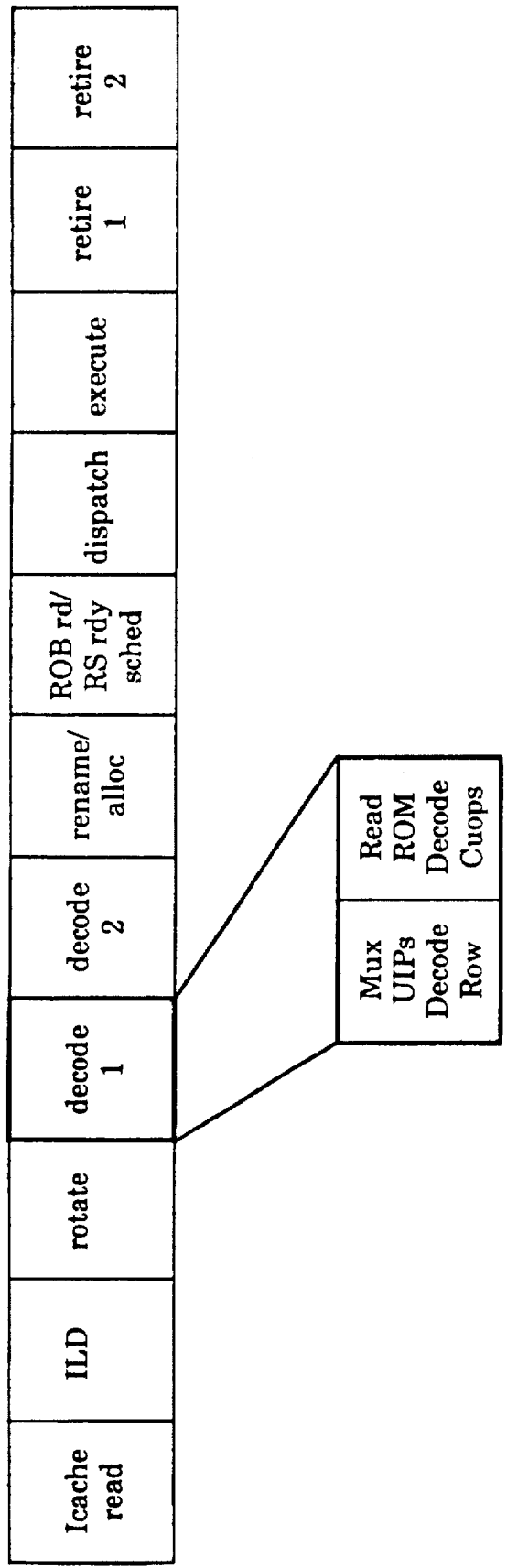
FIG. 10 illustrates the operation of a micro-instruction sequencer in one embodiment of the processor pipeline of the present invention.

FIG. 10 illustrates the operation of the MS 130 in one embodiment of the processor pipeline of the present invention. As shown in FIG. 10, the MS 130 operates during the first decode pipestage. During each cycle that the MS 130 is summoned, the MS 130 generates a micro instruction pointer, and utilizes the micro instruction pointer to access the micro ROM and read out micro-ops. In addition, the MS 130 decodes the micro-ops and forms control signals for the next cycle.

Branch Address Calculator (BAC)

The primary function of the branch address calculator (BAC) 128 is to calculate addresses for certain types of branch instructions, and to verify branch predictions made by the BTB 124. Specifically, the BAC 128 performs branch target and next sequential linear address computations. In addition, the BAC 128 performs static predictions on branches based on the address calculations. Furthermore, the BAC 128 contains a return stack buffer to keep track of the return addresses of the CALL instructions. In general, the BAC 128 serves as a second slower branch predictor than the BTB 124. The BAC 128 attempts to correct any improper prediction made by the BTB 124 to reduce branch misprediction penalties. As shown in FIG. 1, the BAC 128 communicates with the instruction fetch unit (IFU) 122, branch target buffer (BTB) 124, instruction decoder (ID) 126, and the microinstruction sequencer (MS) 130.

The BAC 128 provides a mechanism for verifying branch prediction for those branches whose target can be determined solely from the branch instruction and instruction pointer. When one of these branches misses the BTB cache 610, the BAC 128 statistically predicts the decision and target of that branch. Alternatively, if one of these branches is predicted by the BTB 124, the BAC 128 verifies certain aspects of the prediction. If either the BAC 128 static prediction or branch validation is correct, the mispredicted branch penalty is reduced to five clocks. The BAC 128 receives as inputs the branch displacement contained in the branch instruction from the BTB 124, and the opcode information from the ID 126. From this, the BAC 128 calculates the branch target and "fall-through" linear address. Upon completion of operations, the BAC 128 returns the processed branch instruction to the ID 126. Specifically, the BAC 128 supplies the ID 126 with the NLIP address and current Top Of Stack Pointer (TOS) for each branch instruction.

In one embodiment, the BAC 128 calculates both branch target and next sequential virtual address in accordance with the following equations:

Branch Target=$IFCLIP$+BrOffsetEncode

Next Sequential Linear Address=$IFCLIP$+BrOffsetEncode+BrDispExt wherein,

IFCLIP is the full linear address of the first byte of the 16 instruction bytes passed to the BAC 128 by the IFU 122;

BrOffsetEncode is the offset of the first branch position within the 16 instruction bytes which is encoded from 16 to 15 bits (for a range of 1 to 16), and zero-extended the upper 27 bits;

BrDispExt is the sign extended branch displacement.

In general, the branch target calculation involves adding the branch displacement, contained in the branch instruction, to the linear address of the instruction following the branch instruction. The branch virtual address is obtained by subtracting the code segment base from the branch linear address. For every branch instruction, the BAC 128 also calculates the "fall-through" or next sequential virtual instruction pointer (NLIP). The NLIP is the virtual address of the instruction following the branch. Storing the "fall-through" IP in a virtual address space rather than in a linear address space eliminates an additional micro-op in a CALL micro-op flow. In one embodiment, the IFCLIP is calculated every clock by the IFU 122 as part of the instruction rotator logic in IFBR 470, and subsequently passed to the ID 126 along with the new instruction bytes.

The BAC 128 maintains a return stack buffer utilized as a branch prediction mechanism for determining the target address of return instructions. The return stack buffer operates by monitoring all "call subroutine" and "return from subroutine" branch instructions. When the BAC 128 detects a "call subroutine" branch instruction, the BAC 128 pushes the address of the next instruction onto the return stack buffer. A Top of Stack Pointer marks the top of the return stack buffer. By pushing the address immediately following each "call subroutine" instruction onto the return stack buffer, the return stack buffer contains a stack of return addresses. When the BAC 128 later detects a "return from subroutine" branch instruction, the BAC 128 pops the top return address off of the return stack buffer to verify the return address predicted by the BTB 124.

The BTB 128 performs static prediction. Static prediction in the processor of the present invention is defined as op-code based prediction of branches not located in the branch target cache 610. For the Intel® architecture microprocessor instruction set, the BAC 128 potentially decides to "take" four types of branch instructions not identified by the BTB 124. For an instruction pointer (IP) relative unconditional branch, the BAC 128 always predicts taken. In addition, if the BTB 124 predicts "not taken", the BAC 128 overrides the BTB 124 prediction decision for this type of branch.

For a return branch type, the BAC 128 receives all call instructions, and records the address return addresses in the return stack buffer. Consequently, in order to predict a return branch type, the BAC 128 pops the top of the stack from the return stack buffer. For an IP relative conditional branch type instruction, the BAC 128 utilizes the sign bit of the displacement to predict the branch decision. For a register indirect branch type, the BAC 128 always predicts taken. If the BTB 124 does not predict taken for the register indirect branch, the BAC 128 overrides the BTB 124 missed prediction or improper prediction.

After a branch instruction is decoded in the ID 126, and if the ID 126 determines that a predicted branch instruction is not a branch instruction, then the BAC 128 flushes the processor pipeline. If the ID 126 determines that the received instruction is a branch instruction, then the ID 126 transfers the type of branch instruction received, the displacement of the branch, and the outcome and target address prediction from BTB 124. In one embodiment of the present invention, the macro instruction set comprises four types of branch instructions: an unconditional relative jump/call, an unconditional register indirect jump/call, a conditional jump, or a return from subroutine. Each type of branch instruction is handled differently by the BAC 128.

Table 2 summarizes the operation of the BAC 128 for each type of branch instruction when the BTB 124 predicted the branch instruction and the ID 126 verified that the predicted branch instruction is actually a branch instruction.

TABLE 2

| | Branch Address Calculator Action | |
|---|---|---|
| Branch Type (As decoded by ID) | Validation of the BTB Branch Outcome | Validation of the Branch Target Address |
| Unconditional Relative Jump or Call | Yes, taken | Yes, target calculated from IP) and branch displacement |
| Register indirect Jump or Call | Yes, taken | No, use BTB address prediction |
| Conditional Jump | No, condition unknown | Yes, target calculated from IP and branch displacement |
| Return from subroutine | Yes, taken | Yes, from BAC return stack buffer |

When the BAC 128 receives an unconditional relative jump or call instruction that was predicted by the BTB 124, the BAC 128 validates both the predicted branch outcome and the predicted branch target address. Because the branch is unconditional, the BTB 124 validates the branch outcome by ensuring the branch was predicted taken. The BAC 128 validates the branch target address by calculating the instruction pointer relative target address and comparing the calculated branch target address with the predicted branch target address. If either the branch outcome or branch target address were mispredicted by the BTB 124, the BAC 128 flushes the pipeline, and restarts the fetching of instructions at the corrected address. Because the BAC 128 fully validates both the predicted branch outcome and the predicted branch target address for unconditional relative jump or call instructions, the branch instructions are fully executed.

When the BAC 128 receives an unconditional register indirect jump or call instruction that was predicted by the BTB 124, the BAC 128 validates the predicted branch outcome. Because the branch is unconditional, the BAC 128 validates the predicted branch outcome by ensuring the branch instruction was predicted "taken". However, the BAC 128 cannot validate the branch target address because the value within the register is not known at this stage in the processor pipeline. Therefore, the BAC 128 makes no adjustment to the branch target address predicted by the BTB 124.

When the BAC 128 receives a conditional jump instruction that was predicted by the BTB 124, the BAC 128 validates only the branch target address by calculating the branch target address and comparing the calculated branch target address with the predicted branch target address. The BAC 128 does not validate the branch outcome because the outcome of branch condition is not known at this stage in the processor.

When the BAC 128 receives a return from subroutine instruction that was predicted by the BTB 124, the BAC 128 validates both the predicted branch outcome and the predicted branch target address. Because a return from subroutine instruction is unconditional, the BTB 124 validates the branch outcome by ensuring the branch instruction was predicted taken. The BAC 128 validates the branch target address by accessing the return stack buffer.

Figure 11A:
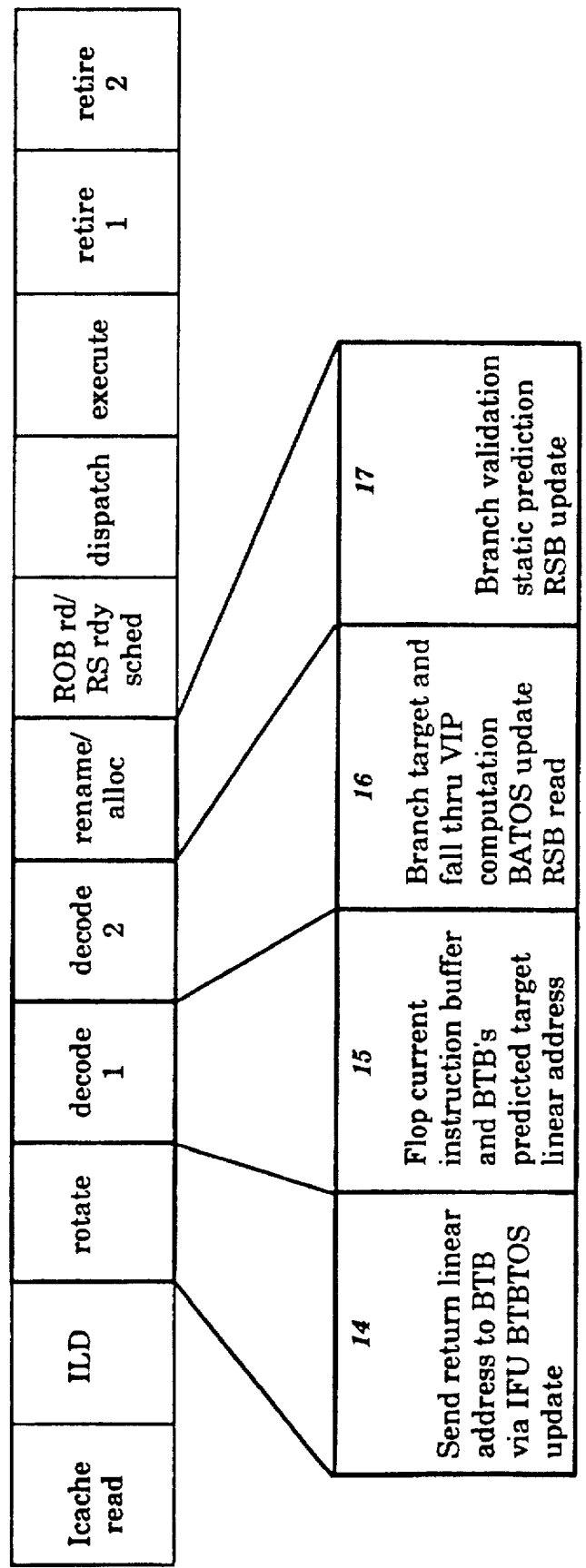
FIGS. 11a and 11b illustrate the operation of a branch address calculator for one embodiment of the pipeline processor of the present invention.
Figure 11B:
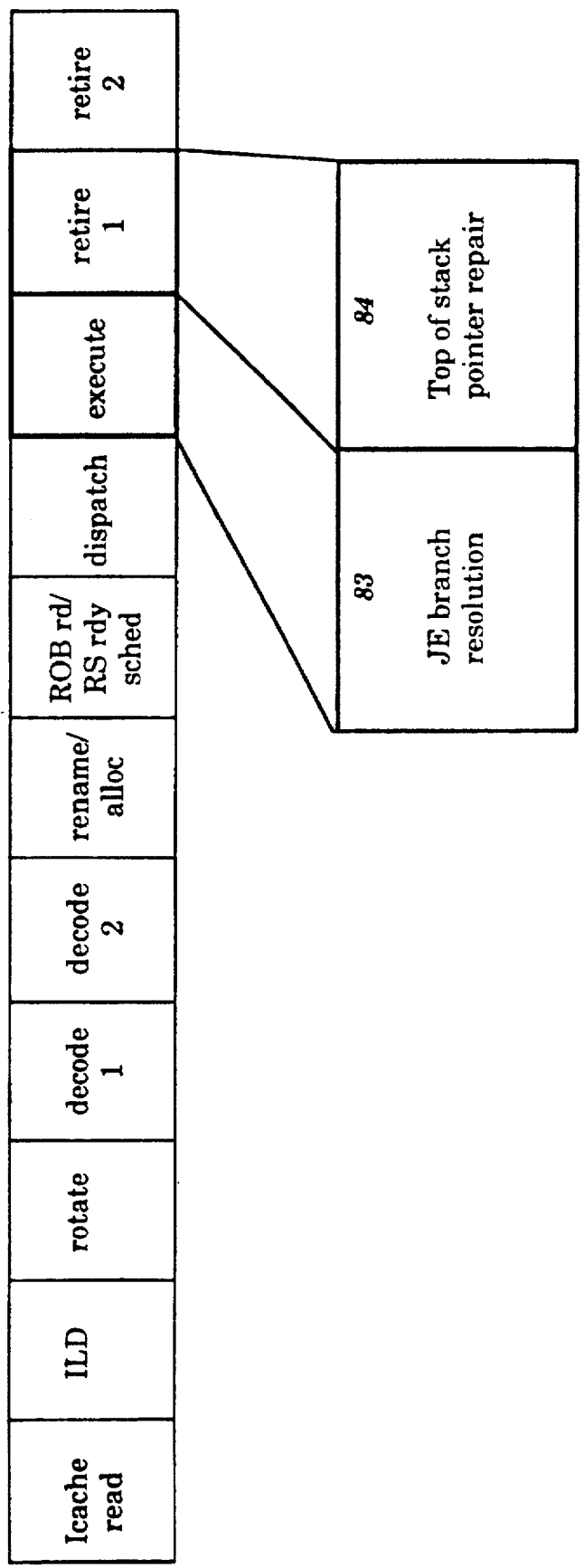

FIGS. 11a–b illustrate the operation of the BAC 128 for one embodiment of the pipeline processor of the present invention. The BAC 128 primarily operates in four clock cycles. In pipestage 14, the BAC 128 supports the BTB prediction mechanism for return target by sending the return linear address stored in the return stack buffer to the BTB 124 via the IFU 122. Also during pipestage 14, the BAC 128 updates one of the top of stack pointers on a call or return instruction detected by the BTB 124. In pipestage 15, the BAC 128 latches the current instruction buffer and the predicted target linear addresses from the BTB 124.

The calculations of branch target and next sequential virtual addresses are completed during pipestage 16. Also, during pipestage 16, the return stack buffer is read, and top of stack pointers on a call or return detected by the BAC 128 are updated. During pipestage 17, the BAC 128 performs branch validation, static prediction, and write access of the return stack buffer. The BAC 128 is also affected during the execute pipestages as shown in FIG. 11b. A jump execution indicates a macro branch misprediction after resolving the branch in pipestage 83. During pipestage 84, the restoration of the top of stack pointer occurs.

Register Alias Table (RAT)

The processor of the present invention utilizes register renaming. In one embodiment, register renaming is performed in the register alias table (RAT) 132. In general, the RAT 132 maintains mapping from logical register names to physical register names. For the Intel® microprocessor architecture, the logical registers include the Intel® microprocessor architecture integer registers, floating point registers, flags and microcode temporary registers. The physical register names correspond with reorder buffer (ROB) 136 entries. The ROB 136 is described more fully below. Through use of register renaming as provided by the RAT 132, a larger register set is accessible to the processor architecture. The use of a larger register set facilitates out-of-order dispatch and completion of execution of instructions in the processor.

In one embodiment, the RAT 132 is implemented as a look-up table. The look-up table is indexed by the architectural register (i.e. logical register) designator from the decoded macro instruction. The look-up table produces the physical register number in the ROB 136 for the renaming of the logical register. Consequently, for every micro-op renamed, the RAT 132 is updated. Therefore, every micro-op that targets an architectural register is allocated a new physical register, and the address of the new physical register appears in the RAT 132 for all future micro-ops. In one embodiment, the RAT 32 renames up to four micro-ops per clock cycle.

In order to handle the multiple micro-ops at once, the RAT 132 utilizes an implicit sequential relationship among the four micro-ops that are simultaneously emitted by the ID 126. The sequential relationship is used to determine which micro-op replaces any given entry of the RAT 132. Generally, the latest micro-op in the group that targets an architectural register overrides the corresponding RAT 132 entry. The look-up table is not updated until all four micro-ops have been renamed, but the first micro-op may target a register that the second micro-op sources. To alleviate this problem, the RAT 132 provides byte paths and compare logic that detect this condition, and override the normal RAT 132 outputs. As shown in FIG. 1, the RAT 132 is coupled to the instruction decoder (ID) 126, allocator (ALLOC) 134, reorder buffer (ROB) 136, and reservation station (RS) 138.

In one embodiment, the RAT 132 performs both integer register renaming and floating point register renaming. In general, the RAT 132 contains logic to track retirement of micro-ops including retirement overrides and read overrides. The retirement overrides bypass array data for new addresses provided by the real register file (RRF) 137 addresses. Read overrides bypass previous temporary physical sources for renamed physical sources. The RAT 132 also contains priority write logic to update the look-up table with new physical destinations that are assigned by the allocator 134. The RAT 132 contains next pointer logic to record data dependencies, and the data dependencies are utilized in scheduling in the RS 138.

Figure 12:
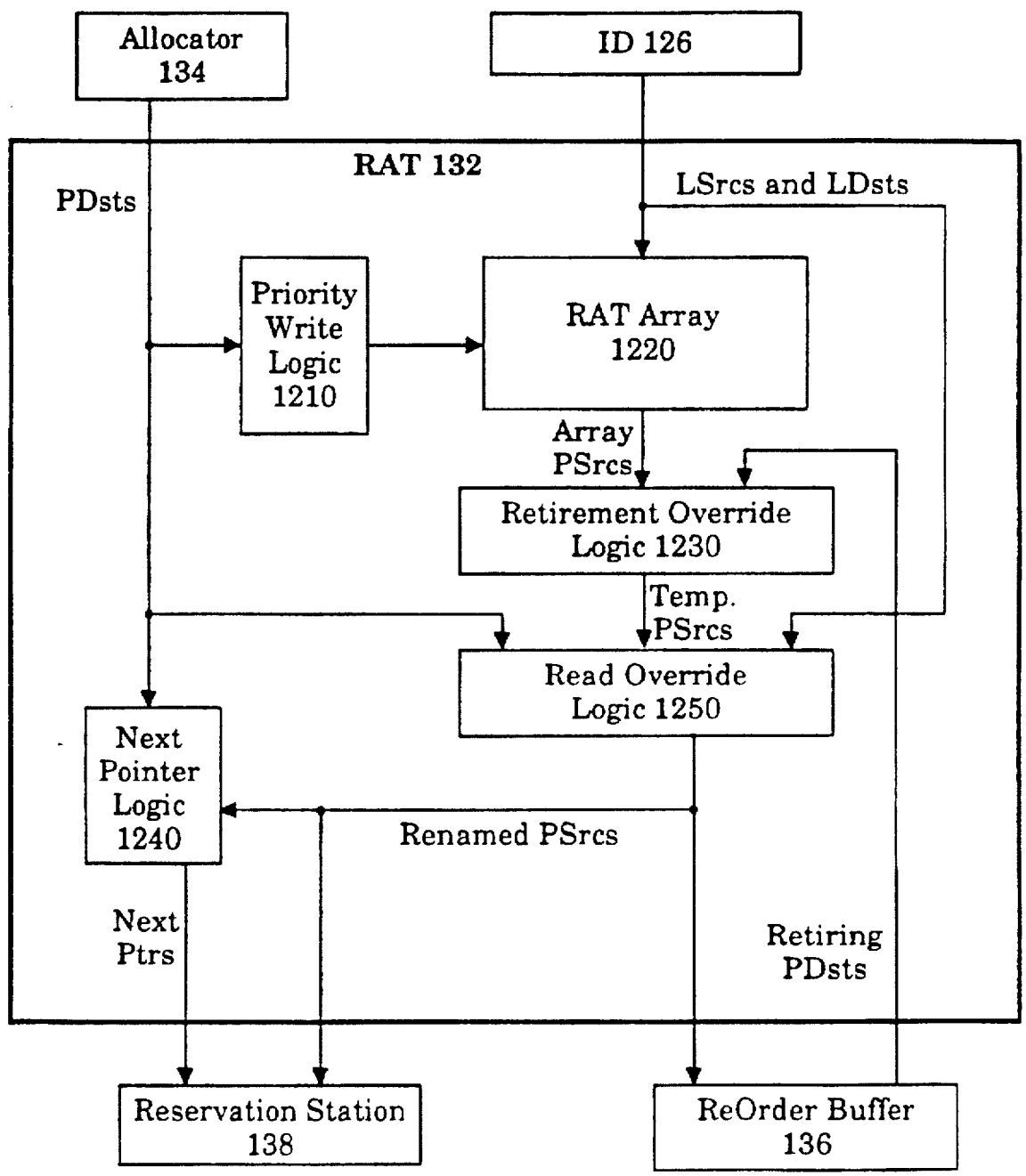
FIG. 12 illustrates a high level block diagram of a register alias table and functional blocks that interface with the register alias table configured in accordance with one embodiment of the present invention.

FIG. 12 illustrates a high level block diagram of the RAT 132 and functional blocks that interface with the RAT 132 configured in accordance with one embodiment of the present invention. The look-up table is implemented with a RAT array 1220. For each entry, the RAT array 1220 stores a ROB pointer, identifying the corresponding physical register, a real register file validity bit (RRFV), and control information. As shown in FIG. 12, the RAT array 1220 receives logical sources (LSrcs) from the ID 126. The LSrcs indicate the logical architectural register for source operands in the corresponding micro-ops. In response, the RAT array 1220 outputs the corresponding physical sources (PSrcs). The array PSrcs are input to a retirement override logic 1230. The retirement override logic 1230 receives a list of retiring physical destinations from the ROB 136. The retirement override logic 1230 bypasses array PSrc data for retiring physical destinations to generate a temporary physical source (PSrcs).

The temporary physical sources are input to read override logic 1250. Also input to read override logic 1250 are physical destinations from the ALLOC 134, and logical sources (LSrcs) and logical destinations (LDsts) from ID 126. The read override logic 1250 bypasses previous temporary physical sources for renamed physical sources. The priority write logic 1210 receives physical destinations from the ALLOC 134 as inputs, and updates the RAT array 1220 with new physical destinations. The next pointer logic 1240 receives physical destinations, and renamed physical sources, and in turn, records data dependencies to facilitate scheduling in the reservation station. The output of read override logic 1250 is the renamed physical sources, and the renamed physical sources is transmitted to the ROB 136. Consequently, the RAT 132 converts logical micro-ops issued from the ID 126 to physical micro-ops for execution in the out-of-order portion of the processor.

In one embodiment, for each entry, the RAT array 1220 also contains a status bit indication, identifying whether the data stored at the corresponding ROB entry is valid data. In other words, each ROB 136 entry representing a local register assignment in the processor is associated with a READY bit in the RAT array 1220 that indicates when the local register in the ROB 136 contains valid data. The collection of READY bits is referred to herein as the active register file. The READY bit may be set, either directly (e.g., signal(s) sent as part of the writeback action) or indirectly (e.g., by another functional unit monitoring the activity on the writeback bus) in response to data from execution results being transferred on the writeback bus. Note that the Pdsts may be used to correlate the results with the local register allocation.

Figure 13:
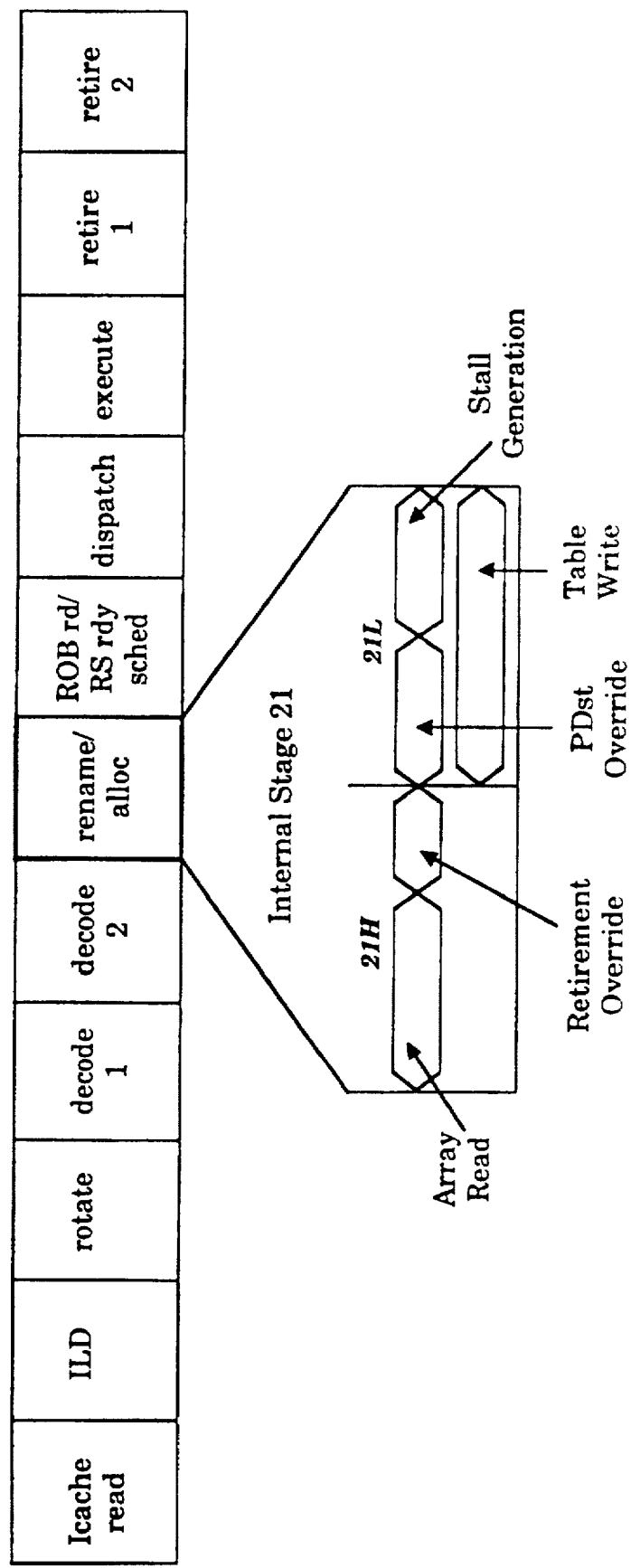
FIG. 13 illustrates the operation of the register alias table in one embodiment of the pipeline processor of the present invention.

FIG. 13 illustrates the operation of the RAT 132 in one embodiment of the pipeline processor of the present invention. The RAT 132 operates in pipestage 6 as shown in FIG. 13. More specifically, within the pipestage 6, the lower portion of FIG. 13 illustrates the internal pipestage when the basic RAT 132 functions are executed. During the first half of internal pipestage 21, array reads to the RAT array 1220 are executed. Also, during the first half of internal pipestage 21, the retirement override function is performed. In the second half of internal pipestage 21, a Pdst override and stall generation, if necessary, is performed sequentially. Also, during the last half of pipestage 21, Pdsts are written to the RAT array 1220.

Allocator (ALLOC)

The speculative execution and out-of-order dispatch and completion operation of the processor of the present invention requires additional resources than the architecturally defined registers. The allocator (ALLOC) 134 allocates or assigns additional resources for micro-ops input from the ID 126. In general, the ALLOC 134 assigns resources to the ROB 136, the RS 138, and memory order buffer (MOB) 150. Every micro-op requires an entry in the RS 138 and the ROB 136. In addition, memory micro-ops require space in the MOB 150, stores require space in the store buffer, and segment register loads require physical segment registers. The ALLOC 134 allocates resources to the ROB 136 and MOB 150 sequentially (e.g. in the original program order). The ALLOC 134 allocates resources to the RS 138 utilizing nonsequential allocation techniques. The ALLOC 134 also contains the ability to stall, such that no additional resources are allocated for incoming micro-ops. An allocator stall is generated from a determination that inadequate resources exist, as dictated by the applicable resource allocation policy, or from a pipeline flush. As shown in FIG. 3, the ALLOC 134 operates in pipestage 6 in the processor pipeline.

The ROB 136 is configured as a circular buffer, such that the ALLOC 134 assigns entries from zero until the highest address, then wraps around starting over at zero. The ALLOC 134 receives micro-ops from the ID 126, and assigns physical destinations (Pdsts) for ROB 136 entries. In one embodiment of the present invention, the ALLOC 134 utilizes an all or nothing allocation policy for allocating resources to the ROB 136. In the all or nothing allocation policy, the ALLOC 134 allocates resources for all micro-ops in that allocation pipeline stage if sufficient resources are available. Alternatively, if insufficient resources are available, then ALLOC 134 allocates no micro-ops during that allocation pipeline stage. If insufficient resources are available, the ALLOC 134 stalls operation until resources become available. The sequential management of the ROB 136 is performed in conjunction with retirement or sequential deallocation utilizing a retirement pointer. The ROB 136 Pdst also serves as the micro-op ID for the particular micro-op. The Pdsts are stored in the RAT array 1220, and are subsequently used as a tag for a match in the RS 138. In addition, the Pdst value serves as a linear index to the ROB entry for execution write back.

The ALLOC 134 utilizes an out-of-order scheme for allocation of resources in the RS 138. The lifetime of an entry in the RS 138 begins when the micro-op is decoded and ends upon execution. The out-of-order management scheme reduces the number of entries required. As will be described below, the RS 138 is capable of dispatching micro-ops out-of-order as source data for the corresponding micro-ops become data ready. Consequently, free entries in the RS 138 are typically interspersed with used or allocated entries. In order to allocate entries in the RS 138, the ALLOC 134 utilizes a bit map scheme. In the bit map scheme, each RS 138 entry maps to a bit contained in a RS allocation pool located in the allocator 134. By using a bit map scheme, entries for allocation may be drawn or replaced from the RS application pool in any order. However, such a bit map scheme requires generation of a free list to specify unallocated entries in the RS 138. In order to generate the free list, the allocator 134 starts scanning from location zero until the first three free entries are found. If the RS 138 is full, the allocator 134 stalls allocation of new entries.

In addition to the allocation of resources for the reservation station (RS) 138 and reorder buffer (ROB) 136, the allocator 134 decodes micro-ops to determine whether MOB store buffer entries or physical segment registers are needed. The MOB 150 is treated as a circular buffer. However, every micro-op does not require a load buffer or store buffer entry. The allocator 134 utilizes an all or nothing policy as applied to the MOB 150. Consequently, stalling of micro-ops only occurs if all of the valid MOB micro-ops cannot be allocated to the load buffer or store buffer. The MOB allocation policy requires more logic than the ROB allocation policy. Allocation of entries in the MOB 150 is described more fully below in conjunction with a description of the memory cluster 120.

Reservation Station (RS)

In general, the reservation station (RS) 138 is a buffer in front of the execution units that holds both integer and floating point micro-ops that are waiting for needed resources in order to execute. The needed resources include source data operands, and an appropriate execution unit to execute the micro-op. For example, valid source data operands may be dependent upon previous micro-ops that have not yet been executed. The RS 138 begins the out-of-order data flow behavior of the processor, such that all previous pipeline stages behave in accordance to the Von Neumann sequence. All pipeline stages after the ROB 136 and RS 138 are decoupled from the previous pipelined stages.

Figure 15:
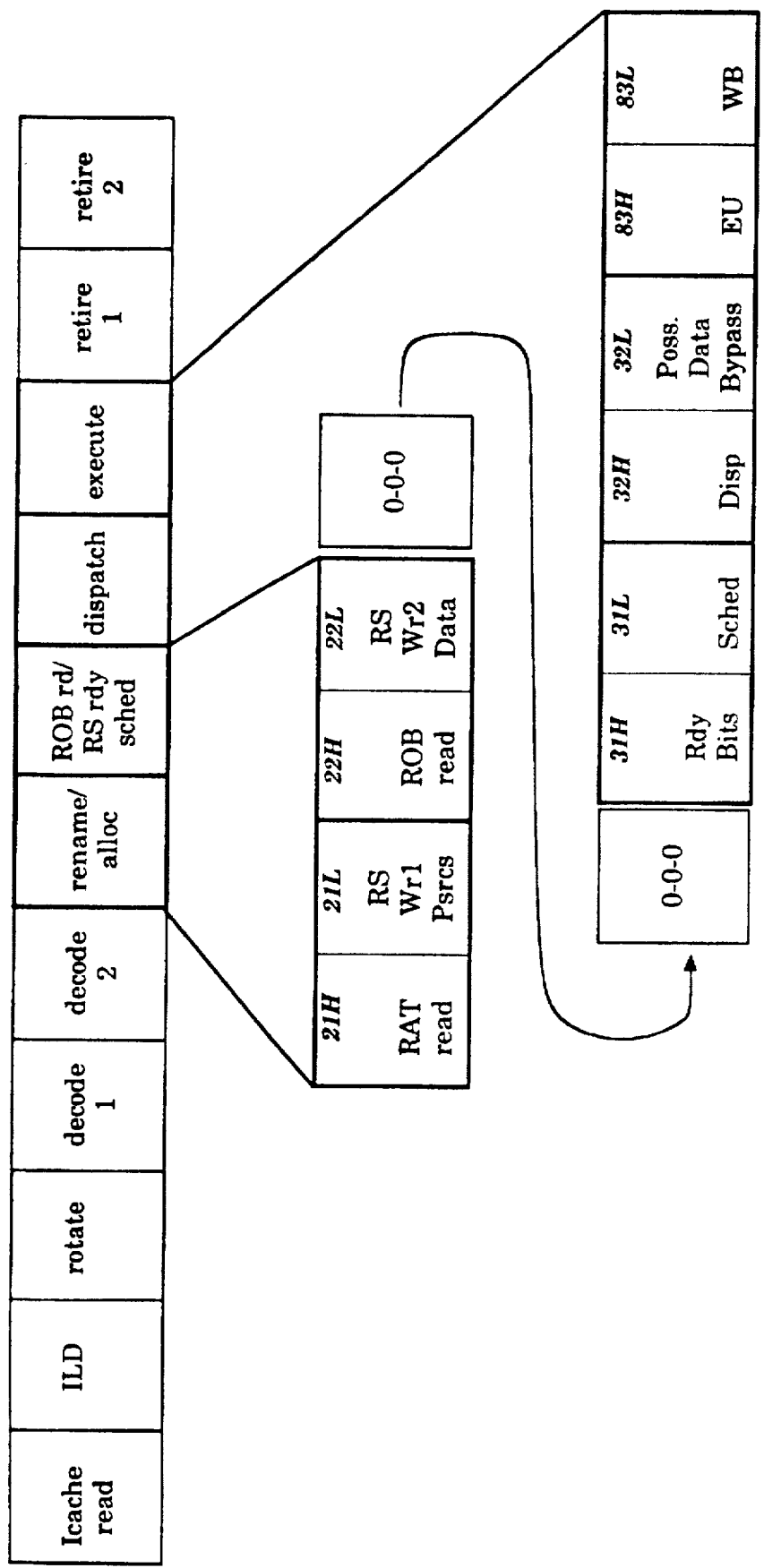
FIG. 15 illustrates pipeline stages involving the reservation station configured in accordance with one embodiment of the present invention.

The lifetime of a micro-op stored in the RS 138 begins at allocation and ends at dispatch. If a RS 138 entry is immediately scheduled upon allocation, then pipeline stages 22 and 31 overlap as seen in FIG. 15. If an entry is waiting for a needed resource, any number of cycles may lapse before the entry is determined ready, and subsequently scheduled. In this case, pipeline stage 22 does not overlap with pipeline stage 31 and the decoupled nature of the RS 138 is observed.

Figure 14:
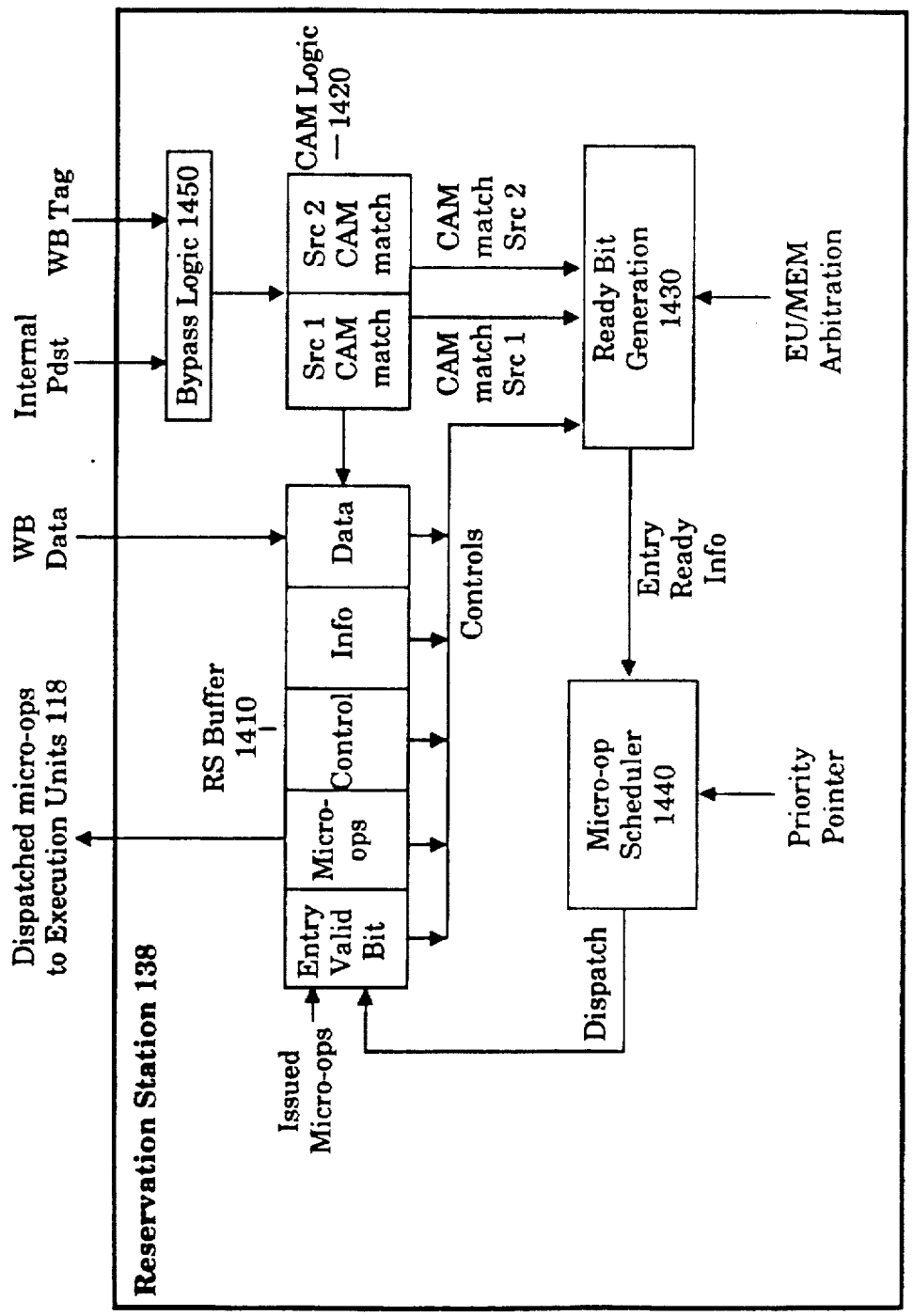
FIG. 14 illustrates a block diagram for a reservation station configured in accordance with one embodiment of the present invention.

FIG. 14 illustrates a block diagram for a reservation station (RS) 138 configured in accordance with one embodiment of the present invention. The RS 138 contains a RS buffer 1410 that stores an entry valid bit, micro-ops, control information, source data including a data valid bit and corresponding physical sources, and a physical destination. The RS 138 also includes content addressable memory (CAM) logic 1420, ready bit generation 1430, and micro-op scheduler 1440. In one embodiment of the present invention, the RS buffer 1410 stores 10 entries. The control portion of an entry, micro-op, entry valid, etc., is input from the ALLOC 134 and RAT 132. The data portion of RS buffer 1410 is input from the ROB 136 and the execution units within the execution cluster 118.

The CAM logic 1420 and bypass logic 1450 controls the bypassing of writeback data from the execution units into the RS 138. The CAM 1420 is utilized to compare the writeback physical destinations (Pdsts) with the stored physical sources (PSrcs). When a match occurs, write enables are asserted to bypass the needed writeback data into the appropriate entry in the RS buffer 1410. In this manner, data on the writeback bus can be supplied to multiple data sources in the RS 138 at the same time, without having to be written into the ROB 136. For more information, see U.S. patent application Ser. No. 08/174,837, filed Dec. 29, 1993, entitled "Method and Apparatus for Broadcast Associative Writing of Data", assigned to the corporate assignee of the present invention and incorporated by reference herein. The RS 138 is responsible for latching and transmitting the writeback Pdsts to the ROB 136. The ready bit generation 1430 receives CAM matching information generated from the CAM logic 1420. In addition, the ready bit generation 1430 receives execution unit arbitration information identifying the availability of the execution units in the execution cluster 118. In response, the ready bit generation unit 1430 utilizes the CAM matching information and arbitration information to generate entry ready information identifying data readiness and execution unit availability for each entry in the RS buffer 1410.

The entry ready information is input to the micro-op scheduler 1440, and a priority pointer is also input to the micro-op scheduler 1440. In one embodiment, the micro-op scheduler 40 contains one scheduler for each execution unit contained in the execution cluster 118. The micro-op scheduler 1440 utilizes the entry ready information and priority pointer to schedule micro-ops for dispatch to the execution cluster 118. The priority pointer is utilized to specify where the micro-op scheduler 1440 should begin scanning the RS buffer 1410 for selected entries. The priority pointer is generated according to a pseudo first-in-first-out (FIFO) algorithm. The use of the priority pointer reduces stale entry effects, thereby increasing performance in the RS 138.

The ALLOC 134 performs a load balancing algorithm that knows the number of micro-ops in the RS buffer 1410 waiting for execution on a given execution unit interface. The algorithm, known as static binding with load balancing of ready micro-ops, binds micro-ops to an execution unit interface. For dispatch, entries in the RS buffer 1410 are read and transferred to the appropriate execution unit. The RS 138 dispatches all of the necessary micro-op information to the scheduled execution unit. At times, writeback data is invalid. For example, when the memory cluster 120 detects a cache miss, dispatching of micro-ops, dependent on the writeback data, is canceled and rescheduled at a later time.

Consequently, cancellation is the inhibiting of a micro-op from being scheduled, dispatched or executed due to a cache miss or possible future resource conflict. All canceled micro-ops are rescheduled at a later time unless the out-of-order portion of the processor is reset. After a micro-op has been dispatched to an execution unit, and no cancellation has occurred, then the RS buffer 1410 entry can be deallocated for use by a new micro-op.

FIG. 15 illustrates pipeline stages involving the reservation station 138 configured in accordance with one embodiment of the present invention. As shown in FIG. 15, RS allocation occurs during pipeline stages 21L and 22L. Specifically, the initial writing of RS control information to the RS buffer 1410 occurs during pipeline stage 21L, and initial writing of data occurs in pipeline stage 22L. Data enters the RS buffer 1410 from execution unit writebacks during pipeline stage 83L. During pipeline stage 31H, the RS 138 determines which entries are ready for dispatch in pipeline stage 32H. Upon determining which entries in the RS 1410 are ready, the RS 138 schedules RS entries for dispatch in pipeline stage 31L. The binding of micro-ops to an execution unit interface at allocation occurs during pipestage 21L. The dispatch of micro-ops from the RS buffer 1410 to the execution units occurs during pipestage 32H. In pipestage 22L, when source data is written to the RS buffer 1410, that source data, for a corresponding micro-op may not be valid at this time. The corresponding micro-op must remain in the RS buffer 1410 until the corresponding source data are valid. During pipestage 83L, data writeback occurs.

Reorder Buffer (ROB)

The reorder buffer (ROB) 136 is a fundamental component in three aspects of the processor of the present invention: speculative execution, register renaming, and out-of-order dispatch and completion. The ROB 136 provides the extra storage for physical registers that permits register renaming. The additional physical registers permit more parallelism in executing instructions. In addition, the ROB 136 permits storage of micro-ops that are speculatively executed to provide a storage buffer prior to committing the results to the architectural state of the processor. Furthermore, the ROB 136 provides a storage buffer to permit reordering of the machine state, in the original program order, from out-of-order operations. The ROB 136 also provides enough physical register space for register renaming. The ROB 136 also detects exceptions and mispredictions, thereby subsequently initiating repair to retain the proper machine state.

The ROB 136 supports speculative execution by buffering the results from the execution units before committing architecturally visible state of the writeback data in the RRF 137. Consequently, instructions are fetched and executed at a maximum rate by assuming branches are properly predicted and no exceptions occurred. If a branch is mispredicted, or if an exception occurs in executing a micro-op, the processor can recover simply by discarding the speculative result stored in the ROB 136. In this case, the processor restarts processing at the proper instruction by examining the committed architectural state in the RRF 137. The process of committing speculative state to architectural state is termed retirement. A key function of the ROB 136 is retirement or completion of micro-ops.

The buffer storage for execution unit writeback results is utilized to support register renaming. As discussed above, register renaming allocates a new physical register as the destination register of every micro-op that writes to an architectural register. The execution unit write result data is subsequently written into the renamed physical register in the ROB 136. Retirement logic, contained within the ROB 136, updates the architectural registers in the RRF 137 based on the contents of each rename instance of the architectural registers. Micro-ops, that specify source data from an architectural register, obtain either the contents of the actual architectural register or the contents of the renamed physical register. Because the processor of the present invention is superscalar, different micro-ops in a particular execution clock cycle may utilize the same architectural register, but in fact, access different physical registers.

The ROB 136 supports out-of-order execution by allowing execution units to complete micro-op execution and writeback data results without regard to other micro-ops that are executing simultaneously. Therefore, as far as the execution units are concerned, micro-ops complete out-of-order. The retirement control logic in the ROB 136 subsequently reorders the completed micro-ops into the original sequence issued by the ID 126 as it updates the architectural state in the RRF 137.

As shown in FIG. 1, the ROB 136 is closely tied to the RRF 137, ALLOC 134, RS 138, and RAT 132. As discussed above, the ALLOC 134 manages the assignment of ROB physical registers to support speculative operations and register renaming. The register renaming of architectural registers in the ROB 136 is managed by the RAT 132. The ROB 136 interface with the RS 138 and the execution cluster 118 is loosely coupled in nature.

Figure 16:
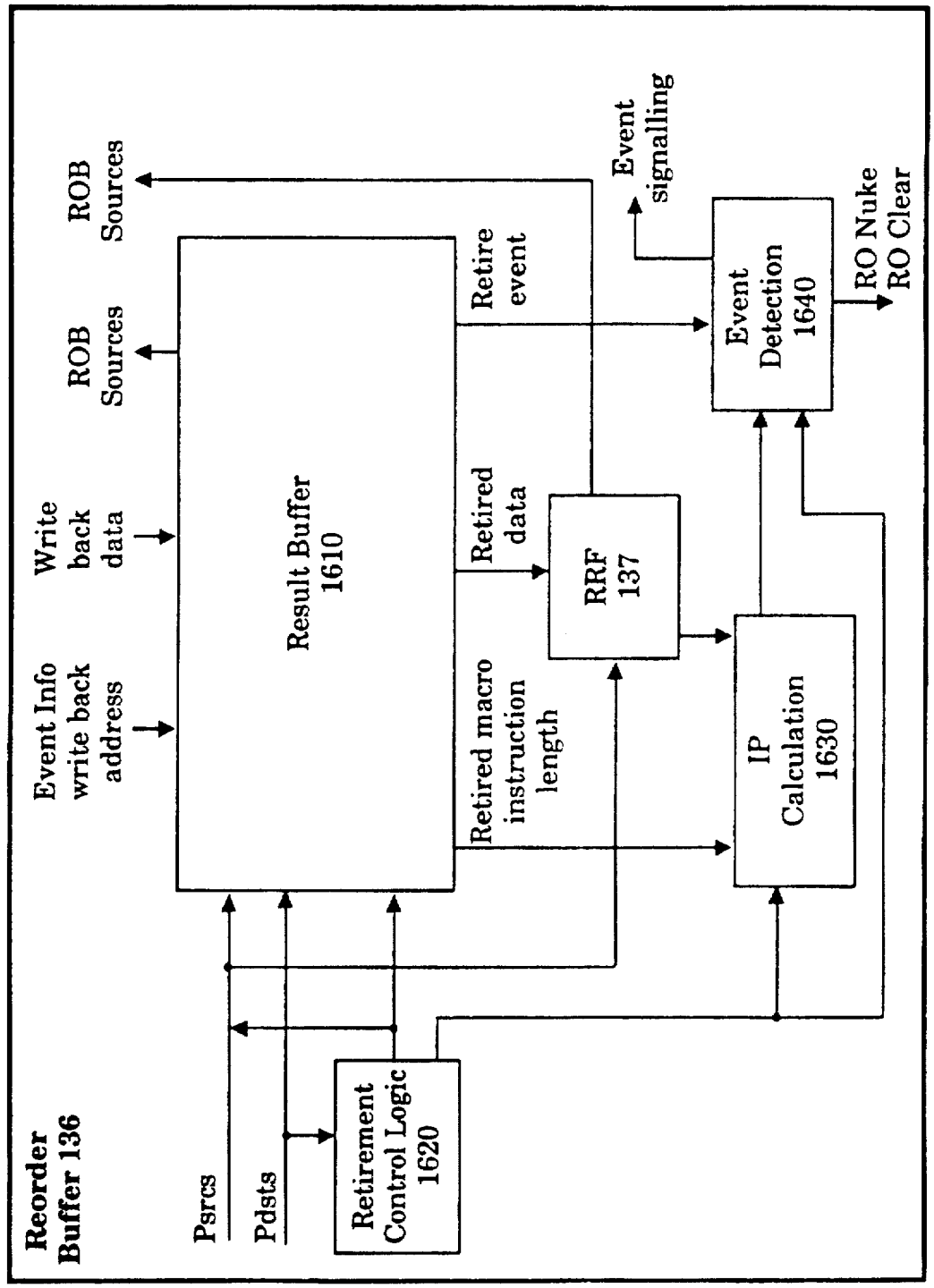
FIG. 16 illustrates a block diagram of a reorder buffer configured in accordance with one embodiment of the present invention.

FIG. 16 illustrates a block diagram of the ROB 136 configured in accordance with one embodiment of the present invention. As shown in FIG. 16, in addition to the RRF 137, the ROB 136 contains four internal functional blocks: result buffer 1610, retirement control logic 1620, IP calculation 1630, and event detection 1640. The RRF 137 contains the logical registers that constitute the architectural state of the processor. For the Intel® architecture microprocessor, the RRF 137 contains eight registers.

In one embodiment, the result buffer 1610 contains 40 physical register entries. Each physical register entry contains a result data field and control information fields, including a physical register valid bit field and a logical destination (LDst) field. The physical register valid bit field indicates whether the result data in the corresponding physical register is valid, and the LDST field specifies the corresponding logical register.

The IP calculation 1630 generates the architectural instruction pointer as well as several other macro and microinstruction pointers. The macroinstruction pointer is generated based on the lengths of all the macro instructions that retire, as well as any branch target addresses.

In general, the retirement control logic 1620 computes retirement valid signals indicating which physical register entries with valid writeback data are ready for retirement. The retirement control logic 1620 reimposes the original program order on the physical micro-ops by committing the speculative results held in the result buffer 1610 to the architectural state of the processor in the same order as the original logical micro-ops were received. The retirement control logic 1620 generates addresses for retirement reads performed in each clock cycle by reading speculative result data from the retiring physical registers of the result buffer 1610, and transferring the speculative result data to corresponding committed state registers in the RRF 137. For one embodiment, the retirement control logic 1620 retires up to four physical registers concurrently.

The retirement control logic 1620 maintains a retirement pointer to the physical registers in the result buffer 1610. The retirement pointer identifies the next four consecutive physical registers for retirement. The retirement pointer follows the allocation pointer through the physical registers in the result buffer 1610 as the retirement control logic 1620 retires the speculative results of the physical registers to the architectural state. The retirement control logic 1620 retires the physical registers in order because the ALLOC 134 allocated the physical registers in the original order of the logical micro-ops order.

In order to retire a physical register, the retirement control logic 1620 initially tests the corresponding valid bit of the physical register. If the valid bit indicates the entry is valid, such that the speculative result data for the corresponding physical micro-op is contained in the physical register, then the retirement control logic 1620 transfers the corresponding speculative result data to the committed state register in the RRF as specified by the logical destination field (LDST) contained in the physical register entry.

The event detection 1640 determines whether the execution unit, processing the corresponding micro-op, reported an event. If an event is reported, the ROB 136 entries that follow the entry reporting the event are discarded. In addition, the MS 130 is signaled to jump to a particular microcode handler, and most of the state of the entry with an event is saved for micro-code handling use. The signaling of an event is based on the events reported to the ROB 136 by the execution units in the execution cluster 118. The event detection block 1640 saves all states from the corresponding ROB entry needed by the micro-code event handler.

The event detection 1640 also generates several events in addition to the events reported by the execution cluster 118. After executing a branch instruction, a jump execution unit, located in the IEU 144, returns virtual address of a branch target to the physical registers at writeback. If the branch was mispredicted, the jump execution unit, in addition to asserting the JE Clear signal, sets a bit in the control information. The JE Clear starts the in-order portion of the processor fetching and decoding down the correct path, and stalls instruction issue into the out-of-order portion of the processor. However, the correct path determined by the jump execution unit may not be the actual correct path if a preceding micro-op that has not executed could cause an exception. When a mispredicted branch retires, the ROB 136 asserts a RO Clear signal. The RO Clear signal resets the state of the out-of-order portion of the processor. In addition, the RO Clear signal unstalls the in-order portion of the processor, and the RS 138 receives correct micro-ops from the issue cluster 114. Also, when the ROB 136 retires a micro-op that faults, the event detection 1640 asserts a RO Nuke signal so that the in order and out-of-order clusters, 114 and 116 are cleared.

Figure 17A:
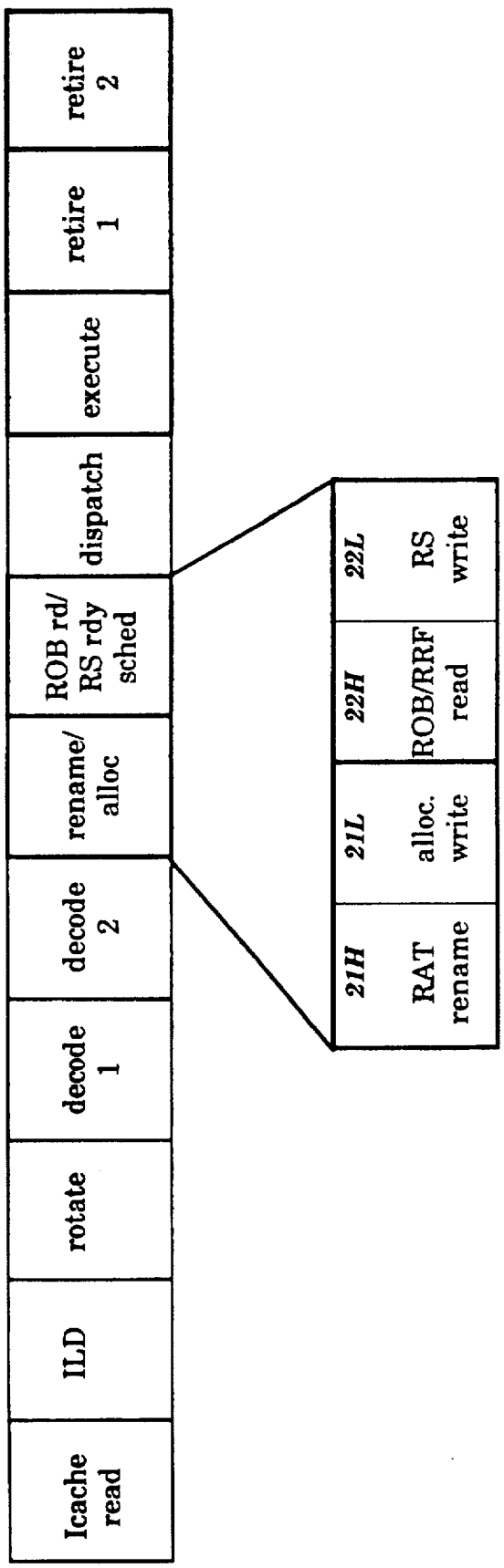
FIG. 17a illustrates the processor pipeline stages, emphasizing the involvement of the reorder buffer.

The ROB 136 is active in both the in-order and out-of-order portions of the processor. FIG. 17a illustrates the processor pipeline stages, a emphasizing the involvement of the ROB 136. In pipestage 21, entries in the ROB 136 that hold the result of the speculative micro-ops are allocated. In addition, addresses of the ROB entries (Pdsts) for the micro-ops are also written to the RS 138. In pipestage 22, immediately following entry allocation in the ROB 136, the source data corresponding to the micro-ops are read from the ROB 136. The source addresses are provided by the RAT 132 based on the alias table update performed in pipestage 21. The RAT 132 writes the addresses of the ROB 136 entries sourced with each micro-op into the RS 138.

Figure 17B:
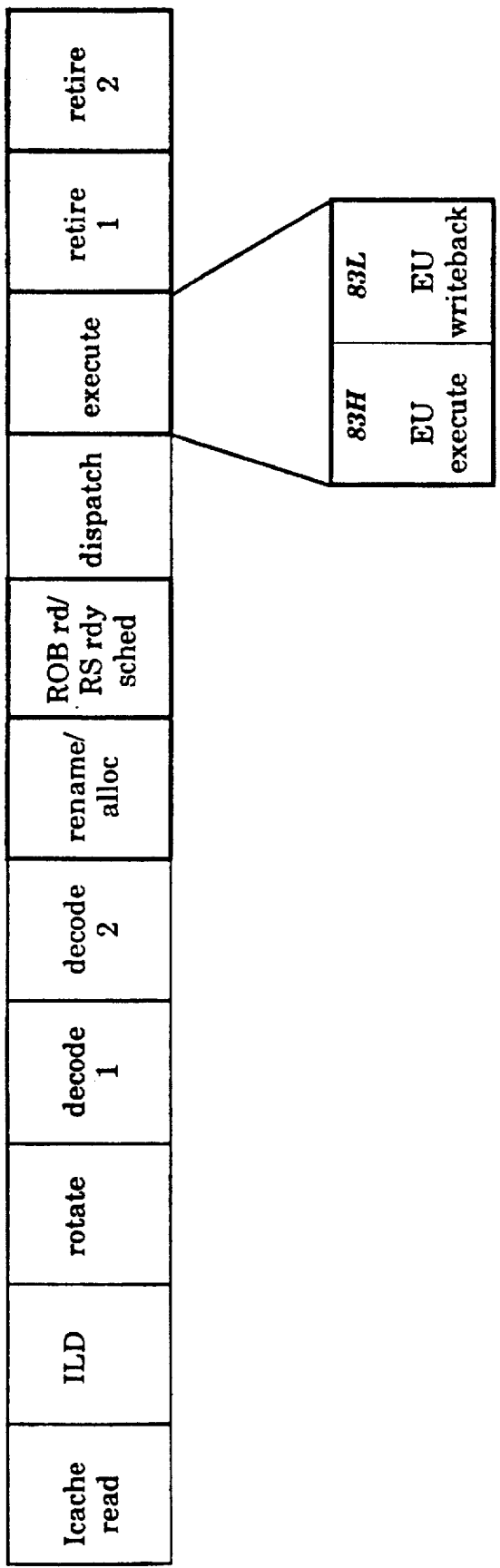
FIG. 17b illustrates the reorder buffer involvement during the execute pipeline stages.

FIG. 17b illustrates the ROB 136 involvement during the execute pipeline stages. In pipestage 83H, the execution unit performs the appropriate function, and in pipeline stage 83L, the corresponding execution unit writes back destination data into the ROB 136. The writeback pipestage is decoupled from the rename and register read pipestages because the micro-ops are issued out-of-order from the RS 138. Arbitration for use of writeback busses is determined by the execution cluster 118 and RS 138.

Figure 17C:
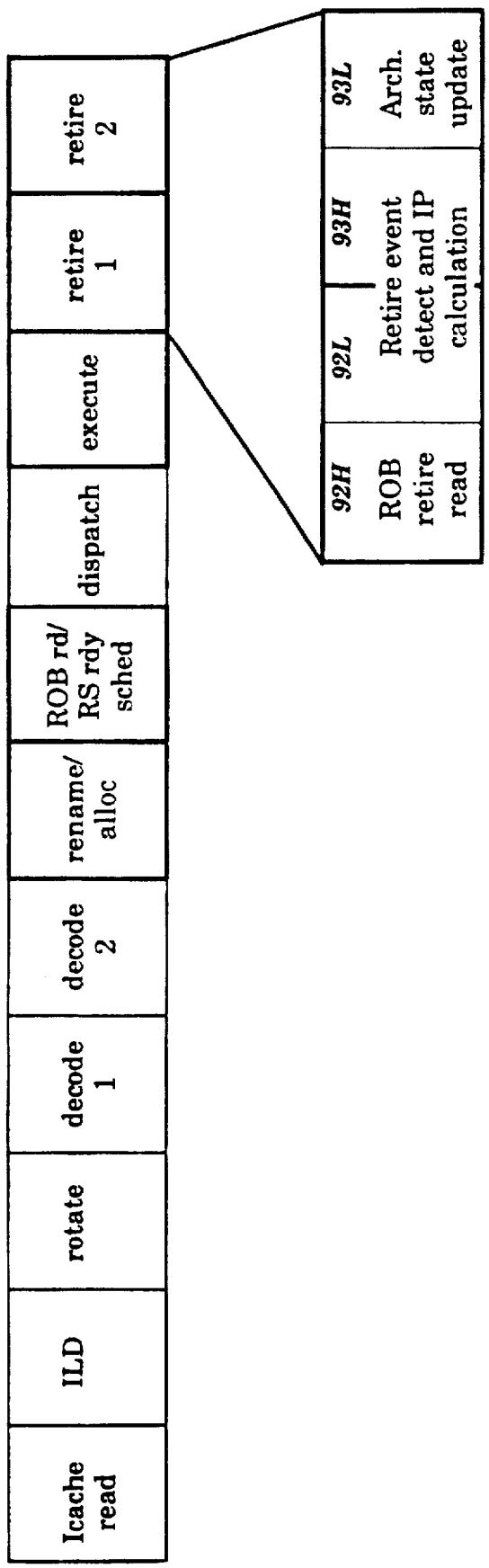
FIG. 17c illustrates the involvement of the reorder buffer during the retirement pipeline stages.

FIG. 17c illustrates the involvement of the ROB 136 during the retirement pipeline stages. In pipeline stage 92H, the retirement control logic 1620 reads candidates for retirement. In pipeline stage 92L, micro-ops ready for retirement are calculated. In pipeline stage 93H, the event detection 1640 detects any events, and the IP calculation 1630 calculates the current instruction pointer. The retirement pipestages are decoupled from writeback pipestages, because the writebacks are out-of-order with respect to the original program. In pipestage 93L, the architectural state is updated by transferring retired ROB entries to the RRF 137.

Data Flow Architecture Examples

Figure 18:
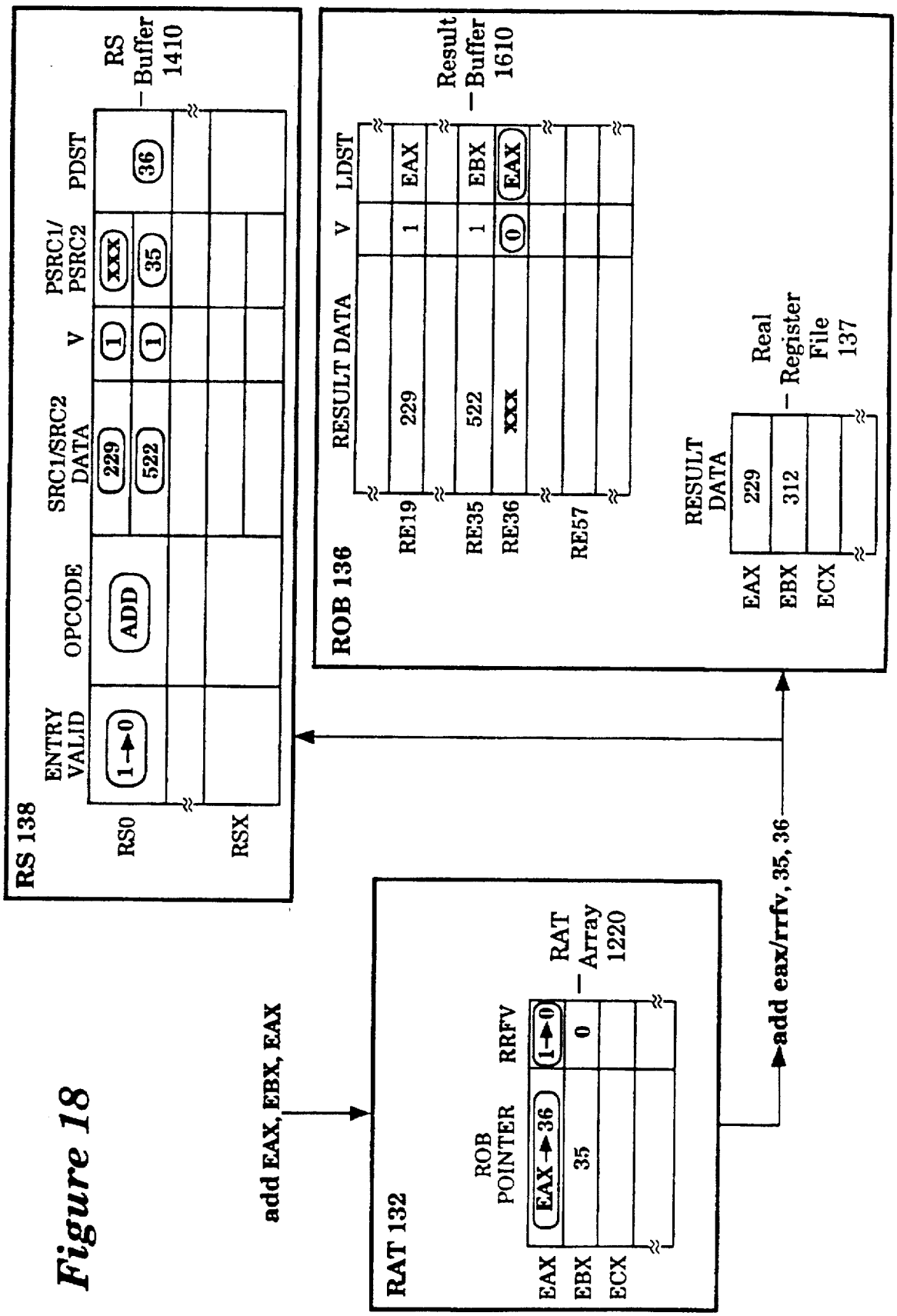
FIG. 18 illustrates a data flow example for processing a logical micro-op in accordance with one embodiment of the present invention.

FIG. 18 illustrates a data flow architecture example for processing a logical micro-op in accordance with one embodiment of the present invention. Although the following example is illustrated with a specific logical and physical micro-op, any format of the micro-op may be used without deviating from the spirit and scope of the invention. The logical micro-op, (add EAX, EBX, EAX), specifies adding the contents located in the logical register EAX with the contents located in the logical register EBX, and storing the result in the logical register EAX. In order to process the example micro-op, the ALLOC 134 receives the logical micro-op (add EAX, EBX, EAX), and generates a physical destination (Pdst) equal to 36. In response, the ALLOC 134 transfers the Pdst 36 to the RAT 132. The RAT 132 receives the Pdst 36, and translates the logical micro-op add EAX, EBX, EAX into a physical micro-op add eax/rrfv, 35, 36. Because the RRFV flag for the EAX entry in the RAT array 1220 is set, the argument eax/rrfv specifies that physical source one (psrc1) resides in the EAX entry of the real register file (RRF) 137. The argument 35 in the RAT array 1220 specifies that physical source two (psrc2) resides in entry RE35 in the ROB 136 as indicated by the RRFV flag for the EBX entry in the RAT array 1220.

The RAT 132 transfers the physical micro-op, add eax/rrfv, 35, 36, to the RS 138 and ROB 136. The RAT 132 stores the allocated Pdst 36 for the physical micro-op add eax/rrfv, 35, 36 into the ROB pointer field of the EAX entry in the RAT array 1220. The RAT 132 also clears the RRFV bit for the EAX entry in the RAT array 1220 to indicate that the logical register EAX is mapped to the ROB 136 in a speculative state.

The ROB 136 receives the physical micro-op add eax/rrfv, 35, 36, and reads source data for the physical source psrc1 eax/rrfv by retrieving the EAX entry in the RRF 137. The ROB 136 reads source data for the physical source psrc2 by retrieving ROB entry RE35 in the result buffer 1610. The EAX entry of the RRF 137 contains a data value equal to 229 for the committed state of the EAX architectural register. The ROB entry RE35 of the result buffer 1610 contains a result data value equal to 522, and a set valid bit indicating the current speculative state of the EBX architectural register.

The ROB 136 transfers source data (src1), 229, and source data (src2), 522, and corresponding valid bits, to the RS 138. The ROB 136 receives the logical destination (LDST) EAX for the add eax/rrfv, 35, 36, physical micro-op, and stores the logical destination ( ) EAX into the LDST field of the RE36 entry of the result buffer 1610. The ROB 136 clears the valid flag in the RE36 entry to indicate that the corresponding result data is not valid.

The RS 138 receives the add eax/rrfv, 35, 36 physical micro-op, and stores the add opcode into the opcode field of the RS0 entry in the RS buffer 1410 as specified by the ALLOC 134. The RS 138 also stores the physical destination (Pdst) 36 into the PDST field of the RS0 entry. The RS 138 stores the physical source locations, "xxx" for psrc1, and "35" for psrc2, into the PSRC1/PSRC2 fields of entry RS0. The RS 138 also sets the entry valid flag for the RS0 entry. In addition, the RS 138 receives the source data values, 229 for src1, and 522 for src2, as well as corresponding valid flags. The RS 138 stores the source data values and corresponding valid flags into the SRC1/SRC2 and V fields, respectively, of the RS buffer 1410 entry RS0.

Note that if the RAT contains a READY bit identification for the register location designated as containing the source data (e.g., src1, src2) and the READY bit for a source for a micro-op indicates that the data at that ROB 136 location is not valid (e.g., not ready), then the ROB 136 read will not be performed because the ROB 136 Read operation will not result in data being forwarded from the ROB 136 to the RS 138. If multiple micro-ops, such as four micro-ops, are being forwarded from the RAT to the RS 138 in each cycle and each has two source data values, then eight ROB 136 read operations would have to be performed eight times a cycle. Therefore, the ROB 136 would be required to have eight ports. Since statistically it is very unlikely that all eight data sources are available, by maintaining the active register file of READY indications in the RAT, the ROB 136 does not have to have eight read ports. Therefore, use of the active register file allows only ready operands to be steered to the source of the registers. Also the number of ports needed for the ROB 136 is reduced, thereby increasing the speed and reducing the required area on the integrated circuit.

Figure 19A:
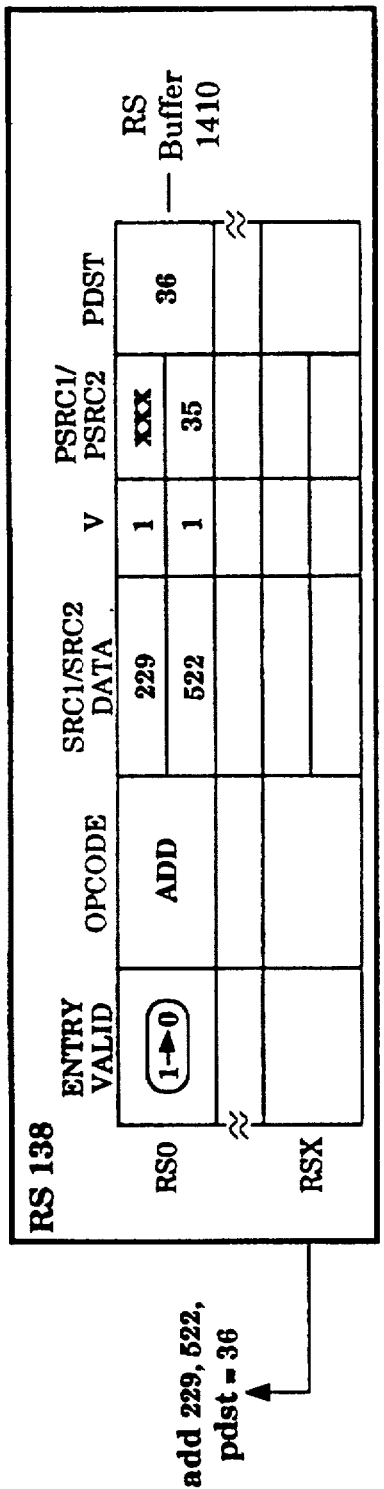
FIG. 19a, 19b, and 19c illustrates a data flow example of dispatching a physical micro-op from the reservation station in accordance with one embodiment of the present invention.
Figure 19B:
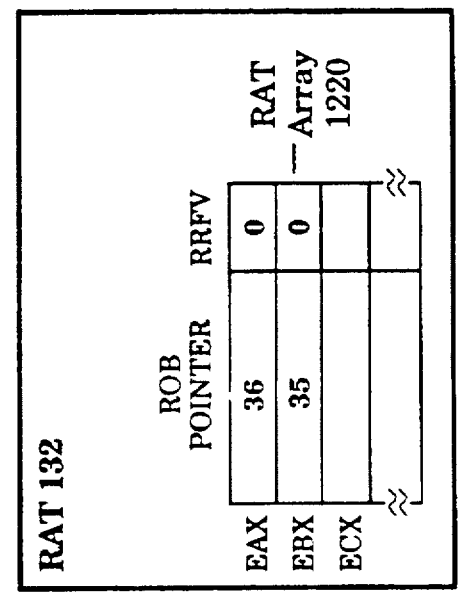
Figure 19C:
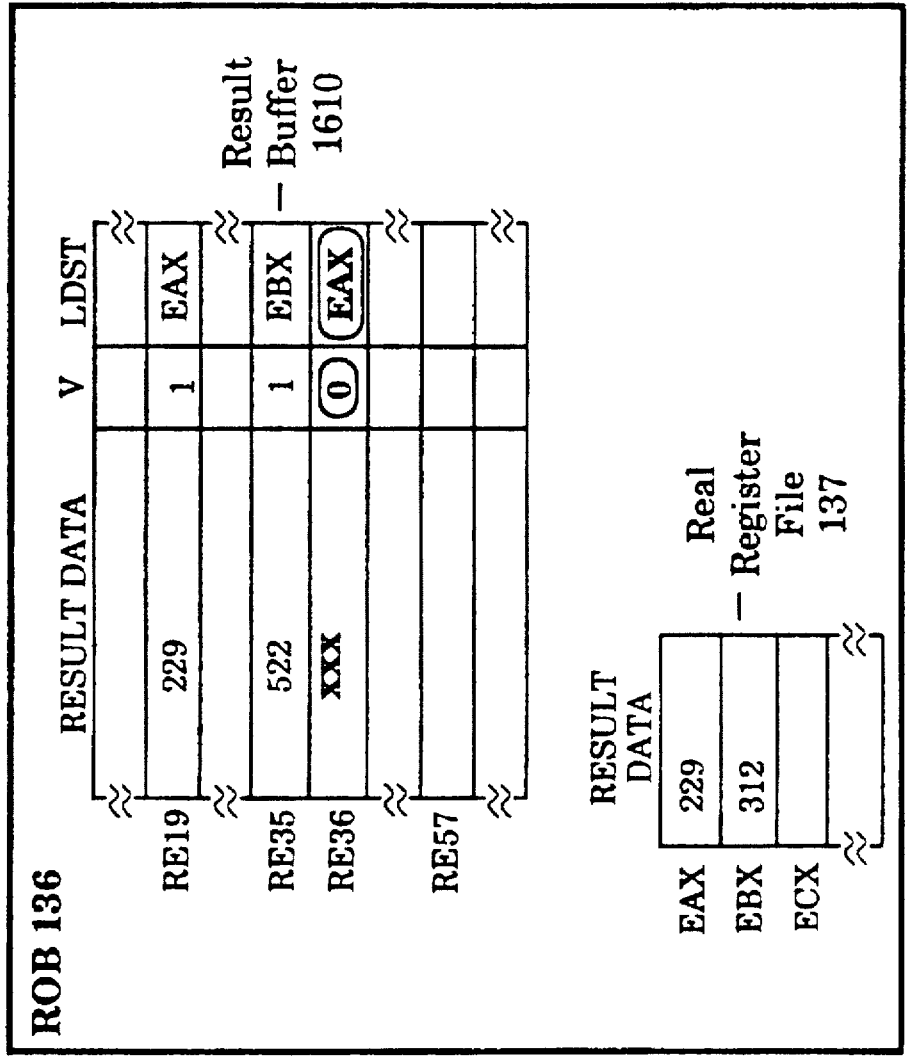

FIGS. 19a–c illustrate an example of dispatching a physical micro-op from the RS 138 in accordance with one embodiment of the present invention. The add eax/rrfv, 35, 36, physical micro-op, residing in entry RS0 in the RS buffer 1410, is ready for dispatch to the execution cluster 118 because the source data is fully assembled as indicated by the source data valid bit (V) for each source data. In order to dispatch the micro-op, the RS 138 transfers the physical micro-op add 229, 522, pdst=36 to an appropriate execution unit in the execution cluster 118. Specifically, the RS 138 generates dispatched physical micro-op add 229, 522, pdst=36 by reading the OPCODE, SRC1/SRC2, and PDST fields of entry R0 in the RS buffer 1410. The RS 138 clears the entry valid flag of entry RS0 to enable allocation of the RS0 entry for use by a subsequent physical micro-op. The RS 138 notifies the ALLOC 134 of the physical micro-op dispatch, and thereafter, the ALLOC 134 allocates the RS0 entry to a subsequent physical micro-op.

Figure 20:
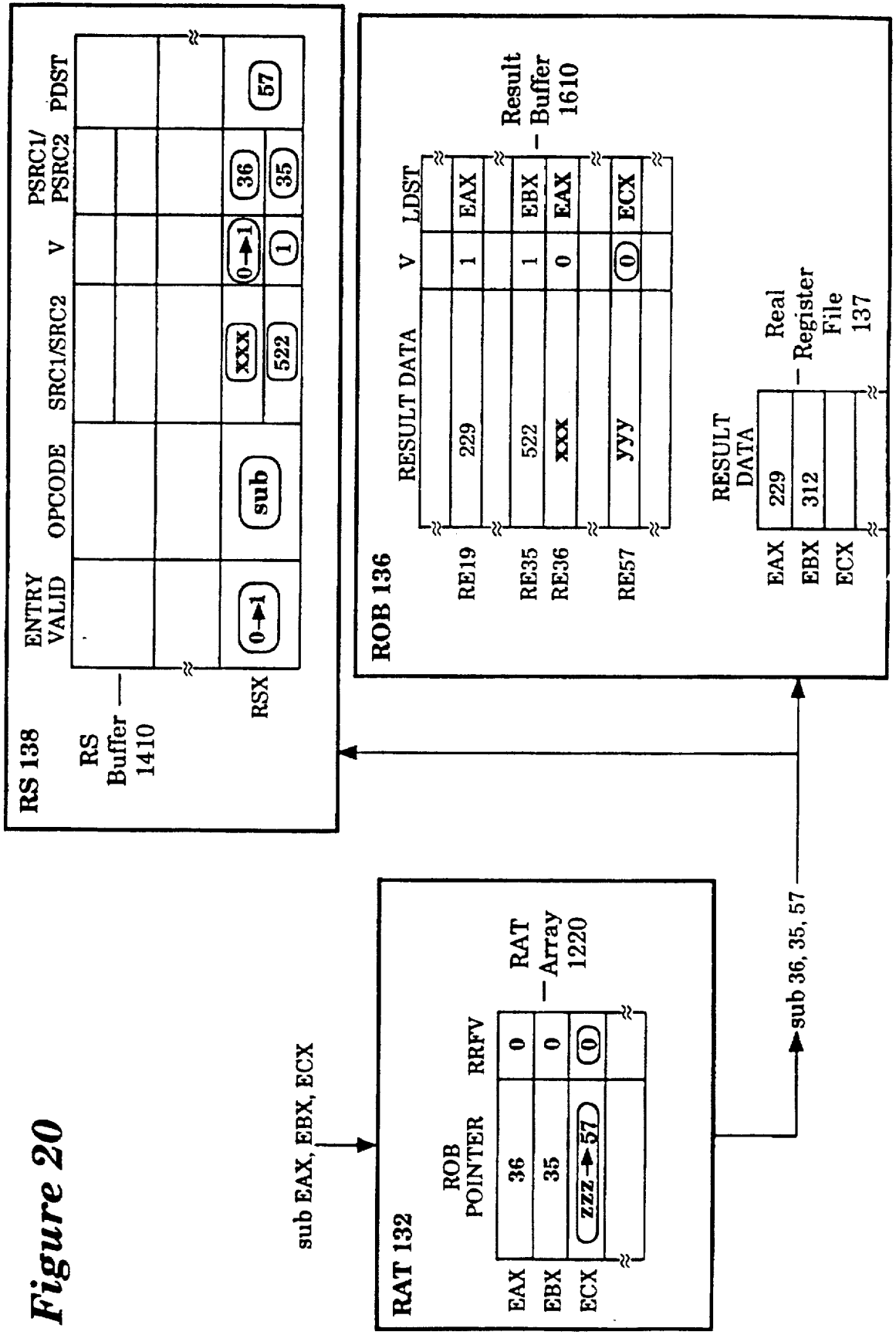
FIG. 20 illustrates a second data flow example for processing a logical micro-op in accordance with one embodiment of the present invention.

FIG. 20 illustrates a second data flow architecture example for processing a logical micro-op in accordance with one embodiment of the present invention. For the example illustrated in FIG. 20, the issue cluster 114 issues a logical micro-op (sub EAX, EBX, ECX) while the execution cluster 118 executes the dispatched physical micro-op add 229, 522, pdst=36. The ALLOC 134 receives the logical micro-op sub EAX, EBX, ECX, and generates a physical destination (Pdst) equal to 57. The ALLOC 134 transfers the Pdst, 57, to the RAT 132, and the RAT 132 translates the logical micro-op into a physical micro-op, sub 36, 35, 57. The ROB pointer and the RRFV flag for the EAX entry in the RAT array 1220 indicates that the physical micro-op argument, 36, is located in entry RE36 in the result buffer 1610. Similarly, the physical micro-op argument, 35, specifies that psrc2 is located in entry RE35 in the result buffer 1610.

The RAT 132 stores the allocated Pdst 57 for the physical micro-op sub 36, 35, 57 into the ROB pointer field of the ECX entry, and clears the RRFV bit for the ECX entry to indicate that the logical register ECX is mapped to the result buffer 1610 in a speculative state. The RAT 132 transfers the physical micro-op sub 36, 35, 57, to the RS 138 and the ROB 136.

The ROB 136 reads source data for psrc1 by reading ROB entry RE36 of the result buffer 1610, the ROB 136 reads source data for the physical source psrc2 35 by reading ROB entry RE35 of the result buffer 1610. The ROB 136 entry RE36 contains a result data value equal to "xxx", and a cleared valid bit indicating invalid result data for the current speculative state of the EBX architectural register. Prior to the result writeback for the dispatched physical micro-op add 229, 522, pdst=36 from the execution cluster 118, the result data for RE36 is invalid. The ROB 136 entry RE35 contains a result data value equal to 522 and a set valid bit for the current speculative state of the EBX architectural register.

The ROB 136 transfers the result data values, "xxx" and "522", and the corresponding valid bits to the RS 138 for the src1 and src2 data. The ROB 136 receives the logical destination ( ) ECX for the physical micro-op sub 36, 35, 57, and stores the logical destination ( ) ECX into the LDST field of the RE57 entry in the result buffer 1610. The ROB 136 clears the valid flag in the RE57 entry to indicate that the corresponding result data are not valid.

The RS 138 receives the physical micro-op sub 36, 35, 57, and stores appropriate information in the RS buffer 1410. Specifically, the opcode "sub" is stored into the opcode field of the RSx entry, the physical destination pdst 57 is stored into the PDST field, and the physical sources psrc1 36 and psrc2 35 are stored into the PSRC1/PSRC2 fields. In addition, the RS 138 sets the entry valid flag for the entry RSx. The physical micro-op sub 36, 35, 57 is not ready for dispatch to the execution cluster 118 because the source data is not fully assembled. Upon write back from the dispatched physical micro-op add 229, 522, pdst=36, the physical micro-op sub 36, 35, 57, becomes data ready.

Figure 21A:
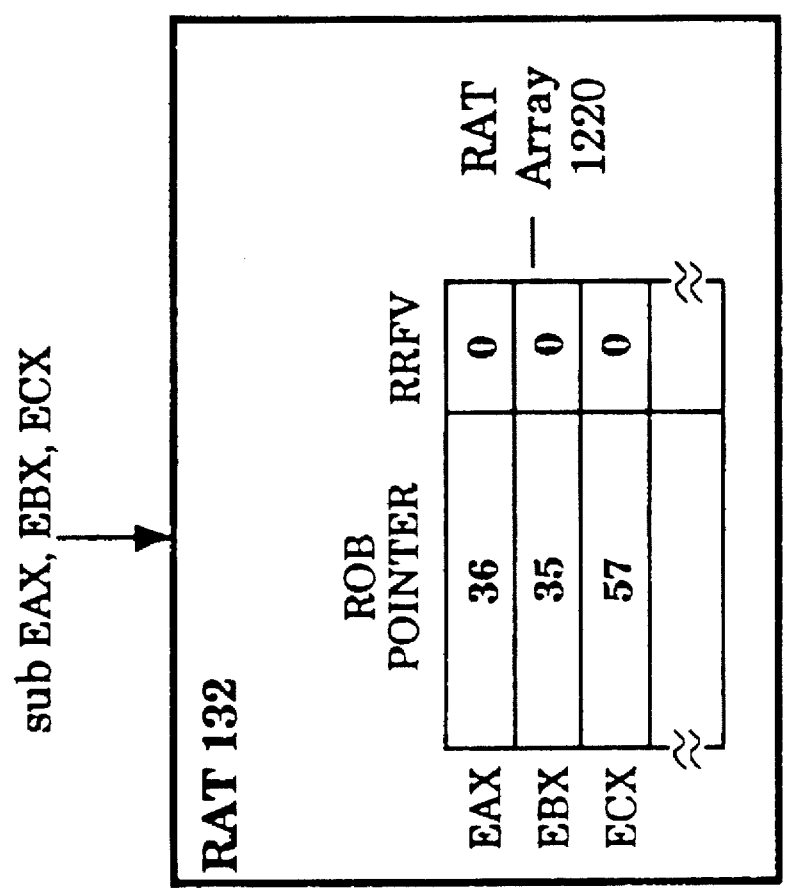
FIG. 21a and 21b illustrates a data flow example of a result data write back from the execution cluster configured in accordance with one embodiment of the present invention.
Figure 21B:
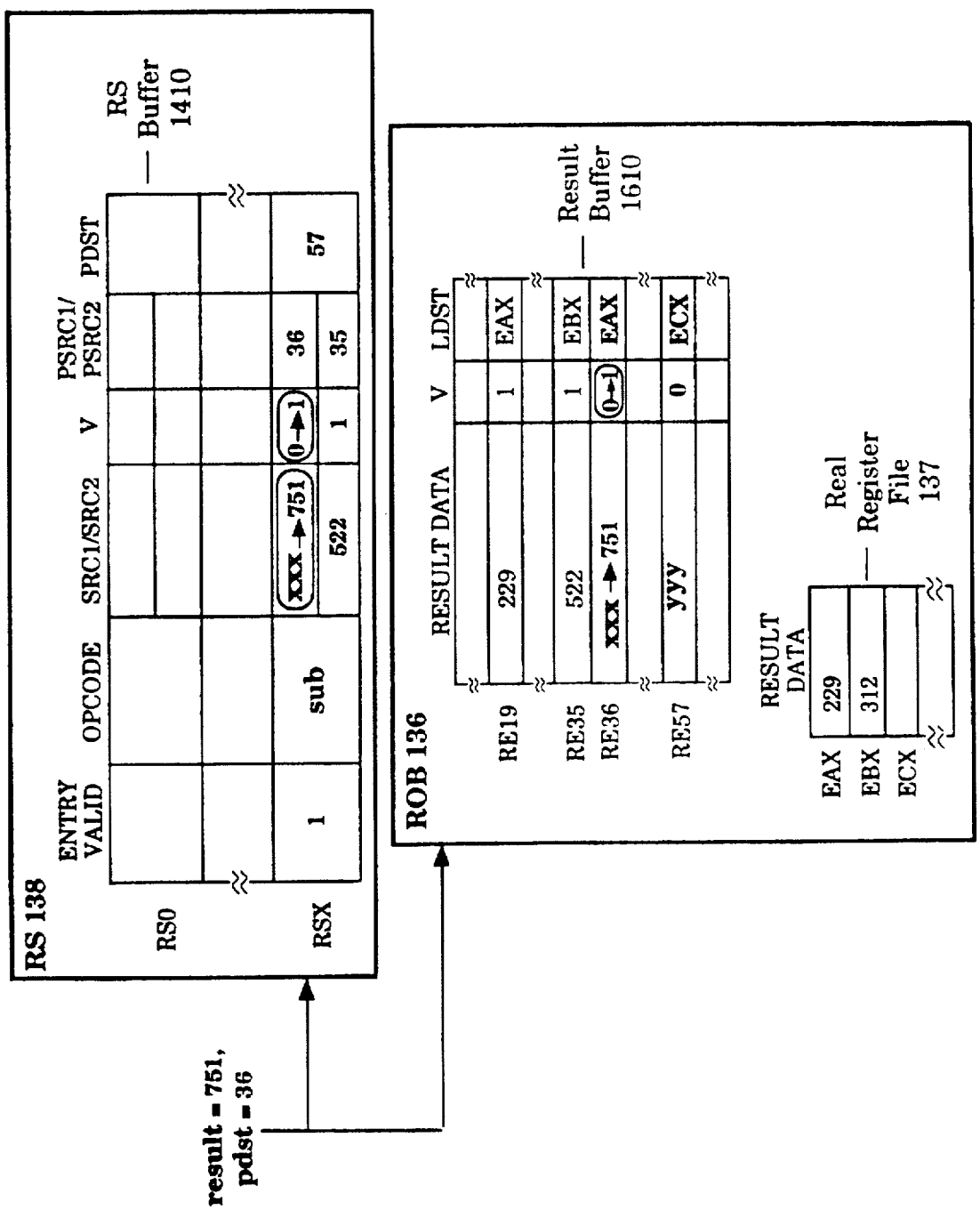

FIGS. 21a–b illustrate an example of a result data write back from the execution cluster 118 configured in accordance with one embodiment of the present invention. For the example shown in FIGS. 21a–b, the execution cluster 118 writes back to the RS 138 the data result "751", corresponding physical destination Pdst "36", and corresponding valid flag for the dispatched physical micro-op add 229, 522, Pdst=36 on the writeback bus 139. The RS 138 receives the data result "751" and corresponding valid flag, and stores the data result "751" into the SRC1 field, and the valid flag into the V field of the RSx entry. The physical micro-op sub 36, 35, 57 stored in the RSx entry is now ready for dispatch to the execution cluster 118 because the source data is fully assembled.

The ROB 136 receives the data result "751" and corresponding physical destination Pdst "36", and stores data result "751 into the result data field of entry RE36 as specified by the physical destination Pdst 36. The ROB 136 also sets the corresponding valid flag to indicate that the ROB entry RE36 contains valid speculative data for the EAX architectural register.

Figure 22C:
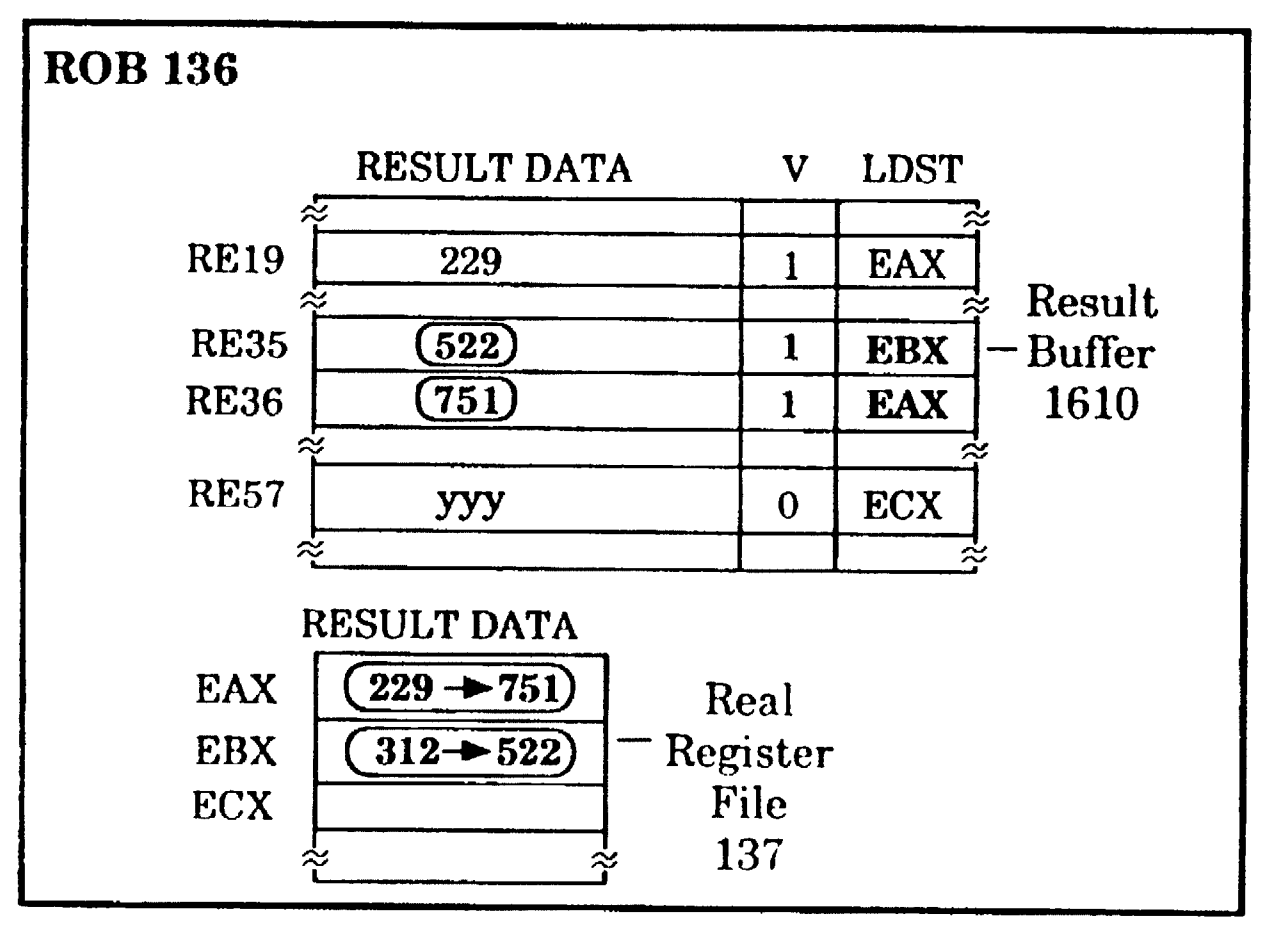

FIGS. 22a–c illustrate a retirement example of speculative information from physical registers in the ROB 136 to committed state registers in the RRF 137 in accordance with one embodiment of the present invention. The retirement control logic 1620 retires the physical registers in the result buffer 1610 in the original program order as a retirement pointer follows the header or allocation pointer through the in-order physical registers. For the example illustrated in FIGS. 22a–c, the retirement control logic 1620 retires the physical register RE35 by initially testing the corresponding valid bit. The valid bit indicates that the corresponding speculative result data are valid. As a consequence, the retirement control logic 1620 transfers speculative result data from the physical register RE35 to the committed state register EBX in the RRF as specified by the field of the physical register RE35.

Similarly, the retirement control logic 1620 retires the physical register RE36 by initially testing the corresponding valid bit. Because the corresponding valid bit indicates that the corresponding speculative result data is valid, the retirement control logic 1620 transfers speculative result data from the physical register RE36 to the committed state register EAX in the RRF 137 as specified by the field of the physical register RE36. In addition, the retirement control logic 1620 notifies the RAT 132 and the ALLOC 134 of the retirement of physical registers RE35 and RE36. In response, the RAT 132 updates the RRFV flags in the RAT array 1220 to reflect the retirement. The retirement notification indicates to the ALLOC 134 that the retired physical registers RE35 and RE36 are available for allocation.

Integer Execution Unit (IEU)

In general, the IEU 144 executes and computes all single cycle ALU micro-ops. In addition, the IEU 144 validates the correctness of all control flow micro-ops and reports the result to the appropriate units. The IEU 144 contains two similar ALU clusters, thereby allowing the processor to execute two integer ALU micro-ops in parallel. The first and second ALU clusters in the IEU 144 are coupled to the RS 138. The first ALU cluster executes most of the single cycle integer micro-ops, not including the jump micro-ops. The second ALU cluster contains the jump execution unit. The second ALU cluster performs four primary functions: executes all ALU micro-ops, executes six additional ALU instructions not executed by the first ALU cluster, determines if a branch is predicted correctly, and executes control register read write requests. When determining whether a branch was properly predicted, the jump execution unit within the IEU 144 reports the branch information, and computes the linear or virtual branch address for the target. The RS 138 dispatches micro-ops to the appropriate cluster within the IEU 144. If the micro-op is a branch instruction, the IEU 144 transmits the target address and branch information to the BTB 124, MS 130, IFU 122, and BAC 128. The writeback ports, coupling the IEU 144 to the writeback bus 139, are shared with the FEU 142.

The jump execution unit within the IEU 144 detects valid jump micro-ops dispatched from the RS 138. In response, the jump execution unit executes either micro or macro jump micro-ops to ascertain the actual branch condition. The jump execution unit compares the actual and predicted branch conditions to report the branch as predicted correctly, or predicted incorrectly (e.g. whether the branch is taken or not taken). The jump execution unit writes back linear and virtual branch addresses for the branch micro-op. If a branch was incorrectly predicted and subsequently taken, the jump execution unit asserts a control signal, JE Clear, to flush the in-order instruction pipe upon detecting the oldest mispredicted branch. The JE Clear starts the in-order portion of the processor fetching and decoding down the correct path, and stalls instruction issue into the out-of-order portion of the processor.

Figure 23:
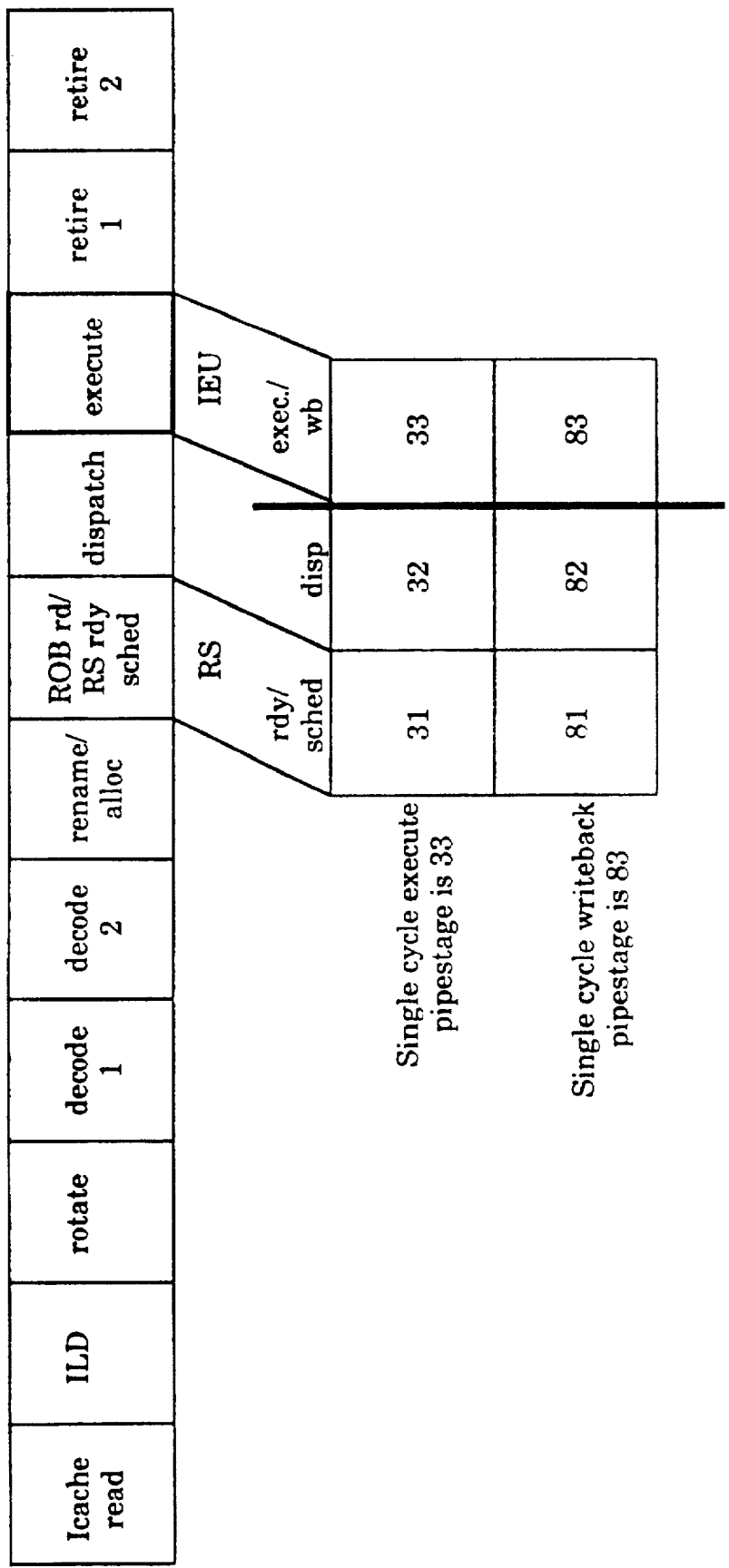
FIG. 23 illustrates an integer execution unit operation within one embodiment of the processor pipeline of the present invention.

FIG. 23 illustrates the IEU 144 operation within one embodiment of the processor pipeline of the present invention. The ROB 136 read, and RS 138 ready and schedule occurs in pipestages 31 and 81. The IEU 144 receives a valid micro-op, up to two source operands, flags, and Pdsts from the RS 138 in pipestages 32 and 82. The IEU 144 writes back the result, fault information, flags to the RS 138 and ROB 136 in pipestages 33 and 83. As shown in FIG. 23, the IEU is a single cycle execution unit.

Address Generation Unit (AGU)

The AGU 146 computes the linear address utilizing a base address, a displacement value, a scale value, an index value and a segment value. In one embodiment, the linear address contains 32-bits wherein, 20 higher order bits identify a memory page and 12 low order bits identify the off-set within the memory page. The address generation (AGU) 146 performs address calculations, handles all segment operations, and controls accesses to all control test registers. The AGU 146 contains two independent address calculation blocks, each capable of producing a linear address and effective address every clock cycle. In addition, the calculation blocks check for segment limit violations, alignment faults, and perform access time protection checks.

The AGU 146 is coupled to the RS 138 in order to receive micro-ops. The AGU 146 is also coupled to the memory cluster 120 permitting transmission of the linear address to the memory cluster 120 every clock cycle. For address generation, the AGU receives data from either the RS 138, IEU 144, or MIU 140. The data is utilized, with a segment base, to create a linear address. For control register accesses, the AGU 146 receives input data from the RS 138 in the form of micro-ops and source data operands. If a memory calculation is successful, the AGU 146 transmits an address to the memory cluster 120 to complete the memory operation. Alternatively, if the memory calculation faults, the AGU 146 drives fault status to the ROB 136, and cancels the operation in the memory cluster 120.

The AGU 146 supports the segmentation and protection implementation for compatibility with the Intel® architecture microprocessors. The AGU 146 contains a segment block that includes the segment register file. The segment block is capable of handling all the segment register loads. In addition, the segment block contains the hardware that performs protection checks for segment register loads. In general, a segment operation loads segment register data in the segment register file. If a segment operation is successful, the AGU 146 writes status back to the ROB 136. If the segment operation is not successful, the AGU 146 drives a vector containing the fault status for the operation that faulted. The AGU 146 also contains a scratch pad unit having architecturally visible control registers that are used by micro-code. For control register operations, the AGU 146 writes data to the ROB 136. For a control register read, register data is written, and for register writes, the micro-address of the control register is written.

Figure 24A:
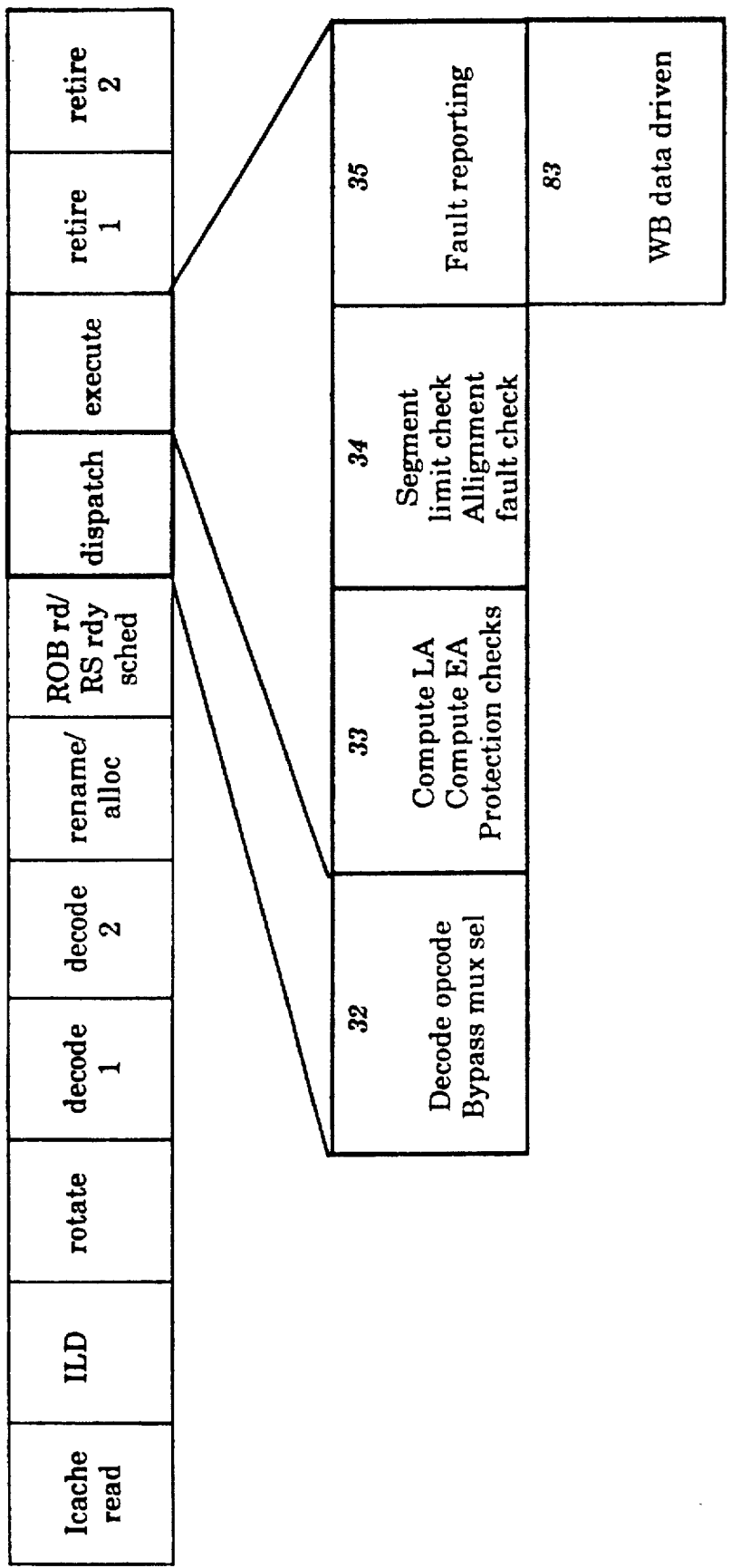
FIG. 24a illustrates the address generation unit address calculation pipeline stages configured in accordance with one embodiment of the present invention.
Figure 24B:
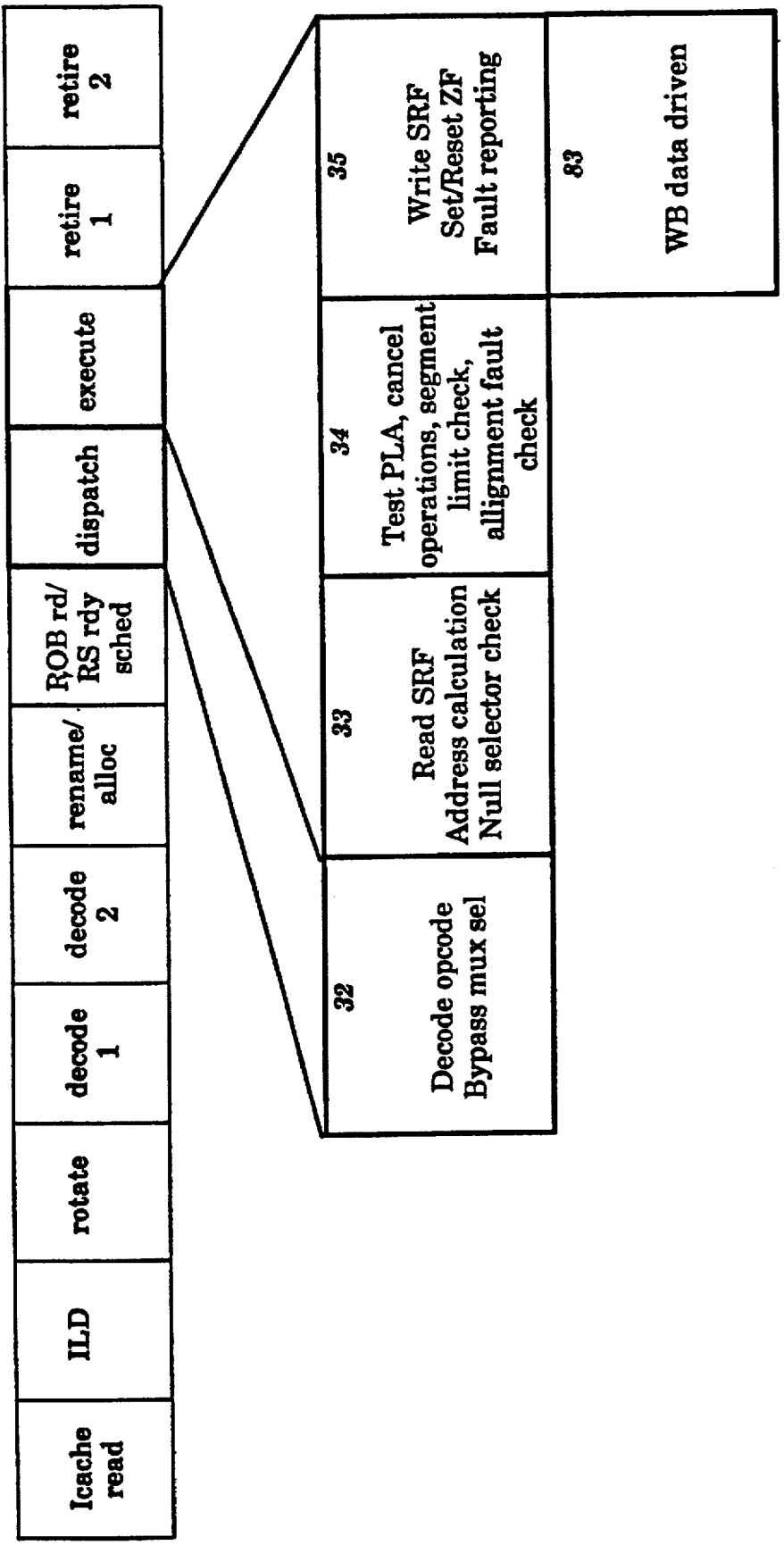
FIG. 24b illustrates one embodiment of pipeline stages for the segment load operations occurring in the address generation unit.
Figure 24C:
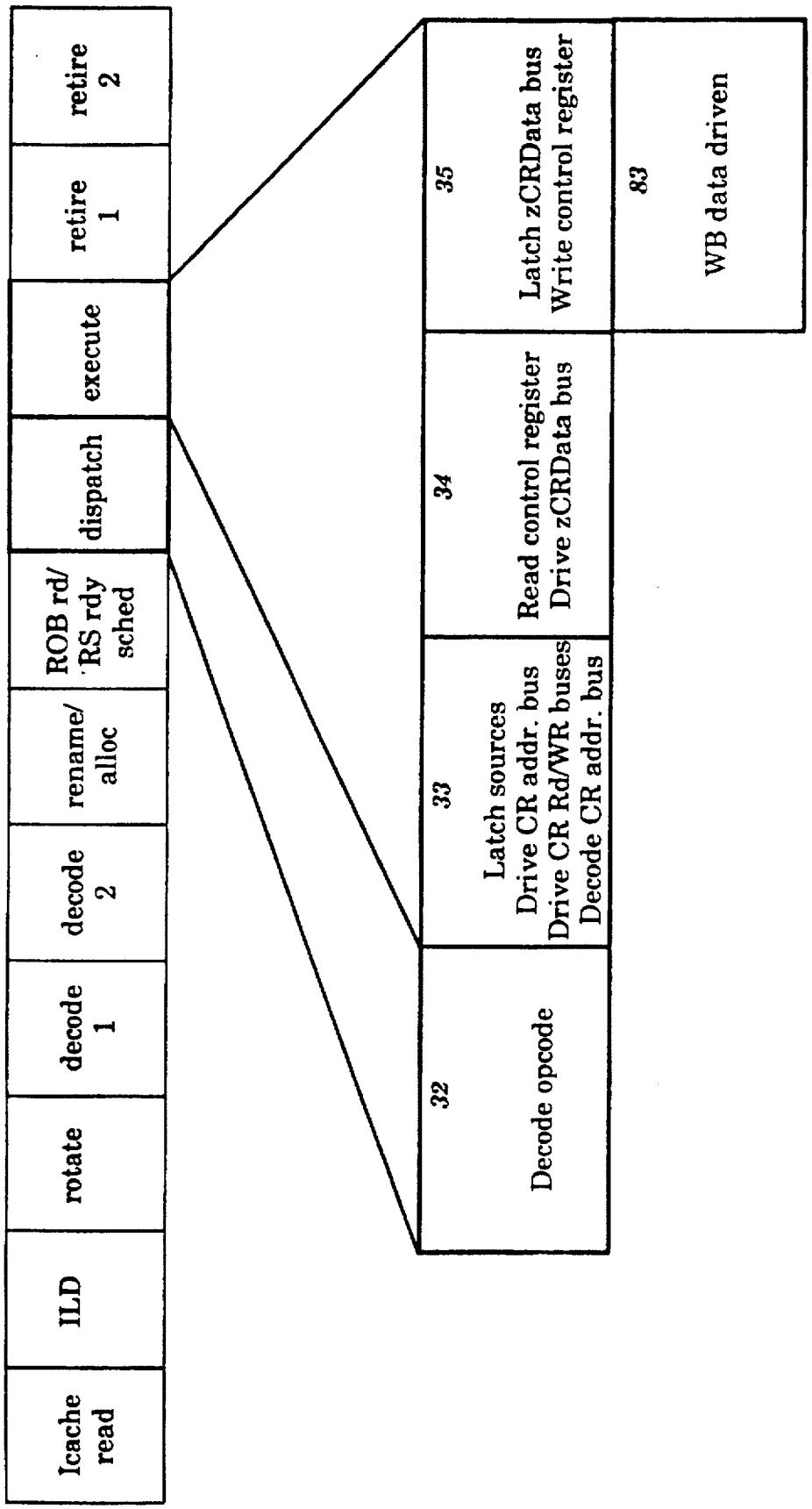
FIG. 24c illustrates the address generation unit control register operation pipeline stages.

FIGS. 24a–c illustrate processor pipeline stages involving the AGU 146 configured in accordance with one embodiment of the present invention. FIG. 24a illustrates the AGU 146 address calculation pipeline stages. In pipeline stage 32, the AGU 146 receives inputs from RS 138 and latches the inputs in pipeline stage 33. The linear address and MOB split information is driven to the MIU 140 in pipestage 33, and a special AGU cancel signal is driven to the MIU 140 in pipestage 34. All writeback data is driven during writeback pipestages 35 and 83. Pipestages 33, 34, and 35 are aligned with the memory pipestages 41, 42 and 43.

FIG. 24b illustrates one embodiment of pipeline stages for the segment load operations occurring in the AGU 146. For segment register file operations, the AGU 146 decodes the op code in pipestage 32. In pipestage 33, the segment register file is read, the address calculation for a segment load is completed, and a null selector test is performed on a segment provided. In pipestage 34, tests are performed on the segment data including segment limit and fault checks. Writeback, including fault information reporting, occurs during pipestages 34 and 35.

FIG. 24c illustrates the AGU 146 control register operation pipeline stages. For control register operations, the op code is decoded in pipestage 32. In pipestage 33, the address is latched from the RS 138, and broadcast to all units with the read write signals based on the op code. In pipestage 34, the appropriate unit reads the control register. In pipestage 35, the control registers are written, and during pipestage 83, the result writeback occurs.

Memory Interface Unit (MIU)

Figure 25:
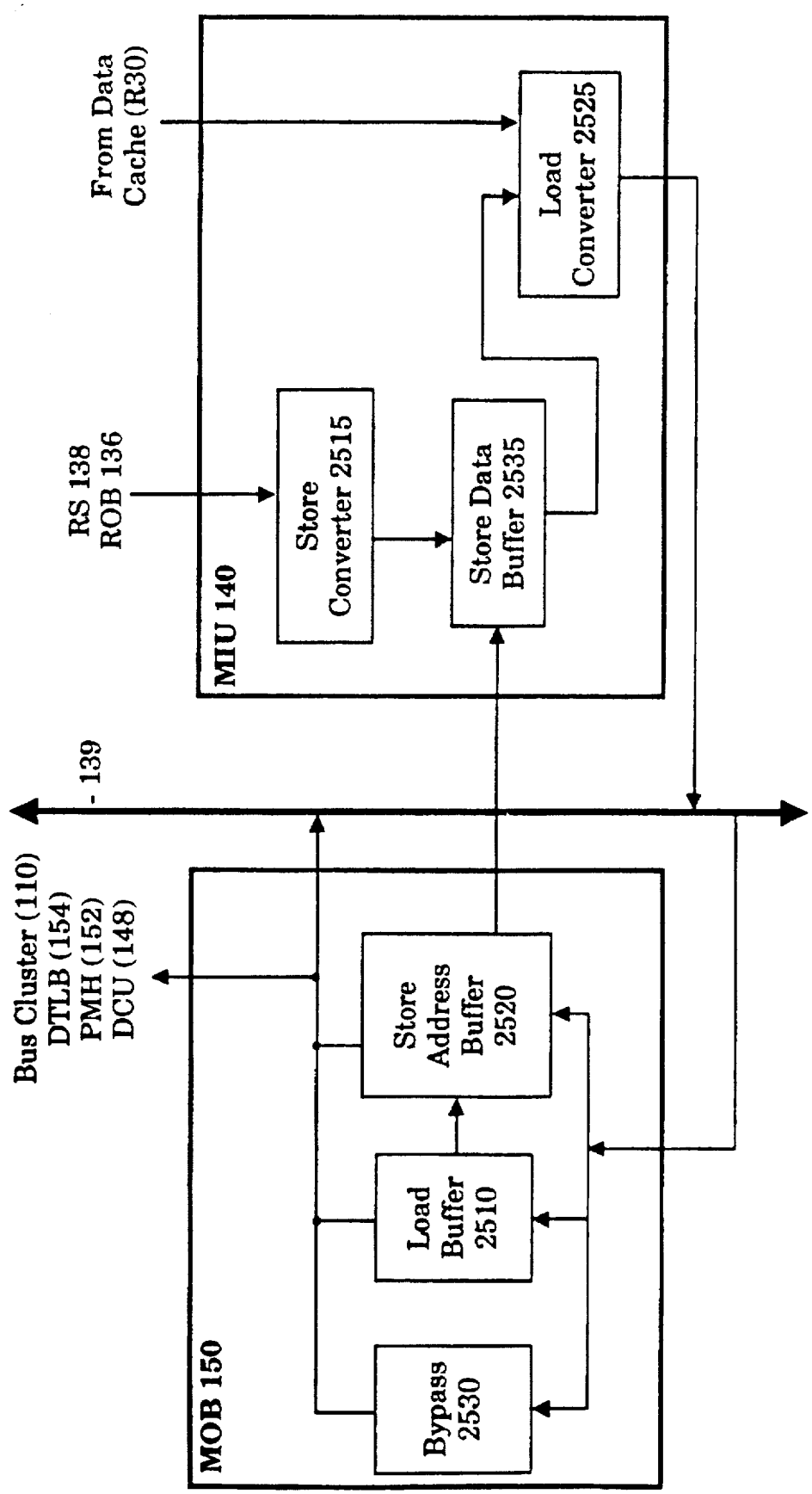
FIG. 25 illustrates a block diagram of a memory interface unit configured in accordance with one embodiment of the present invention.

The memory interface unit (MIU) 140 performs integer and floating point format conversions. FIG. 25 illustrates, in part, a block diagram of the MIU 140 configured in accordance with one embodiment of the present invention. The MIU 140 contains four distinct sub-blocks: the load converter 2525, the store converter 2515, the store data buffer 2535, and the floating point constant ROM (not shown). The load converter 2525 is responsible for converting both integer and floating point data from a specific memory format to a processor internal format. The data cache unit (DCU) 148 provides the data to convert, and the type of conversion to perform.

Figure 28:
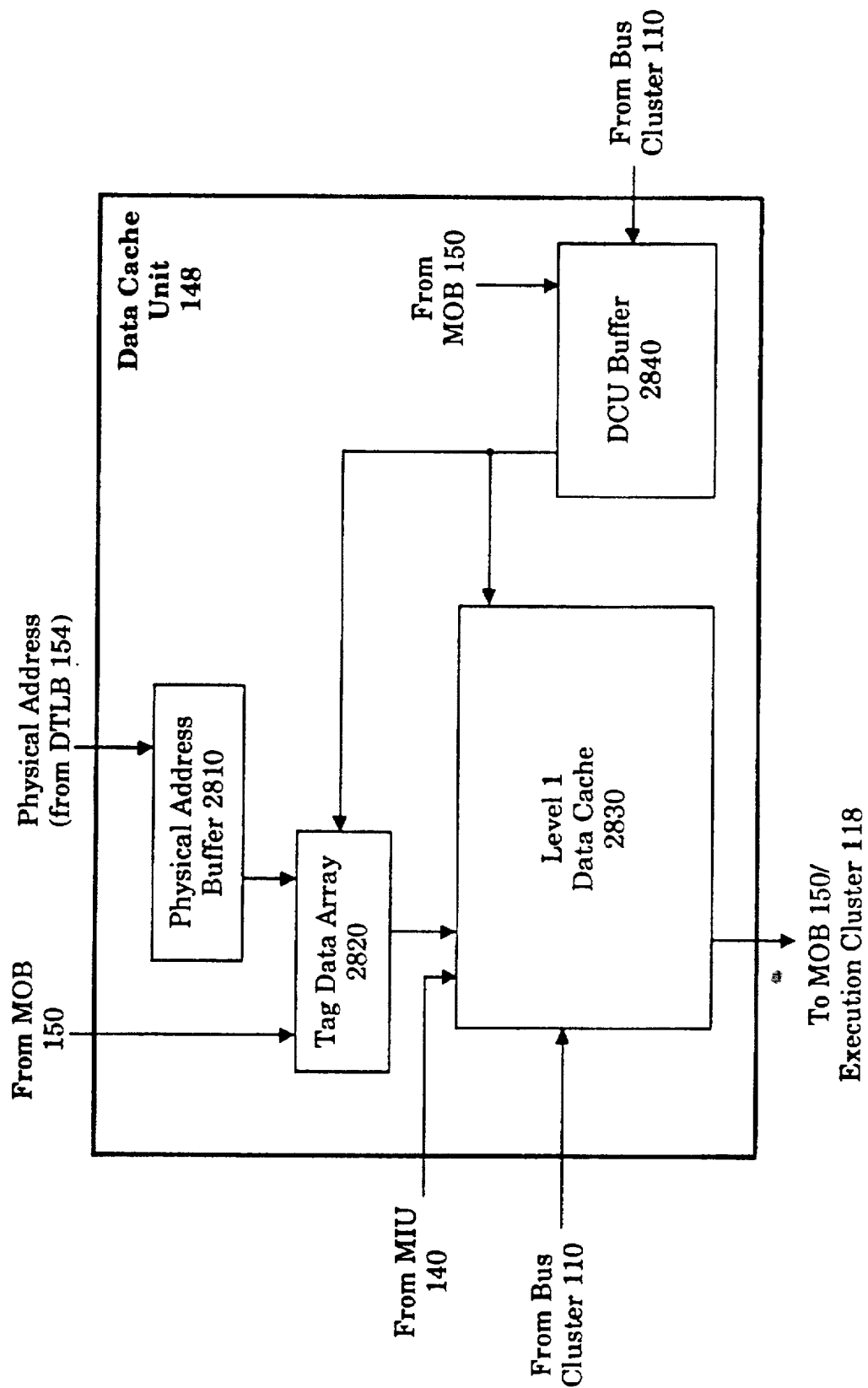
FIG. 28 illustrates a block diagram of a data cache unit configured in accordance with one embodiment of the present invention.

The store converter 2515 is coupled to the store data buffer 2535, such that store converter 2515 receives data from the RS 138, and transmits data to the store data buffer 2535. In response, the store data buffer 2535 transmits data to a data cache 2830 (FIG. 28). In general, the store converter 2515 converts floating point data for store operations. The store data buffer 2535 receives and stores the store operations and in cooperation with the store address buffer 2520, and a physical address buffer 2810 (FIG. 28) of the DCU 148, retires/commits the store operations as appropriate, and causes execution to the memory system.

The memory order buffer (MOB) 150 supervises each load operation, and controls special bypass cases from the store data buffer 2535. The store converter 2515 is responsible for converting both integer and floating point data from processor internal format to a specific memory format. The RS 138 provides the type of data conversion to perform. The store data buffer 2535 holds stored data in the memory format. The MOB 150 stores the data to memory by transferring a specified store data buffer entry to the DCU 148. Both integer and floating point data reside in the store data buffer. In addition, data are transferred from the store data buffer 2535 to the load converter 2525 under MOB 150 control. The floating point (FP) constant ROM contains floating point constants in an internal precision format. The constants are utilized by the Intel® architecture microprocessor instructions. The MIU 140 is described more fully below in conjunction with a description of the MOB 150.

Figure 26A:
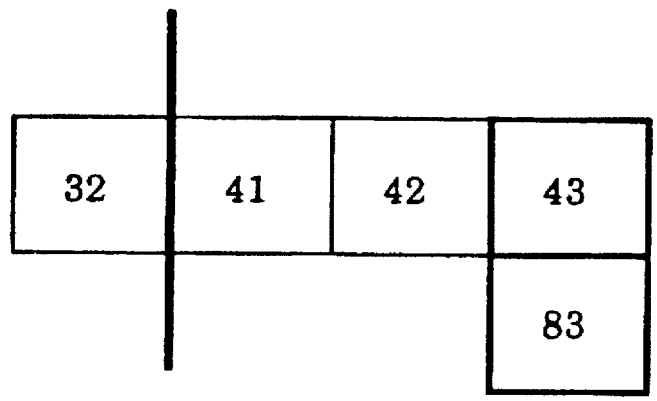
FIG. 26a illustrates pipeline stages for the load conversion operation performed in the memory interface unit.

FIG. 26a illustrates pipeline stages for the load conversion operation performed in the MIU 140. As shown in FIG. 26a, the DCU 148 rotates data in pipestage 43, and MIU 140 converts data in pipestage 83 for a load operation.

Figure 26B:
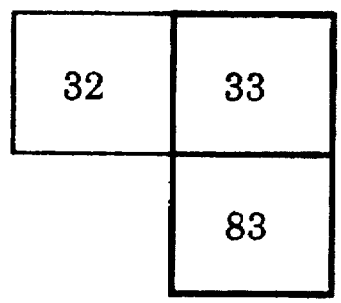
FIG. 26b illustrates the store conversion operation within the processor pipeline.

FIG. 26b illustrates the store conversion operation within the processor pipeline. The MIU 140 converts data and writes to the store data buffer in pipestage 33. In pipestage 83, the M1U 140 drives writeback flags, fault information, and data valid.

Figure 26C:
FIG. 26c illustrates the store to memory operation in the processor pipeline of the present invention.

FIG. 26c illustrates the store to memory operation in the processor pipeline of the present invention. The MOB 150 transmits an index to the MIU 140 in pipestage 41. In pipestage 42, the MIU 140 writes store data to the DCU 148. In pipestage 43, the DCU 148 writes data to the a level 1 (L1) cache located within the DCU 148.

Figure 26D:
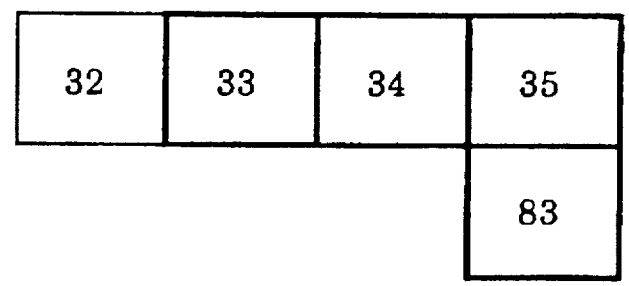
FIG. 26d illustrates a floating point read only memory read operation within the processor pipeline of the present invention.

FIG. 26d illustrates a floating point ROM read operation within the processor pipeline of the present invention. In pipestage 32, the RS 138 dispatches micro-op, source 1, and source 2 data. In pipestage 33, the MIU latches data and creates a ROM address. The ROM address is utilized in pipestage 35 for an array access. In pipestage 83, a floating point constant from the ROM access, is written back.

Floating Point Execution Unit (FEU)

The processor of the present invention performs floating point operations via a floating point execution unit (FEU) 142. The FEU 142 may comprise any floating point functional unit without deviating from the spirit and scope of the invention. In one embodiment, the FEU 142 contains a floating point adder unit (FAU), a floating point rounding unit (FRND), a floating point multiplier (FMU), and a floating point wire unit (FWU), as well as source data and bypass multiplexors. The FAU performs floating point addition, subtraction, and comparison, as well as other floating point operations necessary for support of floating point assists, floating point exception handling, and floating point transcendentals. The FMU executes both floating point and integer multiplications and divisions, and partial remainder and square root operations. The FRND performs rounding and data writeback for all floating point operations performed in the FAU and FMU. The FMU writeback integer results from the FMU without rounding. The FWU performs floating point and integer primitive micro-ops that require large amounts of routing and multiplexing of data. The FEU 142 is coupled to the RS 138 and ROB 136, permitting writeback of executed results to the RS 138 and ROB 136.

Figure 27:
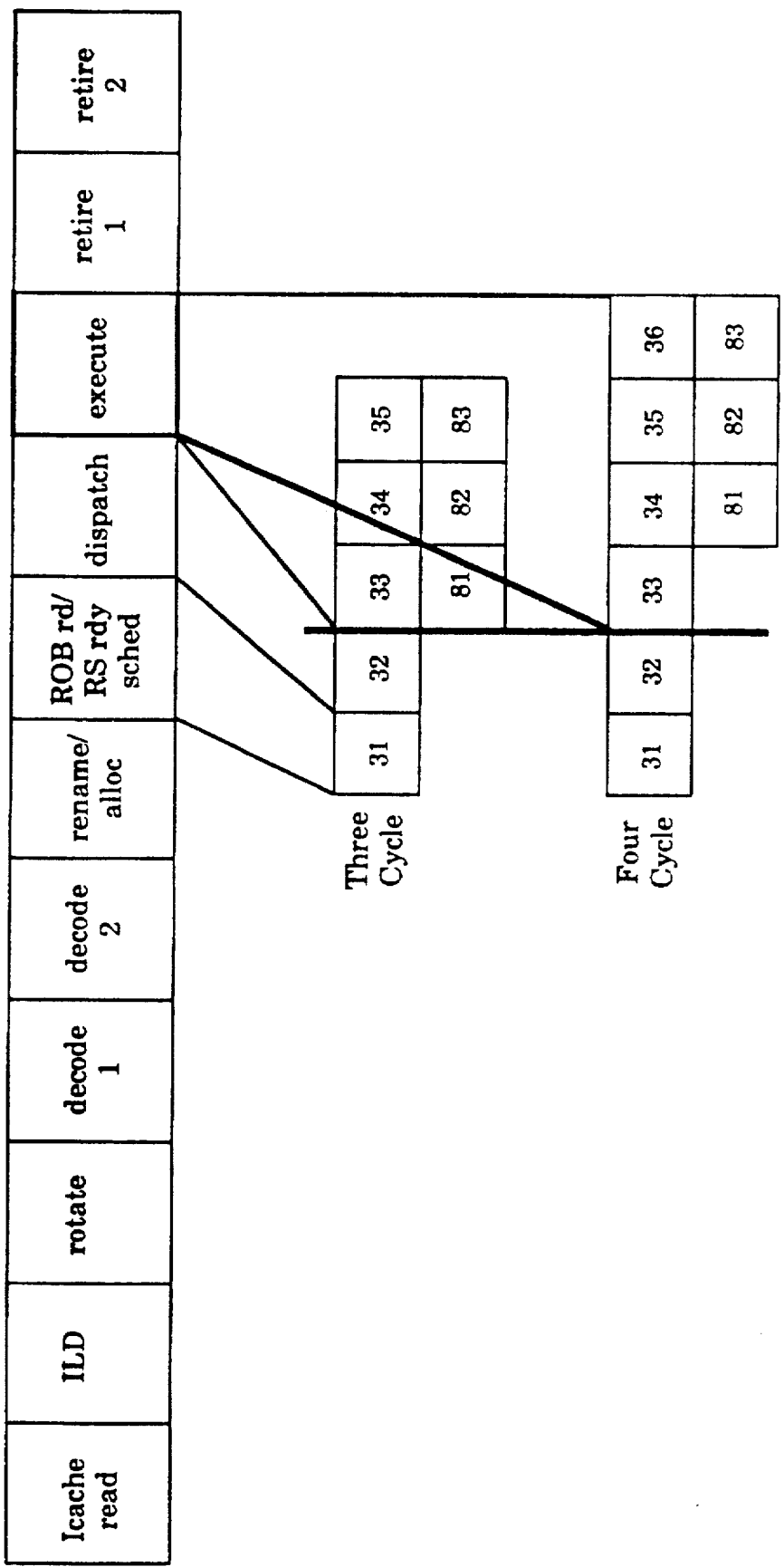
FIG. 27 illustrates the operation of the floating point execution unit in the processor pipeline including the interaction with micro-op dispatch and writeback.

FIG. 27 illustrates the operation of the FEU 142 in the processor pipeline including the interaction with micro-op dispatch and writeback. The two cycle scheduling pipeline of the RS, consisting of ready/schedule and dispatch operations, requires prior notification of the arrival of source data of at least two cycles prior to the dispatch of micro-ops utilizing that data. Consequently, the RS 138, during pipestage 30, identifies micro-ops capable of being dispatched, and dispatches the micro-ops in pipestage 32. The FEU 142 performs data bypassing and op code decoding in pipestage 32. For micro-ops requiring three and four cycle latency execution, the FEU 142 performs micro-op execution in pipestages 33 and 34. For the three cycle execution, FRND rounds during pipestage 35, and writes back in pipestage 83. For the four cycle latency execution, a stall occurs during pipestage 35, the FRND rounds during pipestage 36, and writes back in pipestage 83. For a one cycle latency execution in the FWU, execution occurs during pipestage 33, and writeback occurs during pipestage 83.

Data Cache Unit (DCU)

FIG. 28 illustrates a block diagram of a data cache unit (DCU) 148 configured in accordance with one embodiment of the present invention. The DCU 148 contains a physical address buffer 2810, data tag array 2820, a level one (L1) data cache 2830, and a DCU buffer 2840. The physical address buffer 2810 is coupled to receive an input (e.g., the physical address) from the DTLB 154, and is coupled to produce physical address to data tag array 2820. The data tag array 2820 is coupled to receive an input (e.g., either store address or load address) from the MOB 150. The data cache 2830 is coupled to receive an input from the data tag array 2820, and the store data buffer 2535, as well as being coupled to the bus cluster 110. In response to a data cache access, the data cache 2830 produces an output to the execution cluster 118 and MOB 150. The DCU buffer 2840 is also coupled to the data tag array 420 and data cache 2830. The DCU buffer 2840 is also coupled to receive an input from the MOB 150 and the bus cluster 110.

The physical address buffer 2810 receives and saves the 24 high order bits of the translated physical addresses from the DTLB 154 for store and load operations. In cooperation with the MOB 150 and MIU 140, the physical address buffer 2810 commits the translated physical addresses to processor state and executes the addresses as appropriate. The data tag array 2820 stores the physical address tags of the data currently stored in data cache 2830, and tag matches the accessing physical addresses against the stored physical address tags. The data cache 2830 receives and stores data for caching, and responds to data loads. In one embodiment, the data tag array 2820 and the data cache 2830 have sufficient capacity for storing 128 sets of 2-way set associative 32-byte cache lines of data and the corresponding address tags. The physical address buffer 2810 will be discussed in further detail below. The data tag array 2820 and data cache 2830 are intended to represent a broad category of these elements found in most computer systems, whose functions and constitutions are well-known and will not be further described.

The DCU buffer 2840 contains accesses to data cache 2830 that miss the cache memory and are currently pending on the bus. The entries in the DCU buffer 2840 are also checked in conjunction with a data cache 2830 access to determine whether the desired data are stored in a DCU buffer 2840 entry or the desired data are a cache line currently pending on the bus. The DCU buffer 2840 includes storage locations for temporarily storing data returned for pending cache line request operations. The DCU buffer 2840 supplies data and the corresponding tag information to data cache 2830 and data tag array 2820, respectively. In one embodiment, the DCU buffer 2840 includes four entries having a 256 bit width (one cache line).

Figure 29:
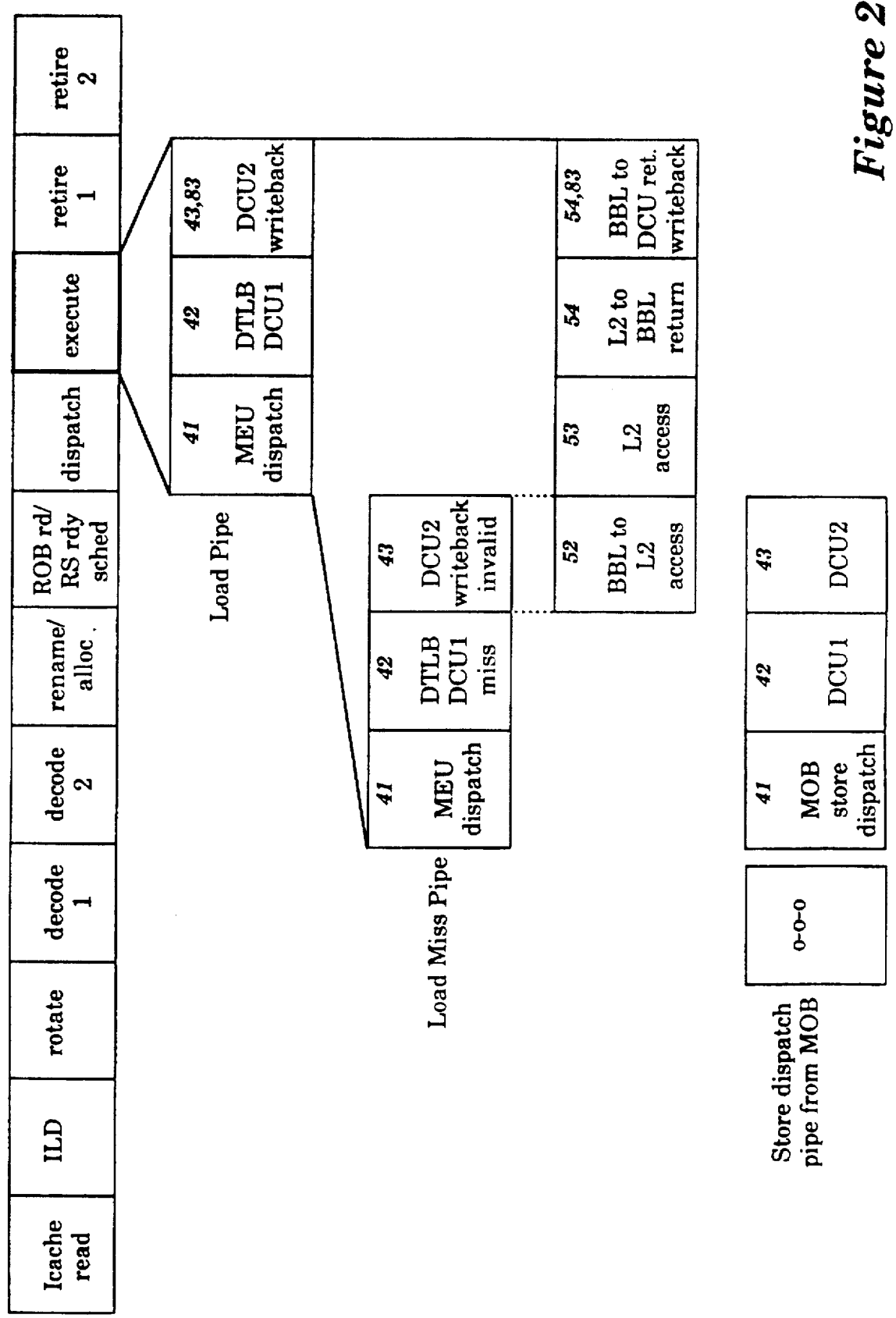
FIG. 29 illustrates the operation of the data cache unit in one embodiment of the processor pipeline of the present invention.

FIG. 29 illustrates the operation of the DCU 148 in one embodiment of the processor pipeline of the present invention. Typically, memory operations consume three pipestages (41, 42 and 43). In pipestage 41, the micro-op is dispatched to the DCU 148. In the first half of pipestage 42, the DTLB 154 performs address translation, and the DCU 148 utilizes the untranslated address bits (lower 12 bits) to read the tags out of the tag data array 2820. In the second half of pipestage 42, the DCU 148 performs the tag compare using the translated address from the DTLB 154 to ascertain whether a cache hit occurred. Data are read out of the data cache 2830 in the second half of pipestage 42 for a load operation. In pipestage 43, the DCU 148 writes back low data if a cache hit occurs. If the data is not in the data cache 2830, a bus request is issued in pipestage 42. The fastest that the external bus 158 can respond with the low data is four cycles after the request is made in pipestage 42. Stores are issued by the MOB 150 in the same manner is loads. Although the DCU 148 may utilize the translated physical address stored in the physical address buffer 2810, or utilize the pipestage 42 translated address from the DTLB 154. The check for a cache hit occurs during pipestage 42, and the actual data cache 2830 is written in pipestage 43. Store misses normally use the same pipestages as the load miss, but with a different request type to the bus.

Memory Order Buffer (MOB)

The memory order buffer (MOB) 150 interfaces the out-of-order portion of the processor to the memory system.

The MOB 150 contains two main buffers as shown in FIG. 25: the load buffer 2510, and the store address buffer 2520. The load buffer 2510 and the store address buffer 2520 are circular queues, such that each entry within the buffer represents either a load or a store micro-op, respectively. The MOB 150 receives load and store operations from the RS 138. The RS 138 provides the corresponding op code, and the AGU 146 calculates and transmits the linear address for the access. The load and store operations are either executed immediately, or the load and store operations are written into the MOB 150 for dispatch at a later time. During memory cluster execution, the DTLB 154 converts the linear address to a physical address, or alternatively, signals a page miss to the PMH 152. The MOB 150 performs numerous checks on the linear address and data size to ascertain whether the operation can proceed or whether a block must occur.

The store address buffer 2520 operates in conjunction with the stored data buffer 2535 and the physical address buffer 2810 to effectively manage a store operation. In one embodiment, the store address buffer 2520 contains twelve entries thereby holding up to twelve store operations. The store address buffer 2520 is utilized to queue all store operations prior to dispatch to the memory system. The store operations are subsequently dispatched in the original program order when the out-of-order cluster 116 signals that the state is no longer speculative. The store address buffer 2520 checks all loads for store address conflicts so as to keep loads consistent with previously executed stores still residing in the store data buffer 2535. In one embodiment, the load buffer 2510 contains sixteen buffer entries, storing up to sixteen load operations. The load buffer 2510 is utilized to queue load operations unable to complete when ordinarily dispatched by the RS 138. The queued operations are subsequently redispatched by the load buffer 2510 when the conflict is later removed.

In one embodiment, address dependencies are determined through the use of store coloring. In general, store coloring is utilized to track dependencies between load and store operations. In order to implement store coloring, a store buffer identification (ID) is assigned, or tagged, to each load operation during decoding. In one embodiment, the store buffer ID includes five bits including a wrap bit. The store buffer ID identifies the entry in the store buffer storing the most recent store operation. The ALLOC 134 allocates store buffer entries sequentially to the issued store operations. Each memory load operation is tagged with the store buffer ID of the most recent store operation. Consequently, the store buffer ID assigned to the load operation defines the youngest store operation older than the corresponding load operation. Therefore, knowledge of the age of store operations relative to load operations, permits possible identification of dependencies. By identifying the dependencies or a lack thereof, the memory cluster 120 of the present invention determines when each of the load operations may be executed. More particularly, the present invention utilizes the relative temporal location of the load operations with respect to the store operations to determine whether subsequently issued load operations may execute before prior issued store operations.

Load Operation

In operation, load operations issue to the RS 138 from the allocator 134 and RAT 132. In response, the allocator 134 assigns a new store buffer ID to each load that issues into the RS 138. The load operation waits in the RS 138 until the corresponding data operands for the load operation are available. Once available, the RS 138 dispatches the load operation to AGU 146 and load buffer 2510. The AGU 146 generates the linear address used by the DTLB 154, MOB 150, and DCU 148.

The DTLB 154 translates the linear address to a physical address, and the DCU 148 does an initial data lookup utilizing the low order 12 bits. In addition, the store address buffer 2520 utilizes the lower order 12 bits along with the store buffer ID to check for conflicting addresses. The upper 20 bits of the linear address are translated by the DTLB 154 into a physical address. If the DTLB 154 cannot translate the address, then the DTLB 154 generates a blocked status. For example, a page miss may occur when the page mishandler 152 is busy. In this case, the load operation is blocked.

Assuming a DTLB 154 page hit and no store address buffer 2520 conflicts, the DCU 148 utilizes the physical address bits, along with the lower 12 bits of the untranslated address, to execute a tag array look-up and subsequent data array read, if required, in the data cache 2830. If the load operation generates a hit in the data cache 2830, then data are read out of the data cache 2830, aligned, and transferred to the load converter 2525. In response, the load converter 2525 converts the data into the proper internal format recognized by the processor, and writes back the result data on the writeback bus 139. If the load operation generates a cache miss in the data cache 2830, a request for data is executed to the bus cluster 110. After the data are retrieved by the bus cluster 110, either from a level two (L2) cache memory (156) or from external memory, the DCU 148 requests a cycle on the writeback bus 139 to return the requested data. When the DCU 148 receives a grant for a cycle or the writeback bus 139, the DCU 148 transmits the data to the load converter 2525. The load converter 2525 performs the necessary format conversion, and subsequently drives the converted data on the writeback bus 139.

Upon dispatch of a load operation, the store color of the load operation is utilized to determines if the store buffer contains any invalid store addresses that are older than the load operation. In one embodiment, the entries of the store address buffer 2520 are checked. Because load operations cannot pass store operations with unknown addresses, the check is utilized to block the load operation until the store address micro-op has been dispatched from the RS 138 (e.g. until the address calculation is executed). To determine if the store operation is older, the present invention utilizes address detection to search the store buffer from the oldest store operation contained in the store buffer to the store operation identified by the store buffer ID assigned to the particular load operation. If an entry in the store buffer contains an invalid address, then a signal (e.g., a bit) is asserted with the corresponding store buffer ID. If the address is not valid, the load operation is tagged with the store buffer ID of the store operation with the invalid address to prevent the load operation from dispatching until that store address micro-op has been dispatched from the RS 138.

In parallel to the operation in the DCU 148, the MOB 150 signals the load buffer 2510 of the completed operation. If no address conflicts exist and the address identified by the load operation is not stored in the DCU 148, the load buffer 2510 bypasses the load operation for immediate execution in the bus cluster 110 assuming no other dispatches are waiting. However, if the store address buffer 2520 signals an address match, the store address buffer 2520 signals the store data buffer 2535 to forward data, ignoring the DCU 148 data. If a store address buffer conflict exists but the addresses do not match, then the load operation is blocked and written to the load buffer 2510. The load operation waits until the blocking condition is removed. Upon completion of the load operation, the RS 138, ROB 136 and MOB 150 reflect the completed status.

In general, the memory cluster 120 receives dispatched load operations one per cycle. Because the RS 138 dispatches micro-ops to the memory subsystem 120 based purely on data dependency, the MOB 150 performs multiple load blocking checks to determine whether a load operation can be executed without conflicts. In order to check for address and resource dependencies, the MOB 150 gathers all the blocking conditions, and prioritizes the conditions to determine the highest priority. If a conflict exists, the load operation is blocked, such that the load operation is stored and tagged with the block code and is prevented from completion. The conflict in the memory system is monitored to determine when the conditions that caused the load operation block no longer exist. At this time, the load is allowed to redispatch.

After a load operation is dispatched from the RS 138, the DCU 148 and DTLB 154 generate a blocking status. In parallel, the MOB 150 detects one or more address conflicts. The MOB 150 utilizes the blocking status condition and address conflict information and prioritizes the conditions and conflicts to determine whether to complete execution of the load operation. If the load operation cannot complete due to a conflict, the load operation is halted, or blocked. In order to block the load operation, the DCU 148 aborts the load request, and the MOB 150 creates a block code identifying the event, if any, required to complete before the load operation is permitted to execute. Upon the occurrence of the appropriate event, the load operation "wakes up" and is redispatched for execution.

Although a load operation awakes, the load operation is not necessarily executed during the next execution cycle because the load operation may be blocked again for the same or different reasons. For example, a load operation may be blocked by the MOB 150 upon initial dispatch because of an address conflict with a store operation currently residing in the store address buffer 2520. When the store operation that generates that address is dispatched, the load operation is awakened and redispatched. The redispatched load may be blocked by the DCU 148 due to a pending load operation for the same cache line for a different load currently executing in the system. When the appropriate data are returned, the load operation is awaked, and is redispatched. Once redispatched, the load may block again, or complete execution.

When load operations are blocked, the load operations are stored in the load buffer 2510. In one embodiment, the load buffer contains sixteen entries. Therefore, up to 16 load operations can be pending in the processor at any one time. In addition, as many as 16 load operations may "wake up" in a given cycle. Because only one load is dispatched every cycle (in the preferred embodiment), the MOB 150 queues the awake load operations for dispatch. In one embodiment, the queuing is performed by the load buffer 2510 by tagging loads as "ready" upon wake up. The load buffer 2510 schedules one of the "ready" loads for dispatch each cycle. The ready/schedule mechanism allows the throughput of one load scheduled per cycle.

Store Operation

In one embodiment, the store operation is split into two micro-ops: store data micro-op followed by a store address micro-op. Because a store operation is represented by the combination of the store data and store address micro-ops, the ALLOC 134 allocates a store buffer entry only when the store data operation is issued into the RS 138. The allocation of a store buffer entry reserves the same location in the store address buffer 2520, the store data buffer 2535, and the physical address buffer 2810. In order to maintain a correlation between a particular store address micro-op and the corresponding store data micro-op, each set of store address and store data micro-ops is assigned the store buffer ID. When the store data register data becomes available, the RS 138 dispatches the store data operation to the store converter 2515 for a write into the store data buffer 2535. The store converter 2515 signals valid data for that entry to the store address buffer 2520.

When the store address register data becomes available, the RS 138 dispatches the store address to the AGU 146 and store address buffer 2520. The store address buffer 2520 always bypasses the operation by transmitting the operation for immediate execution. The AGU 146 generates the linear address for transformation by the DTLB 154, and subsequently writes to the store address buffer 2520. Assuming a DTLB page hit, the physical address is written into the physical address buffer 2810, thereby completing the store address operation. In response, the status in the MOB 150, RS 138 and ROB 136 is updated accordingly.

Assuming no faults or mispredicted branches, the ROB 136 retires both the store data and store address operations. The store address buffer 2520 monitors the retirement thereby marking the store data/store address pair as committed processor state (senior). Once senior, the MOB 150 dispatches the store operations by transmitting the op code, store buffer ID and lower 12 address bits to the DCU 148, and by transmitting the store buffer ID to the store converter 2515. The DCU 148 and store converter 2515 utilize the store buffer ID to look-up the physical address in the physical address buffer 2810 and store data in the store data buffer 2535, respectively.

The MOB 150 completes the store operation by writing a valid bit into the store address buffer 2520 and to the RS 138 and ROB 136. The data portion of the store operation is executed by the store data buffer R35. The MIU 140 signals the RS 138, ROB 136, and store address buffer 2520 when data are received and written into the store data buffer R35. The MOB 150 retains store information until the ROB 136 indicates that the operation is retired and committed to memory state. At this time, the MOB 150 dispatches data to the DCU 148 to commit the store data to memory state. Once the store operation is completed, the MOB 150 signals the allocator 134 to de-allocate the corresponding MOB entry.

In the memory pipeline, memory operations are not totally predictable, thereby requiring, in certain cases, deferral. In order to accomplish memory deferral, the store address buffer 2520 employs a restricted mechanism for blocking store address memory operations. All blocking conditions are folded together into a single blocked state. The operations remain blocked until the ROB 136 indicates that the store address micro-op is the oldest non-retired operation in the processor. Upon receiving the indication, the store address micro-op is dispatched with a simultaneous write to the DCU 148.

Figure 30:
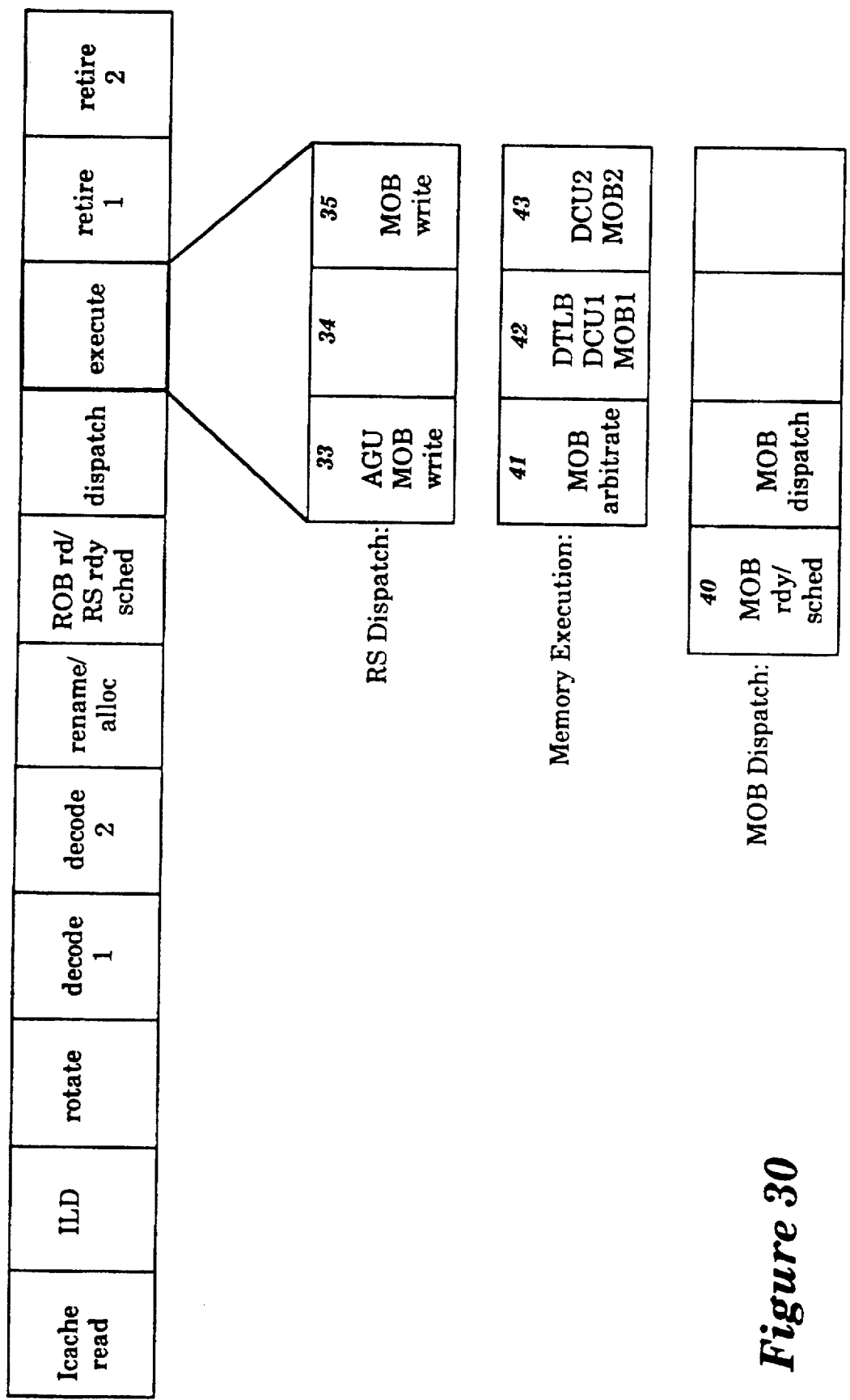
FIG. 30 illustrates the function of the memory order buffer during the execution phase of the pipeline configured in accordance with one embodiment of the present invention.

In one embodiment, the MOB 150 functions during the execution phase of the pipeline as shown in FIG. 30. The RS dispatch occurs during pipestages 33, 34, and 35. The memory execution pipeline occurs during pipestages 41, 42, and 43. When an operation dispatched from the RS 138 is bypassed by the MOB 150, the operation occupies both pipestages simultaneously. The load buffer 2510 requires an extra cycle (pipestage 40) to evaluate the ready entries and schedule the load dispatch.

External Bus Logic.(EBL)

The primary function of the external bus logic (EBL) 106 is to provide an interface between the first and second level caches and the external computer system. As shown in FIG. 1, the EBL 106 interfaces with the BBL 108, DCU 148, and IFU 122. In one embodiment, a token based internal bus cycle request/acknowledge/complete protocol is utilized to interface the EBL with the requesting units. The token based internal bus cycle performs the function efficiently. Using this internal protocol, the EBL 106 receives, prioritizes and accepts bus cycle requests from other functional units. In response, the EBL 106 converts the requests, complying with the internal protocol, into requests that conform to the external bus 158 cycle protocol.

In one embodiment, the external bus 158 is a transaction oriented bus. In general, the EBL 106 processes requests, responses, and transactions. A request refers to the process of requesting action to occur. Typically, a request involves an action that requires an address, request type and an identification tag to later reference the request. A response refers to an action to satisfying the request. A transaction refers to the exchange of information required to complete the task specified by the requesting agent. A transaction essentially refers to the entire process, from the request to the completion of response.

Figure 31:
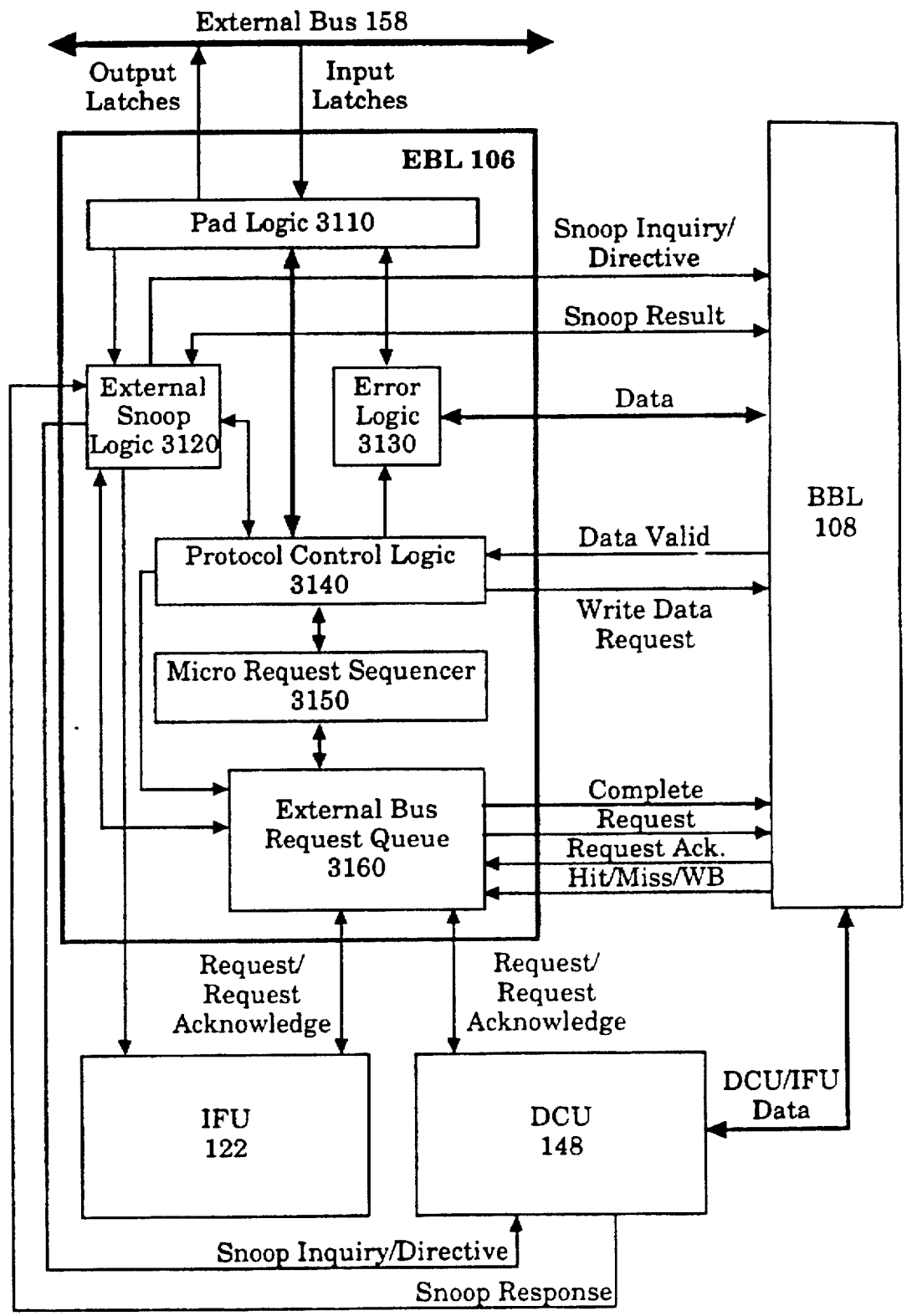
FIG. 31 illustrates the external bus logic configured in accordance with one embodiment of the present invention.

In one embodiment, the EBL 106 provides an interface between the processor 100 and the external bus 158. In providing the interface, the EBL 106 interfaces with two different clock speeds: a core clock speed for the processor 100, and a bus clock speed for the external bus 158. The bus clock is synchronized to the speed at which external events occur (e.g. the speed at which the external bus protocol operates). The core clock refers to the clock speed at which processor 100 operates. FIG. 31 illustrates the EBL 106 configured in accordance with one embodiment of the present invention. In general, the EBL 106 contains seven major functional divisions: external bus queue 3160, snoop logic 3120, error logic 3130, protocol control logic 3140, micro request sequencer 3150, and pad logic 3110.

The external bus request queue 3160 processes transaction requests from the DCU 148 and IFU 122. The external bus request queue 3160 transmits requests to the BBL 108 that require L2 cache 156 service, and forwards requests to the external bus 158 that the L2 cache 156 cannot successfully process (i.e. a L2 cache 156 miss). Therefore, the external bus request queue 3160 operates as the transaction scheduler for the EBL 106 and BBL 108 units. The external snoop logic 3120 processes external, self and internal snoop requests. The external snoop logic 3120 issues snoop inquiries to the DCU 148, BBL 108, and bus request queue 3160 based on snoop requests from the BBL 108 and the external bus 158. The external snoop logic 3120 also performs self snooping on the external bus requests when requested by the DCU 148 or when self modifying code is detected. The external snoop logic 3120 issues memory state change directives to the IFU 122, DCU 148, BBL 108 and the external bus request queue 3160 based on external request type and internal snoop results.

The error logic 3130 generates the error correctional code for outgoing data and parity for outgoing address and request pins. In addition, the error logic 3130 checks parity on incoming address, request and response pins, and performs error correctional coding checks on incoming data pins. The error logic 3130 corrects single bit errors on the data bus and detects double bit and nibble errors. When an error is detected, the error is reported to the external bus 158. The micro request sequencer 3150 provides support for misaligned data in order to remain backward compatible with existing Intel® architecture microprocessor interfaces. The micro request sequencer 3150 examines requests from the bus request 3160 to ascertain whether the new request crosses a bus width boundary. If a bus width crossing is detected, the micro request sequencer splits the single request from the bus request queue into two separate requests, and sequences the two separate requests to the protocol control logic 3140. If the request is not misaligned, then only a single request is presented to the protocol control logic 3140. The micro request sequencer 3150 also generates the correct byte enables, cacheable attributes, and deferred instruction decoding for external bus requests.

The protocol control logic 3140 interfaces the processor to the external system by implementing the external bus protocol. In general, the protocol control logic 3140 forwards requests to the external bus 158, informs other functional units of external request activity, transfers requested data between the BBL 108, DCU 148, L2 Cache 156, and tracks the status of all outstanding requests. The pad logic 3110 contains the external bus I/O latches, IEEE 1149.1 boundary scan cells, and functional redundancy check logic.

The EBL 106 operates during 11 pipestages. Two of the pipestages are related to the BBL 108 and the L2 cache 156, and nine of the pipestages involve external bus operations. Pipestages in the EBL 106 do not correspond to specific or sequential clock periods. Instead, EBL pipestages refer to different phases of completion through which a transaction may pass. A particular transaction may not be involved in a given stage at all, or removed from the pipe midstream, or even remain in the given stage for many clocks while other transactions occur.

Figure 32A:
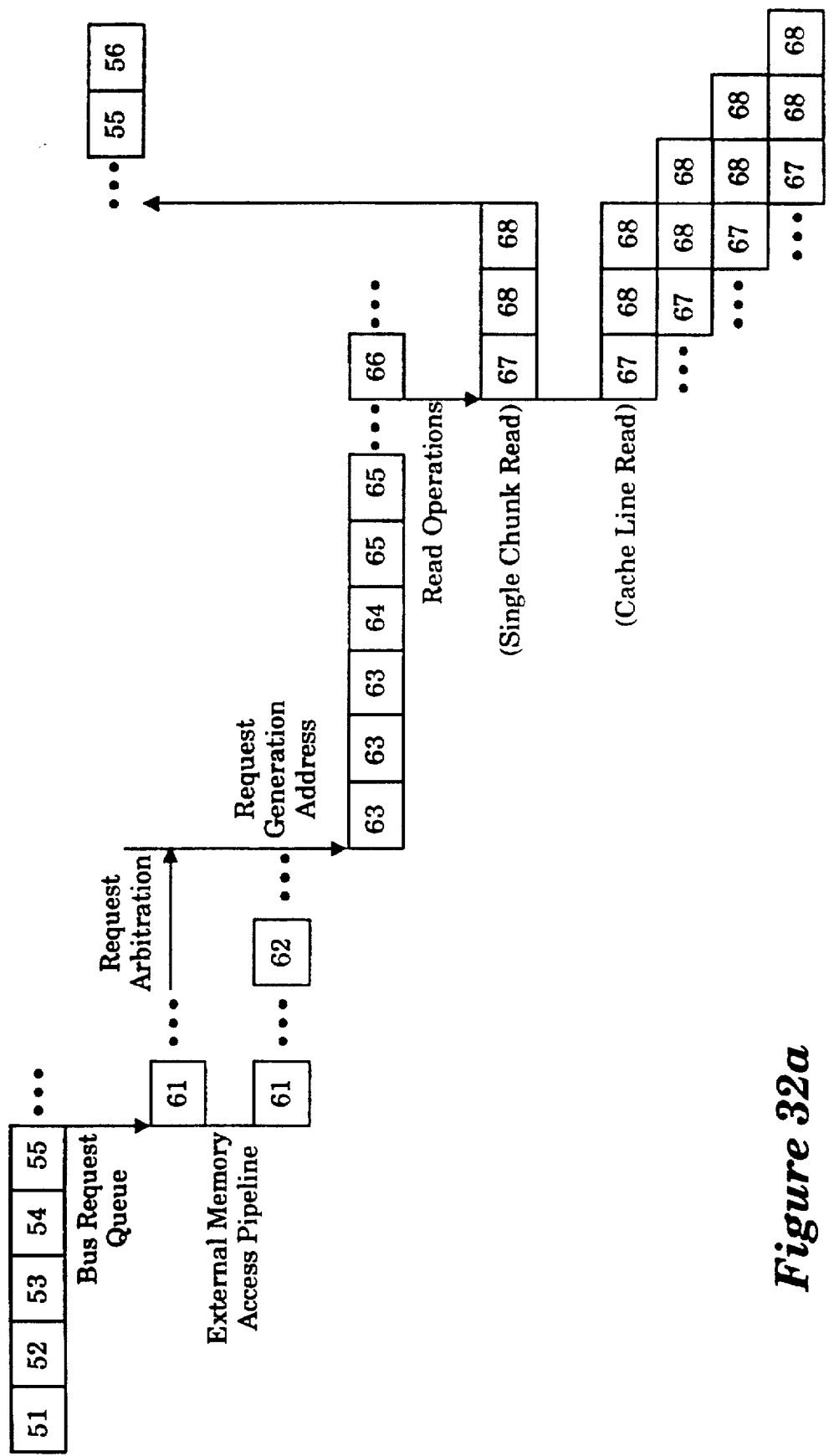
FIG. 32a illustrates a pipestage diagram for external bus logic read transactions.

FIG. 32a illustrates a pipestage diagram for EBL read transactions. In pipestage 51, the EBL 106 sends the request to the BBL 108 for L2 cache processing. In pipestage 55, the BBL 108 notifies the EBL 106 whether the request resulted in a cache hit or miss. If the request resulted in a L2 cache hit, data are returned to the DCU 148 and IFU 122. If the event resulted in a L2 cache miss, then the EBL 106 transmits an internal request for the transaction in pipestage 61. If the processor does not have control of the address request bus, then the EBL 106 arbitrates for the bus in pipestage 62. If the processor already gained control of the bus, then the EBL 106 issues the request to the external bus 158 without entering pipestage 62. The EBL may have to assert the internal request for one or more clock cycles until the processor actually arbitrates for and or sends the request to the bus.

The request is transmitted to the external bus 158 in pipestage 63. If a request error is reported on the bus during pipestage 64, then the request is canceled and retried from pipestage 61. Otherwise, the transaction proceeds to pipestage 65. In pipestage 65, results are presented on the external bus 158. The owner of the data transfer is determined. If necessary, the external bus protocol allows for stalling of the snoop stage by any processor bus agent. Once the data transfer owner has been determined, the response agent drives the response, in pipestage 66, when data transfer is ready to begin.

If a normal response is received, data are returned on the bus in pipestage 67 and forwarded to the BBL 108/DCU148/ IFU122 in pipestage 55. If a retry response is received, the transaction returns to pipestage 61, and is retried on the external bus 158. If an error response is received in pipestage 66, the transaction does not proceed beyond pipestage 66. As the data are received, each block is checked for ECC errors and corrected if necessary in pipestage 68. Once all data are received, a transaction complete signal is transmitted to the BBL 108 to signify ending of the transaction during pipestage 68.

Figure 32B:
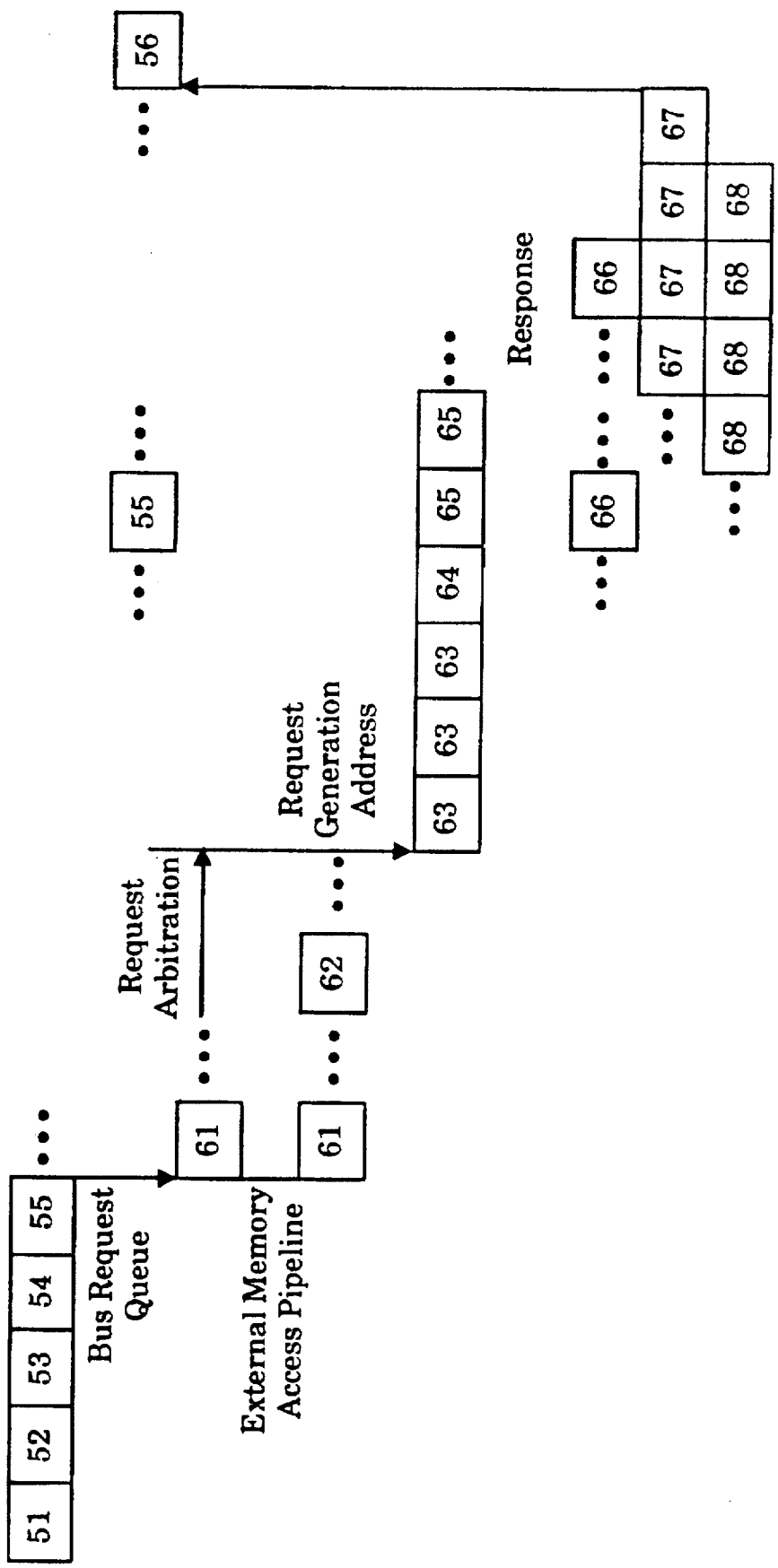
FIG. 32b illustrates a partial pipestage diagram for external bus logic write operations.

FIG. 32b illustrates a partial pipestage diagram for write operations. The write pipestage diagram is similar to the read pipestage diagram except that data are retrieved from the BBL 108 rather than transmitted to the BBL 108. Also, write transactions have a split response during pipestage 66, wherein the first part of the response initiates the data transfer, and the second part of the response completes the transaction. The first part of the response may occur concurrently with the request error phase pipestage 64. Response completion cannot be sent to the BBL 108 until the processor transfers all write data onto the external bus 158, and the final response is given by the response agent.
Backside Bus Logic (BBL)

The backside bus logic (BBL) 108 is contained within the bus cluster 110 as shown in FIG. 1. The primary function of the BBL 108 is to manage all requests of the L2 cache 156. A back side bus 160 couples the BBL 108 to the L2 cache 156. The L2 cache 156 requests originate from other agents on the external bus 158, from the IFU 122, DCU 148, or through direct access from the memory cluster 120. In general, the BBL 108 balances the various requests for service in light of a limited bandwidth for the backside bus 160. The BBL 108, together with the L2 cache 156, insures the integrity of all cache accesses and storage.

The BBL 108 acts as the data buffering and routing agent of the bus cluster 110, steering, and if needed, buffering both inbound and outbound data packets from the external bus 158, data cache 2830, and L2 cache 156. In order to maintain cache coherency, the BBL 108 interacts with the EBL 106, IFU 122, DCU 148 and L2 cache 156. The BBL 108 maintains the cache hierarchy in the L2 cache 156 such that the BBL 108 controls all state transitions in the L2 cache 156, and flushes invalid lines from the L2 cache 156.

In general, the BBL 108 acts as the front end of the L2 cache subsystem. The BBL 108 accesses the L2 cache 156 through the backside bus 160. In one embodiment, the backside bus 160 is a collection of data, address, and control lines working in synchronization with the processor 100 clock. Requests for access to the L2 cache 156 are processed by BBL sequencers, BBL Q sequencer and BBL snoop sequencer, to determine which L2 micro-operations are needed to carry out the desired action. Certain requests are completed with one L2 cache 156 access (e.g. an IFU 122 request, L2 cache hit). However, other requests may be completed with two or more L2 cache 156 accesses.

Other requests are partially completed, then handed to another unit for further processing. L2 cache requests from the IFU 122 or memory cluster 120, are first stored in the external bus request queue 3160 if the requests require BBL 108 processing. The external bus request queue V forwards or translates the requests to the BBL 108. Independent from the L1 data cache 2830, the processor, through control register access, requests L2 cache 156 access via the BBL sequencers. The internal BBL buffers, once full, request BBL sequencers to process the data. The external snoop logic 3130, within the EBL 106, presents external bus snoop requests for L2 cache 156 through the BBL sequencer. In addition to handling the requests to the L2 cache 156, the BBL 108 contains buffers and multiplexors to route data between the L2 cache 156, EBL 106, IFU 122, and DCU 148. The BBL 108 also routes data transfers between the PIC 109 and the DCU 148.

Figure 33:
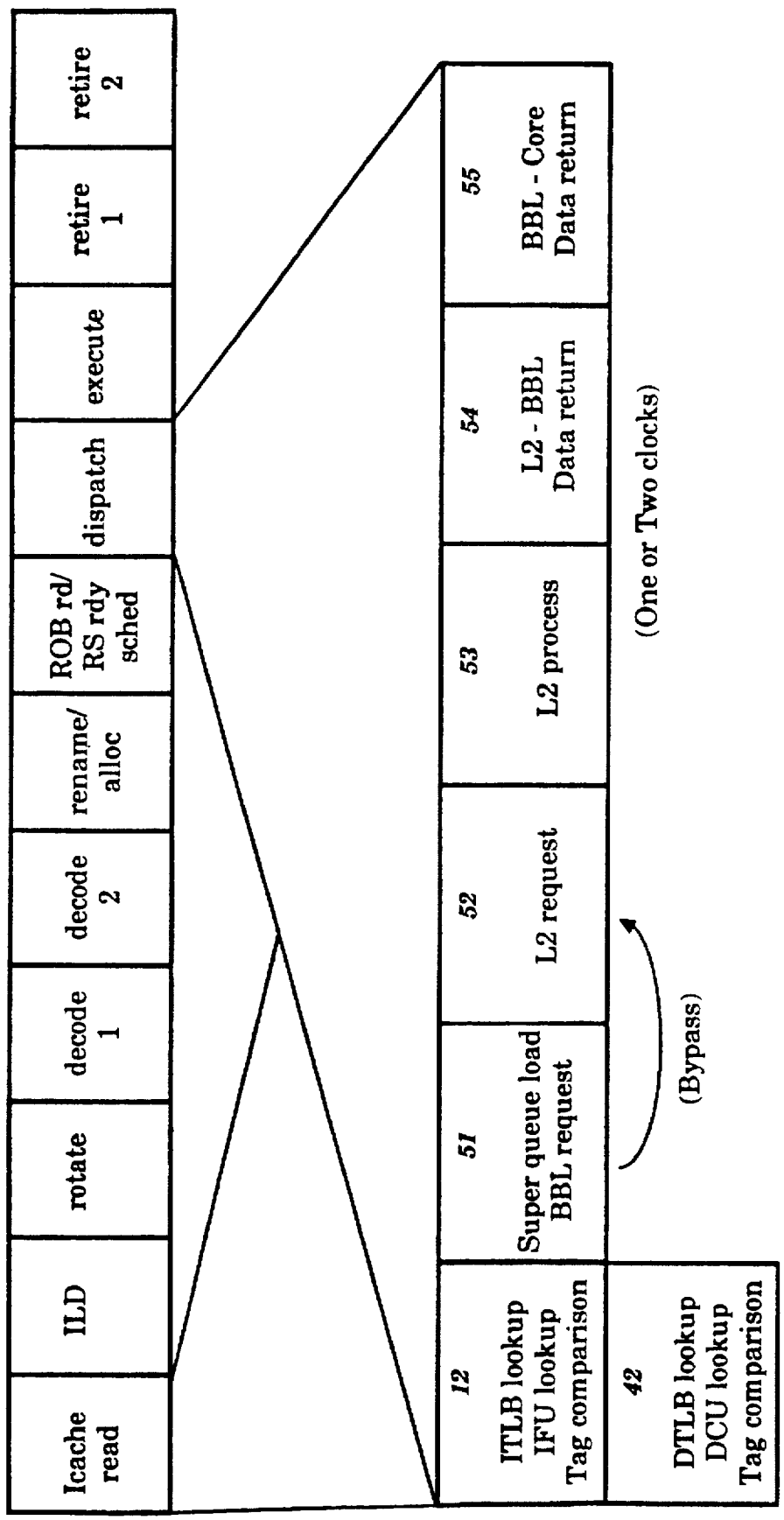
FIG. 33 illustrates the operation of the processor backside bus logic in the processor pipeline.

FIG. 33 illustrates the operation of the processor BBL 108 in the processor pipeline. The DCU 148 or IFU 122 generate a request to the external bus request queue 3160 in pipestages 12 or 42. The external bus request queue 3160 processes the request, and presents the request to the BBL 108 in pipestage 51. The BBL 108 transitions to pipestage 52 in one or more ways, and may occur over several clock cycles. In pipestage 52, the BBL 108 drives a request to the L2 cache 156. Pipestage 152 is always one clock in duration. During pipestage 53, the L2 cache is accessed, taking one or two clock cycles, depending upon the configuration of the cache subsystem.

During pipestage 54, the L2 cache 156 returns data. Also, during pipestage 54, the BBL 108 may commence another L2 cache 156 access, thereby permitting overlap with pipestages 52 and 54. If the read was a cache hit, data are returned in four successive clock cycles. However, if the read was a cache miss, the BBL 108 issues a request to the EBL 106 to fetch data via the external bus 158. The BBL 108 returns data to the IFU 122 or DCU 148 in pipestage 55. In pipestage 56, the BBL 108 indicates to IFU 122, DCU 148, and EBL 106 that the particular transaction is completed. For L2 cache 156 hits, pipestage 56 operates simultaneously with the last portion of data being returned in pipestage 55. For L2 cache misses, the transaction is not complete until the externally fetched data are written into the L2 cache 156.

Programmable Interrupt Controller (PIC)

In one computer system embodiment implementing the processor of the present invention, a multi-processor interrupt management scheme may be utilized. The multi-processor interrupt management scheme provides both static and dynamic interrupt distribution across all processors. In general, the multi-processor interrupt management implementation contains two parts: the local unit, that resides within the processor, and an I/O unit external to the processor. The I/O units collect interrupts from a variety of sources, and transmit the interrupts to the local units of the processors over a dedicated bus. In one embodiment, the local unit is referred to as a programmable interrupt controller (PIC) 109. As shown in FIG. 1, the PIC 109 is contained within the bus cluster 118.

The PIC register space is treated as memory mapped I/O. The core of the PIC 109 is analogous to the implementation based on the Intel® 80486P54C™ processor. However, the PIC 109 may be based on interrupts implemented on any computer system. The PIC 109 receives interrupts from different sources, and dispatches the interrupts to the processor core. In one embodiment, interrupts are generated from local interrupts, serial interrupts, interprocessor interrupts and timer self interrupts. The PIC 109 accepts each interrupt and subsequently prioritizes the interrupts based on a particular value of the interrupt vector. The highest priority interrupt is dispatched to the processor core. In general, dispatching an interrupt to the processor requires that the PIC 109 inform the ROB 136 about the arrival of an interrupt. Upon receiving the interrupt acknowledge cycle, the PIC 109 provides the interrupt vector. In one embodiment, the interrupt acknowledge cycle is implemented in micro-code. When the micro-code processes the interrupt, a signal to the PIC 109 occurs. The PIC 109 supports special interrupts such as 8259™ based interrupts, known as external interrupts, non-maskable interrupts, processor initialization and system management mode (SMM) interrupts.

Computer System

Figure 34:
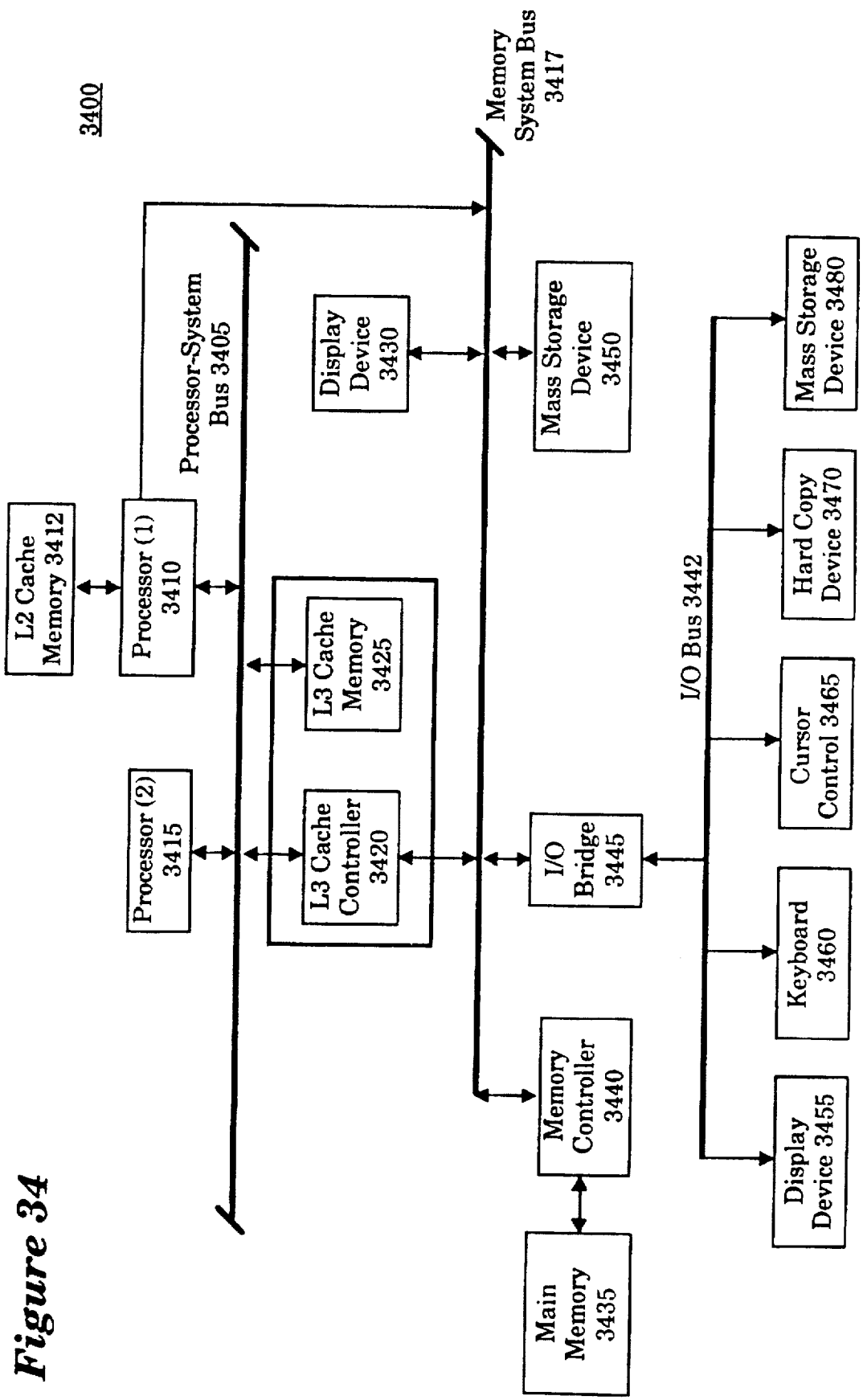
FIG. 34 illustrates a high level block diagram of a computer system configured in accordance with one embodiment of the present invention.

FIG. 34 illustrates a high level block diagram of a computer system configured in accordance with one embodiment of the present invention. A computer system 3400 contains at least one processor, such as processor 3410, for processing information. In a preferred embodiment of the present invention, the processor 3410 comprises the processor 100 described above. The processor 3410 includes, but is not limited to microprocessors such as an Intel® Architecture Microprocessor, manufactured by Intel® Corporation of Santa Clara, Calif., the corporate assignee of the present invention, PowerPC™, Alpha™, etc. As described above, the processor 3410 includes an internal cache memory, data cache 2830, which is commonly referred to as a level one (L1) cache memory, for temporarily storing data and instructions on-chip.

As illustrated in FIG. 34, a computer system 3400, constructed with the processor of the present invention, generally comprises a processor-system bus 3405 or other communication means for communicating information. In one embodiment of the present invention, the processors system bus 3405 includes address, data and control buses. A level two (L2) cache memory 3412 is coupled to the processor 3410 for temporarily storing data and instructions for use by processor 3410. In one embodiment, the cache memory 3412 is contained in the same chip package as the processor 3410.

In order to provide increased performance, the computer system 3400 may contain a processor 3415, coupled to the processor-system bus 3405, for processing information in conjunction with the processor 3410. The processor 3415 may comprise a parallel processor, such as a processor similar to or the same as processor 3410, or may comprise a math co-processor, or any digital signal processor. Furthermore, the computer system 3400 may comprise additional processors, coupled to the processor-system bus 3405, for providing increased performance suitable for particular applications. The computer system 3400 also includes a level three (L3) cache memory 3425, for temporarily storing data and instructions for use by other devices in the computer system (e.g., processor 3410, processor 3415, etc.) and a L3 cache controller 3420 for controlling access to L3 cache memory 3425. The L3 cache memory 3425 and L3 cache controller 341220 are also coupled to processor-system bus 3405. In addition, the L3 cache controller 3420 is coupled to a memory-system bus 3417.

The memory-system bus 3417, or other communication means for communicating information, is coupled to processor 3410 to provide processor 3405 and other devices in the computer system 3400 access to the memory and input/output (I/O) subsystems. Specifically, a memory controller 3440 is coupled to the memory-system bus 3417 for controlling access to a random access memory (RAM) or other dynamic storage device 435 (commonly referred to as a main memory) for storing information and instructions for processor 3410 and processor 3415. A mass data storage device 3450, such as a magnetic disk and disk drive, for storing information and instructions, and a display device 3430, such as a cathode ray tube (CRT), liquid crystal display (LCD), etc., for displaying information to the computer user, are coupled to the memory-system bus 3417.

An input/output (I/O) bridge 3445 is coupled to memory-system bus 3417 and an I/O bus 3442 to provide a communication path or gateway for devices on either memory-system bus 3417 or I/O bus 3442 to access or transfer data between devices on the other bus. In one embodiment, the I/O bridge 3445 turns the byte/word/dword data transfer traffic from I/O bus 3442 into line size traffic on memory-system bus 3417. In general, the I/O bus 3442 communicates information among devices in the computer system 3400. For example, the I/O bus 3442 may couple a display device 3455, such as a cathode ray tube, liquid crystal display, etc., a keyboard input device 3460 including alphanumeric and other keys, etc., for communicating information and command selections to other devices in the computer system (e.g., processor 3410), and a cursor control device 3465 for controlling cursor movement. Moreover, a hard copy device 3470, such as a plotter or printer, for providing a visual representation of the computer images, and a mass storage device 3480, such as a magnetic disk and disk drive, for storing information and instructions may also be coupled to I/O bus 3442.

As will be appreciated by one skilled in the art, certain implementations and uses of the present invention may not require nor include all of the above components. For example, in certain implementations, the L3 cache controller and L3 cache memory may not be required. In such implementations, processors 3410 and 3415 may reside directly on the memory-system bus 3417. In other implementations, a display device for displaying information may not be required. Furthermore, certain implementations of the present invention may include other components. For example, the computer system 3400 may contain a pen based hand written recognition system utilized as a general purpose input device.

In the foregoing specification, the invention has been described with reference to specific exemplary embodiments thereof. However, it will be evident that various modifications and changes may be made thereto without departing from the broader spirit and scope of the invention as set forth in the following claims. Accordingly, the specification and drawings are to be regarded in an illustrative sense rather than a restrictive sense.

Figure 35A:
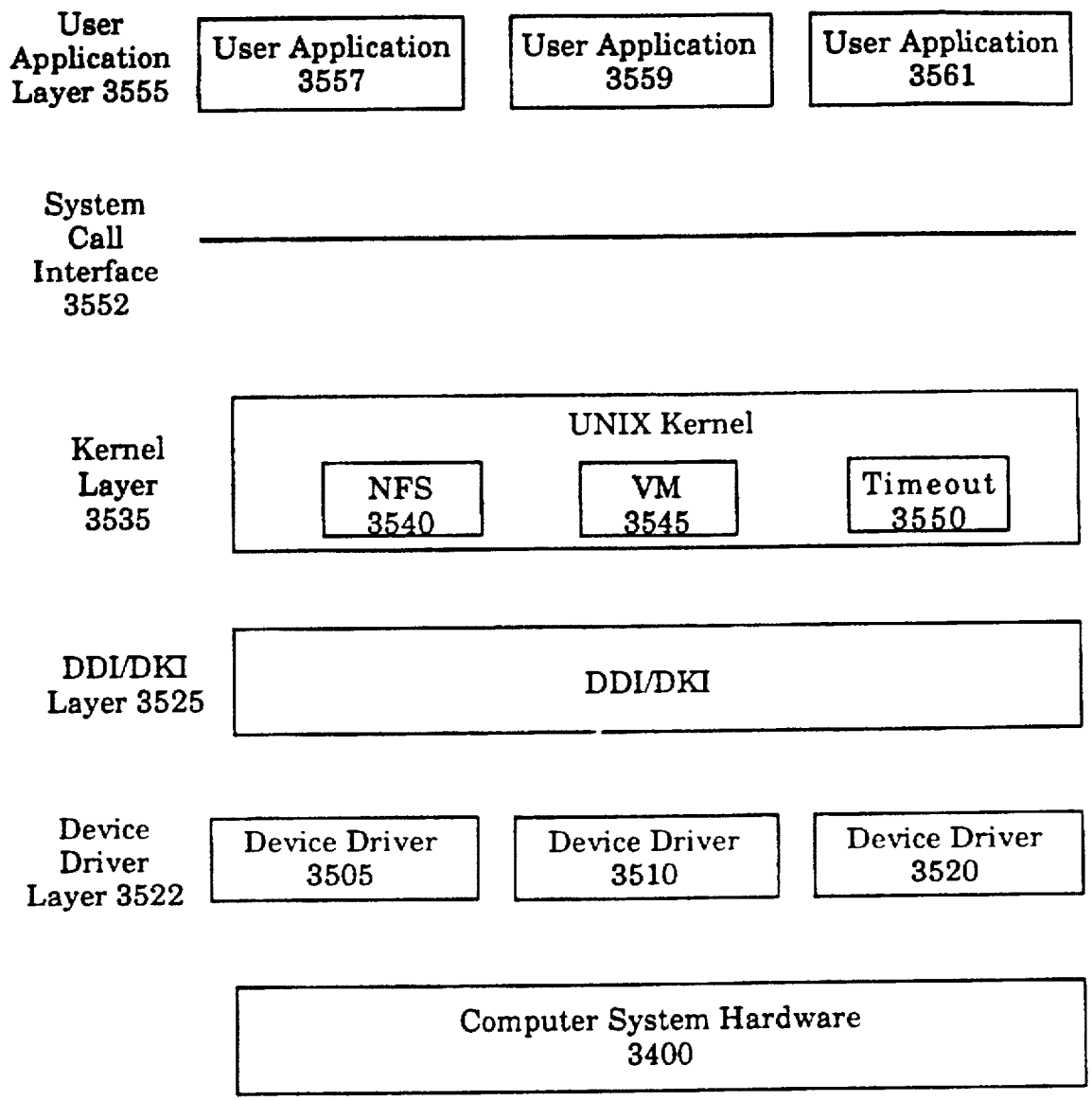
FIG. 35a illustrates the hierarchical structure of the UNIX® operating system operating in conjunction with one embodiment of the present invention.

FIG. 35a illustrates the hierarchical structure of the UNIX® operating system on computer system 3400. As shown in FIG. 34, the computer system 3400 contains at least one processor, configured in accordance with the present invention, main memory, and a plurality of I/O devices. In one embodiment, the computer system 3400 operates via the UNIX® operating system.

In order to control the I/O devices residing in computer system 3400, a set of device drivers (3505, 3510, and 3520) are situated in a device driver layer 3522. In general, the device driver layer 3522 is responsible for interacting directly with the computer system 3400. Different device drivers, such as the set of device drivers (3505, 3510, and 3520) control different hardware devices. The UNIX® operating system implemented on the computer system of the present invention may comprise any number of device drivers to control any number of hardware devices.

Above the device driver layer 3522 in the hierarchical structure is a device driver interface and driver kernel interface (DDI/DKI) layer 3525. The DDI/DKI layer 3525 provides an interface between a kernel layer 3535 and the individual device drivers in the device driver layer 3522. The DDI/DKI layer 3525 also maintains a set of properties for each device driver in the device driver layer 3522. The DDI/DKI layer 3525 hides details about device drivers from the UNIX® kernel.

A kernel layer 3535 is located above the DDI/DKI layer 3525 in the hierarchical structure. The kernel layer 3535 contains the UNIX® kernel which implements most of the functionality of the UNIX® operating system. Within the kernel layer 3535 are several operating system subsystems. In current implementations of UNIX®, a network file system (NFS) 3540, a virtual memory manager (VM) 3545, and a timeout mechanism 3550 are implemented as operating system subsystems. The kernel layer 3535 interacts with the computer system 3400 by making calls to the device drivers (3505, 3510, and 3520) through the DDI/DKI layer 3525.

A user application layer 355 is located above the kernel layer 3535 as shown in FIG. 35a. The user application layer 355 contains at least one user application program, such as application programs (3557, 3559 and 3561). Any number and type of application program may reside within the user application layer 355. The user application programs (3557, 3559 and 3561) interact with the UNIX® operating system by making system calls to the UNIX® kernel. The UNIX® kernel processes the system call, and returns a result to the user application program that made the system call. The operation of an operating system, such as the UNIX® operating system, is well known in the art.

Figure 35B:
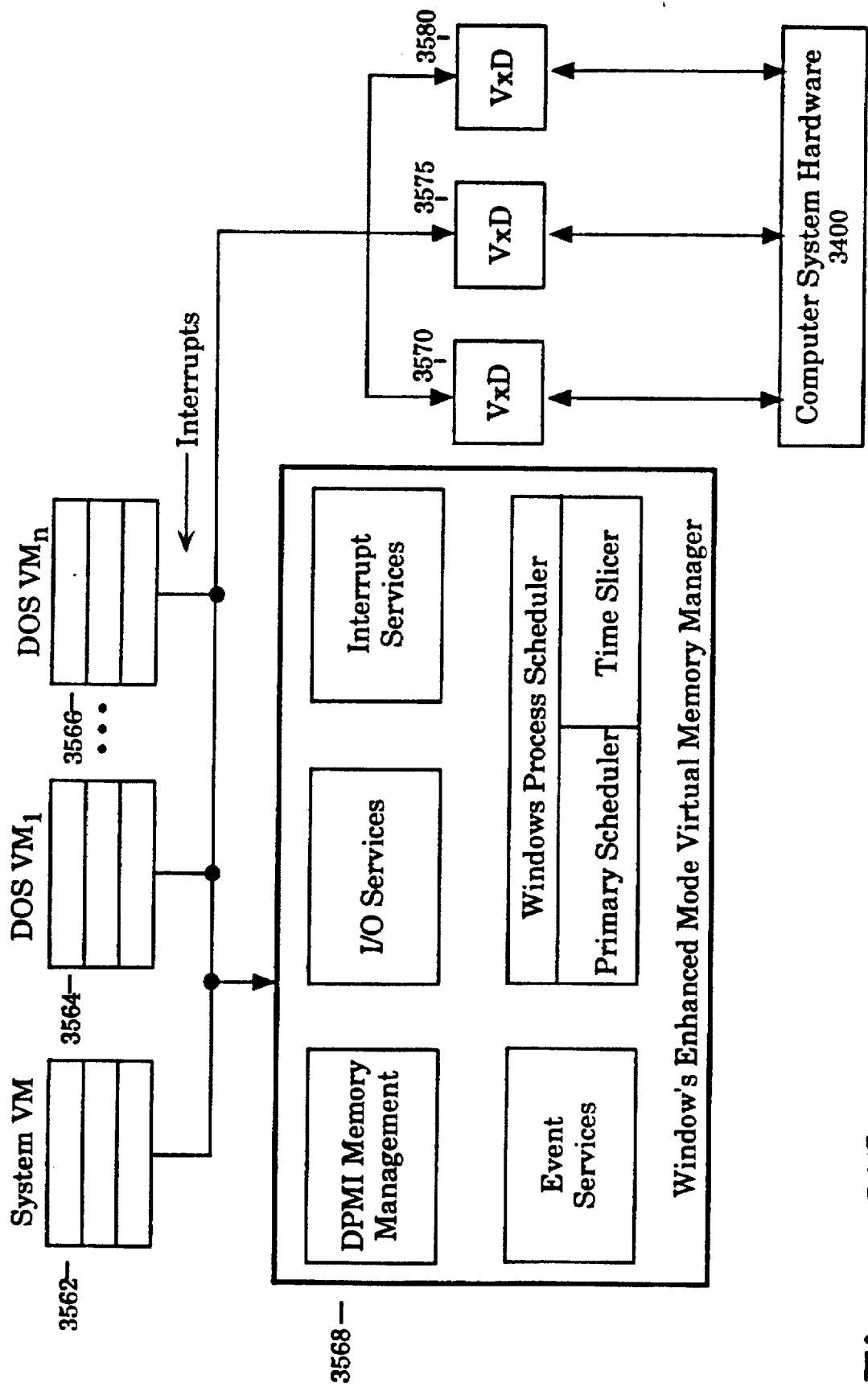
FIG. 35b illustrates the hierarchical structure of the Windows™ operating system operating in conjunction with one embodiment of the present invention.

FIG. 35b illustrates the hierarchical structure of the Windows™ operating system operating in conjunction with the computer system 3400. The Windows™ operating system environment permits multi-tasking of application programs via an enhanced mode. The Windows enhanced mode, in addition to the features found in the Windows standard mode, creates the use of disk operating system (DOS) virtual machines (VMs). The Windows enhanced mode utilizes a virtual 8086 mode on the processor of the present invention to emulate a DOS environment for operation of each DOS VM. A first virtual machine holds Windows itself, all the Windows applications, any DOS terminate stay resident (TSRs), and device drivers loaded before Windows. The first virtual machine is known as the system virtual machine (system VM).

The Windows enhanced mode supports a memory paging system that allows access to system memory for storing a number of DOS VMs and a system VM. With the use of addition system memory, the Windows enhanced mode supports several DOS VMs concurrently. A VM is formed under protected mode; however, the VM consists of both real mode and protected mode code. Windows creates DOS virtual machines using a combination of hardware support from the processor and software support from the operating system.

As shown in FIG. 35b, the Windows system software supports a system VM 3562 and a plurality of DOS VMs, 1-n. The system and DOS VMs are coupled to a Windows virtual machine manager 3568. The system VM and DOS VMs are also coupled to a plurality of virtual device drivers (VxDs) 3570, 3575, and 3580. The Windows system software may comprise any number and type of VxD to support the computer system 3400. In general, the VxD serializes access to hardware by providing a buffer between the system drivers and hardware devices contained in the computer system 3400. The Windows virtual machine manager 3568 is a layer of Windows system software for coordinating the operation of each VM and VxDs active in the computer system 3400. The Windows virtual machine manager 3568 is composed of several portions. In general, the Windows virtual machine manager 3568 schedules tasks among all the DOS VMs and the system VM via a Windows Process Scheduler. The Windows virtual machine manager 3568 may interface with any VxD installed. In addition, the Windows virtual machine manager 3568 provides I/O emulation, virtual memory management, general interrupt handling and event servicing. The operation of an operating system, such as the Windows™ operating system, is well known in the art.

What is claimed is:

1. A pipelined method for executing a plurality of instructions in a computer system, said method comprising the steps of:

decoding the plurality of instructions in order in an in-order processing portion of a processor to produce a plurality of operations, issuing the plurality of operations to an out-of-order execution core in the processor at the same time, wherein the step of issuing comprises writing the plurality of operations into a reservation station and simultaneously reading source data from a reorder buffer, separate from the reservation station, for use in execution of the plurality of operations only if indicated as ready in a register file maintained outside the reorder buffer in the first in-order portion of the processor;

executing the plurality of operations with at least one of said plurality of operations being executed out-of-order, wherein the step of executing includes the steps of scheduling and dispatching individual operations as data required for execution is ready, executing each of said individual operations, and writing back results from execution, wherein the step of writing back includes the steps of associatively writing data results directly into the reservation station for use by one or more individual operations in the reservation station during execution and writing data results into the reorder buffer;

and further wherein the steps of scheduling and dispatching, executing and writing back are performed in consecutive pipestages; and committing results from execution of the plurality of operations to architectural state in order of issuance to the out-of-order execution core.

2. The method defined in claim 1 wherein the step of decoding further includes the steps of:

performing an instruction cache memory lookup to fetch the plurality of instructions, performing instruction length decoding, rotating the plurality of instructions, and decoding the plurality of instructions in an instruction decoder to generate the plurality of operations, performing register renaming, allocating resources and sending a portion of each of the plurality of operations to the reservation station, wherein the steps of performing an instruction cache memory lookup, performing instruction length decoding, rotating the plurality of instructions, decoding the plurality of instructions, and performing register renaming are performed in consecutive pipestages to generate the plurality of instructions.

3. The method defined in claim 2 wherein the step of performing instruction length decoding includes marking the plurality of instructions to identify each of the plurality of instructions.

4. The method defined in claim 2 wherein the step of rotating is performed based on an instruction fetch pointer and a number of instructions consumed by the instruction decoder.

5. The method defined in claim 2 wherein the step of decoding the plurality of instructions is performed in two pipestages.

6. The method defined in claim 2 wherein the step of performing register renaming, allocating resources and sending each of the plurality of operations to the reservation station is performed in a single pipestage.

7. The method defined in claim 1 wherein the step of retiring is performed in two pipestages.

8. A pipelined method for executing a plurality of instructions in a computer system, said method comprising the steps of:

decoding the plurality of instructions in order to produce a plurality of operations, wherein the step of decoding includes the steps of maintaining a readiness indication of source data for the plurality of operations in a storage area outside a reorder buffer in an in-order processing portion of a processor;

writing the plurality of operations into a reservation station in an out-of-order execution core of the processor at the same time and reading data from the reorder buffer for use in execution of the plurality of operations, simultaneously to writing the plurality of operations into the reservation station, only if data is indicated as ready in the storage area;

executing the plurality of operations with at least one of the plurality of operations being executed out-of-order, wherein the step of executing includes the steps of scheduling and dispatching individual operations as data required for execution of each of the individual operations is ready, executing each of said individual operations, and writing back results from execution including associatively writing at least one result to the reservation station, wherein the steps of scheduling and dispatching, executing and writing back are performed in consecutive pipestages; and committing results from execution of the plurality of operations to architectural state in order of issuance of the plurality of operations.

9. The method defined in claim 8 wherein the step of decoding further includes the steps of:

performing an instruction cache memory lookup to fetch the plurality of instructions, performing instruction length decoding, rotating the plurality of instructions, and decoding the plurality of instructions in an instruction decoder to generate the plurality of operations, performing register renaming, allocating resources and sending a portion of each of the plurality of operations to the reservation station, wherein the steps of performing an instruction cache memory lookup, performing instruction length decoding, rotating the plurality of instructions, decoding the plurality of instructions, and performing register renaming are performed in consecutive pipestages to generate the plurality of instructions.

10. The method defined in claim 9 wherein the step of performing instruction length decoding includes marking the plurality of instructions to identify each of the plurality of instructions.

11. The method defined in claim 9 wherein the step of rotating is performed based on an instruction fetch pointer and a number of instructions consumed by the instruction decoder.

12. The method defined in claim 9 wherein the step of decoding the plurality of instructions is performed in two pipestages.

13. The method defined in claim 9 wherein the step of performing register renaming, allocating resources and sending each of the plurality of operations to the reservation station is performed in a single pipestage.

14. The method defined in claim 8 wherein the step of retiring is performed in two pipestages.

15. A method for executing a plurality of instructions in a computer system, said method comprising the steps of:

providing the plurality of instructions as a plurality of operations in an in-order pipeline, wherein the step of providing the plurality of instructions includes the steps of performing an instruction cache memory lookup to fetch the plurality of instructions, performing instruction length decoding, rotating the plurality of instructions, and decoding the plurality of instructions in an instruction decoder to generate the plurality of operations, performing register renaming, allocating resources and maintaining a readiness indication of source data for the plurality of operations in a storage area outside a reorder buffer, issuing the plurality of operations including the steps sending a portion of each of the plurality of operations to a reservation station at the same time and reading source data from the reorder buffer if valid as indicated in the storage area, wherein the steps of performing an instruction cache memory lookup, performing instruction length decoding, rotating the plurality of instructions, decoding the plurality of instructions, and performing register renaming are performed in consecutive pipestages;

executing the plurality of operations in an out-of-order pipeline to produce execution results, wherein the step of executing includes the steps of determining execution readiness of each of the plurality of operations and scheduling individual operations in the plurality of operations that have source data available, dispatching individual operations to an execution unit as data required for each said individual operation is ready, executing said individual operations and writing back the results, including associatively writing at least one result to the reservation station, wherein the steps of determining execution readiness, dispatching and executing are performed in consecutive pipestages; and retiring each of the plurality of operations, wherein results from execution are committed to architectural state and order is reestablished.

16. The method defined in claim 15 wherein the step of performing instruction length decoding includes marking the plurality of instructions to identify each of the plurality of instructions.

17. The method defined in claim 15 wherein the step of rotating is performed based on an instruction fetch pointer and a number of instructions consumed by the instruction decoder.

18. The method defined in claim 15 wherein the step of decoding the plurality of instructions is performed in two pipestages.

19. The method defined in claim 15 wherein the step of performing register renaming, allocating resources and sending each of the plurality of operations to the reservation station is performed in a single pipestage.

20. The method defined in claim 15 wherein the step of executing operations determined to be data ready and writing back the results is performed in a single pipestage.

21. The method defined in claim 15 wherein the step of retiring is performed in two pipestages.

22. The method defined in claim 15 wherein the steps of performing an instruction cache memory lookup, performing instruction length decoding, rotating the plurality of instructions, decoding the plurality of instructions, and performing register renaming are performed in seven consecutive pipestages.

23. A pipeline method for executing a plurality of instructions in a computer system, said method comprising the steps of:

decoding the plurality of instructions in order into a plurality of micro-operations;

writing the plurality of operations into a reservation station at the same time;

reading source data, simultaneously to the step of writing the plurality of micro-operations into a reservation station, from a reorder buffer only if indicated as ready in a register file outside the reorder buffer;

executing the plurality of micro-operations with at least one of the plurality of micro-operations being executed out-of-order;

writing back results from execution of the plurality of operations including associatively writing at least one result to the reservation station;

committing results from execution of the plurality of operations to the out-of-order execution core.

* * * * *